US010917560B2

(12) United States Patent
Itoh et al.

(10) Patent No.: US 10,917,560 B2
(45) Date of Patent: Feb. 9, 2021

(54) CONTROL APPARATUS, MOVABLE APPARATUS, AND REMOTE-CONTROL SYSTEM

(71) Applicants: Atsushi Itoh, Kanagawa (JP); Ryota Yamashina, Kanagawa (JP)

(72) Inventors: Atsushi Itoh, Kanagawa (JP); Ryota Yamashina, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/430,659

(22) Filed: Jun. 4, 2019

(65) Prior Publication Data
US 2020/0007751 A1 Jan. 2, 2020

(30) Foreign Application Priority Data

Jun. 28, 2018 (JP) ................... 2018-123655

(51) Int. Cl.
*H04N 5/232* (2006.01)
*H04N 5/247* (2006.01)
*B25J 9/16* (2006.01)
*H04N 5/268* (2006.01)

(52) U.S. Cl.
CPC ........ *H04N 5/23222* (2013.01); *B25J 9/1697* (2013.01); *H04N 5/23203* (2013.01); *H04N 5/23238* (2013.01); *H04N 5/247* (2013.01); *H04N 5/268* (2013.01)

(58) Field of Classification Search
None
See application file for complete search history.

(56) References Cited

U.S. PATENT DOCUMENTS

| 6,130,705 A * | 10/2000 | Lareau ............. G01C 3/08 |
| | | 348/144 |
| 2007/0276541 A1* | 11/2007 | Sawasaki ........... G05D 1/0246 |
| | | 700/253 |
| 2014/0324249 A1* | 10/2014 | Lacaze ............. G05D 1/0038 |
| | | 701/2 |
| 2016/0018821 A1* | 1/2016 | Akita ............... G05D 1/0022 |
| | | 701/2 |
| 2016/0236617 A1* | 8/2016 | Smyth ................ G01P 3/38 |
| 2018/0032042 A1* | 2/2018 | Turpin .............. G05B 21/02 |
| 2019/0058853 A1* | 2/2019 | Brudnak ............ G05D 1/0038 |

FOREIGN PATENT DOCUMENTS

| JP | 2013-112030 | 6/2013 |
| JP | 2017-163265 | 9/2017 |

* cited by examiner

*Primary Examiner* — Christopher G Findley
(74) *Attorney, Agent, or Firm* — Harness, Dickey & Pierce, P.L.C.

(57) ABSTRACT

A control apparatus for controlling a movable apparatus including a first imaging apparatus for imaging a target to acquire a first image and a second imaging apparatus for imaging a part of the target to acquire a second image includes circuitry configured to acquire, from the movable apparatus, state information indicating a movement state of the movable apparatus, receive the first image and the second image from the movable apparatus based on the acquired state information, and output the first image and the second image selectively based on the acquired state information.

19 Claims, 46 Drawing Sheets

HEMISPHERICAL IMAGE
(AT FRONT SIDE)

HEMISPHERICAL IMAGE
(AT REAR SIDE)

CAPTURED IMAGE (EQUIRECTANGULAR PROJECTION IMAGE EC)

FIG. 9A
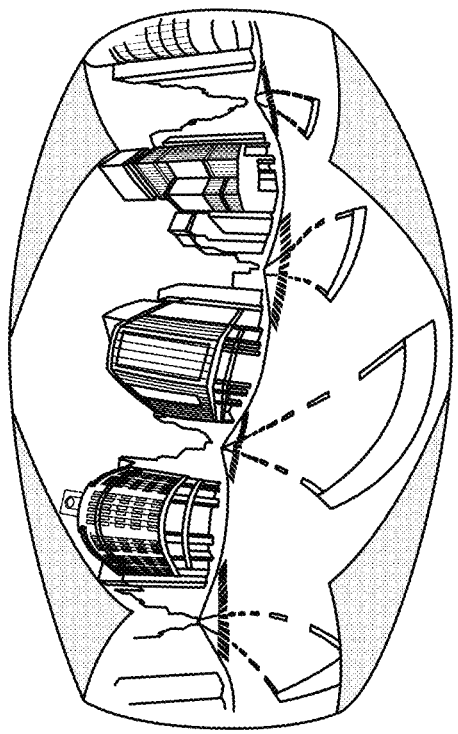 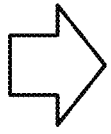 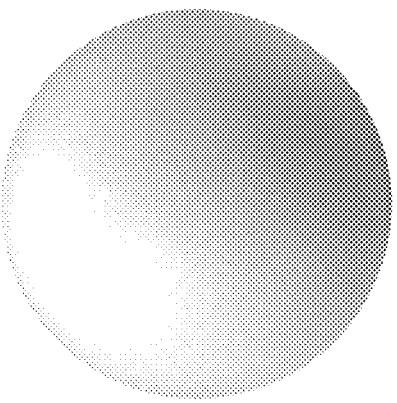
EQUIRECTANGULAR PROJECTION IMAGE EC
FIG. 9B
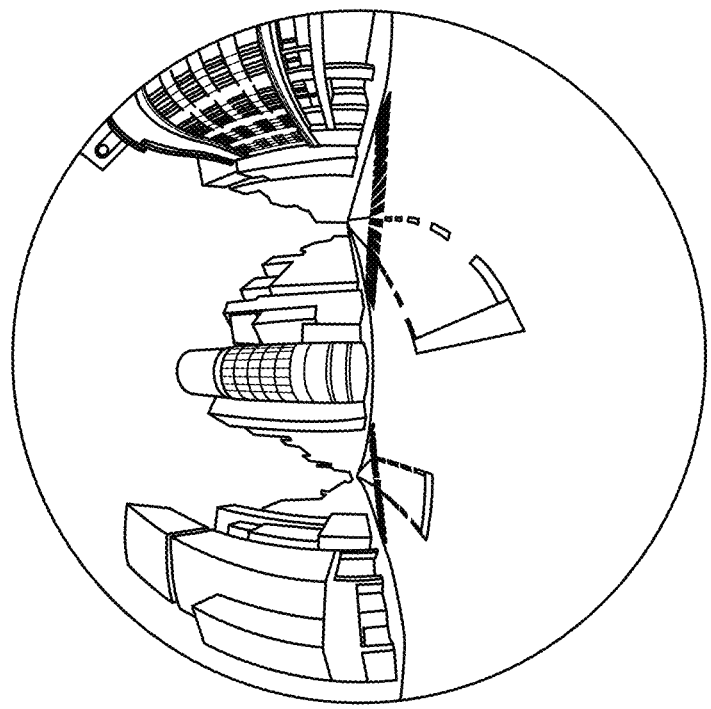
FULL-VIEW SPHERICAL IMAGE CE.

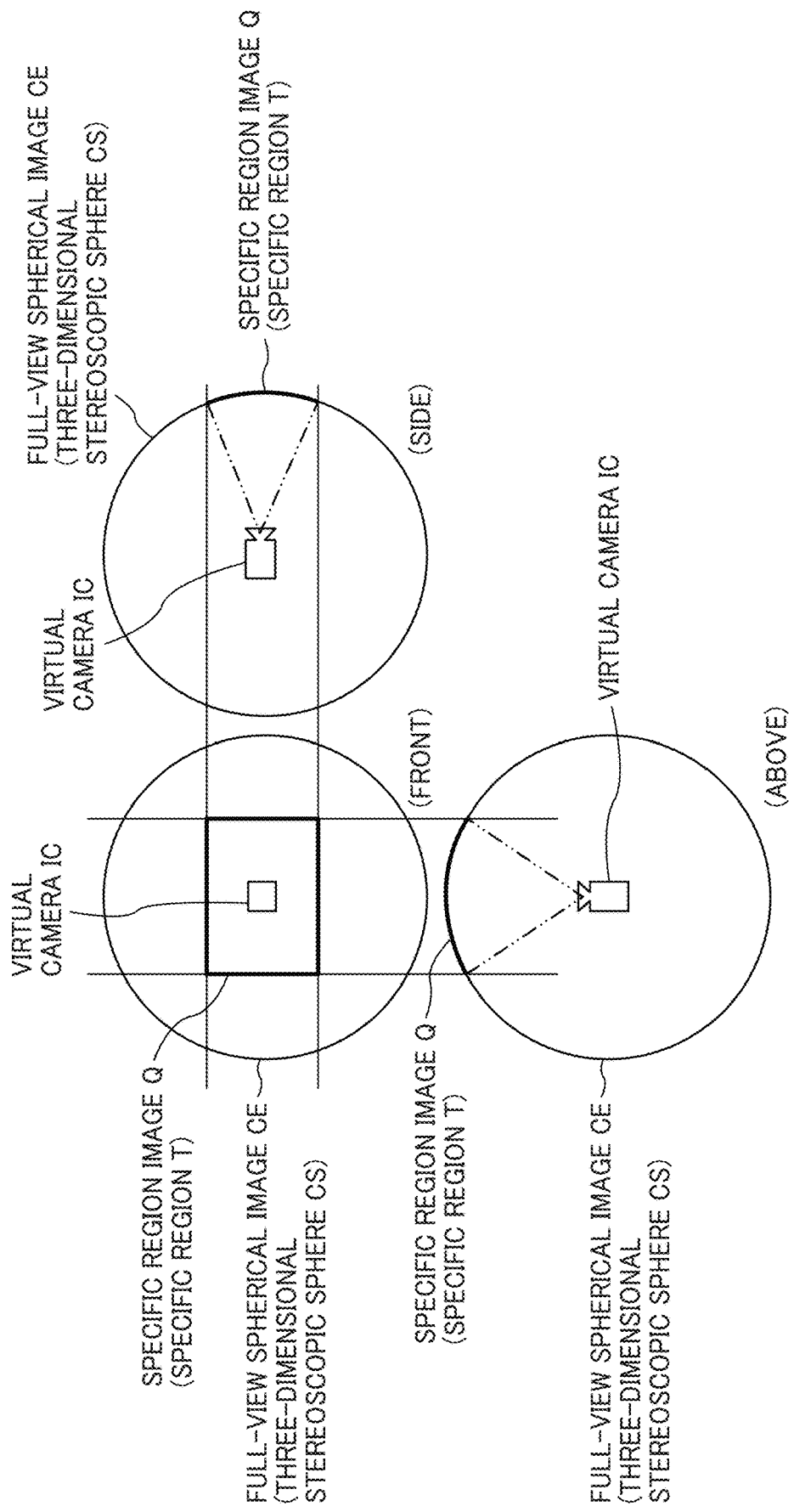

VIRTUAL CAMERA IC

THREE-DIMENSIONAL STEREOSCOPIC SPHERE CS

SPECIFIC REGION IMAGE Q
(SPECIFIC REGION T)

| COMMAND | VARIABLE | PROCESSING |
|---|---|---|
| MOVE | L, R | ROTATE LEFT WHEEL FOR L° (L DEGREES) AND ROTATE RIGHT WHEEL FOR R° (R DEGREES) |
| ARM | h, v | MOVE MANIPULATION ARM 11 TO SET IN RANGE OF HORIZONTAL ANGLE H° (0° TO 360°) AND VERTICAL ANGLE V° (−90° TO 90°) WITH RESPECT TO FRONT FACE OF ROBOT 10 |
| SHOOT | NONE | IMAGING BY GENERAL IMAGING APPARATUS 23 |
| FPS | F | IMAGING BY SPECIAL IMAGING APPARATUS 21 (FPS: F) |
| RESOLUTION | P | IMAGING BY SPECIAL IMAGING APPARATUS 21 (RESOLUTION: P % OF INITIAL STATE) |

| IMAGE QUALITY ITEM | PARAMETER |
|---|---|
| FPS (FRAME RATE) | 30 |
| RESOLUTION (RESOLUTION) | 100 % |
| ... | ... |

| VARIABLE NAME | ITEM NAME | VALUE | RANGE |
|---|---|---|---|
| H_ANGLE | TRAVELING DIRECTION (HORIZONTAL ANGLE) | 30° | 0° TO 360° |
| V_ANGLE | TRAVELING DIRECTION (VERTICAL ANGLE) | 45° | −90° TO 90° |
| SPEED | TRAVELING VELOCITY | 3.0km/h | FROM 0km/h |

| CONDITION | PROCESSING CONTENTS | COMMAND |
|---|---|---|
| SPEED > 5.0km/h | IF TRAVELING VELOCITY BECOMES GREATER THAN 5.0 km, LOWER FRAME RATE TO 3 | FPS(3) |
| SPEED ≤ 5.0km/h | IF TRAVELING VELOCITY BECOMES 5.0 km OR LESS, RETURN FRAME RATE TO INITIAL STATE | FPS(30) |
| SPEED > 1.0km/h | IF TRAVELING VELOCITY BECOMES GREATER THAN 1.0 km, LOWER RESOLUTION TO 50% | RESOLUTION (50%) |
| SPEED ≤ 1.0km/h | IF TRAVELING VELOCITY BECOMES 1.0 km OR LESS, RETURN RESOLUTION TO INITIAL STATE | RESOLUTION (100%) |
| SPEED > 2.0km/h | IF TRAVELING VELOCITY BECOMES GREATER THAN 2.0 km, ZOOM OUT DISPLAY OF FULL-VIEW SPHERICAL IMAGE | ZOOM=10 |
| SPEED ≤ 2.0km/h | IF TRAVELING VELOCITY BECOMES 2.0 km OR LESS, RETURN ZOOM AMOUNT TO INITIAL STATE | ZOOM=0 |

FIG. 20

| INPUT COMMAND | PROCESSING | TYPE OF PROCESSING |
|---|---|---|
| PRESSING OF "FORWARD(↑)" KEY | MOVE(10.0, 10.0) | TRANSMIT REQUEST COMMAND |
| PRESSING OF "REARWARD(↓)" KEY | MOVE(-8.0,-8.0) | TRANSMIT REQUEST COMMAND |
| PRESSING OF "RIGHT ROTATION(→)" | MOVE(5.0,-5.0) | TRANSMIT REQUEST COMMAND |
| PRESSING OF "LEFT ROTATION(←)" | MOVE(-5.0,5.0) | TRANSMIT REQUEST COMMAND |
| PRESSING OF "HOME" | VIEW_H_ANGLE=0, VIEW_V_ANGLE=0 | CHANGE DISPLAY DIRECTION OF FULL-VIEW SPHERICAL IMAGE |
| PRESSING OF "SHOOT" | ARM(h,v) SHOOT() | TRANSMIT REQUEST COMMAND |
| CLICK OF MOUSE | ARM(h,v) | TRANSMIT REQUEST COMMAND |
| LINE OF SIGHT DOSE NOT MOVE THREE SECONDS OR MORE | ARM(h,v) | TRANSMIT REQUEST COMMAND |

| TERMINAL ID | PASSWORD |
|---|---|
| o01 | aaaa |
| o02 | abab |
| o03 | baba |
| ... | ... |

| TERMINAL ID | TERMINAL NAME | IP ADDRESS | OPERATION STATE | SITE NAME |
|---|---|---|---|---|
| o01 | DISPLAY TERMINAL 50A | 1.2.1.3 | ONLINE (CAN COMMUNICATE) | – |
| o02 | DISPLAY TERMINAL 50B | 1.2.1.4 | ONLINE (COMMUNICATING) | – |
| o03 | DISPLAY TERMINAL 50C | 1.2.2.3 | OFF LINE | – |
| ... | ... | ... | ... | ... |
| rA01 | ROBOT 10A-1 | 1.3.2.3 | ONLINE (CAN COMMUNICATE) | SITE A |
| rA02 | ROBOT 10A-2 | 1.3.2.4 | ONLINE (CAN COMMUNICATE) | SITE A |
| ... | ... | ... | ... | ... |
| rB01 | ROBOT 10B-1 | 1.4.2.3 | ONLINE (COMMUNICATING) | SITE B |
| rB02 | ROBOT 10B-2 | 1.4.2.4 | ONLINE (COMMUNICATING) | SITE B |
| ... | ... | ... | ... | ... |
| rC01 | ROBOT 10C-1 | 1.3.3.3 | OFF LINE | SITE C |
| rC02 | ROBOT 10C-2 | 1.3.3.4 | OFF LINE | SITE C |
| ... | ... | ... | ... | ... |

| TERMINAL ID OF DISPLAY TERMINAL | TERMINAL ID OF DESTINATION CANDIDATE |
|---|---|
| o01 | rA01,rA02,rC01 |
| o02 | rB01,rB02 |
| o03 | rA01,rB02 |
| ... | ... |

| SESSION ID | TERMINAL ID |
|---|---|
| se1 | o01,rA02,rC01 |
| se2 | o02,rA01,rB02 |
| se3 | o01,rA01 |
| ... | ... |

FIG. 24

| OPERATION STATE | TERMINAL ID | DESTINATION NAME | SITE NAME |
|---|---|---|---|
| ONLINE (CAN COMMUNICATE) | rA01 | ROBOT 10A-1 | SITE A |
| ONLINE (CAN COMMUNICATE) | rA02 | ROBOT 10A-2 | SITE A |
| ... | ... | ... | ... |
| OFF LINE | rC01 | ROBOT 10C-1 | SITE C |
| ... | ... | ... | ... |

FIG. 28

| VARIABLE NAME | ITEM NAME | VALUE |
|---|---|---|
| H_ANGLE | TRAVELING DIRECTION (HORIZONTAL ANGLE) | 37.2° |
| V_ANGLE | TRAVELING DIRECTION (VERTICAL ANGLE) | 45.3° |
| SPEED | TRAVELING VELOCITY | 3.0km/h |

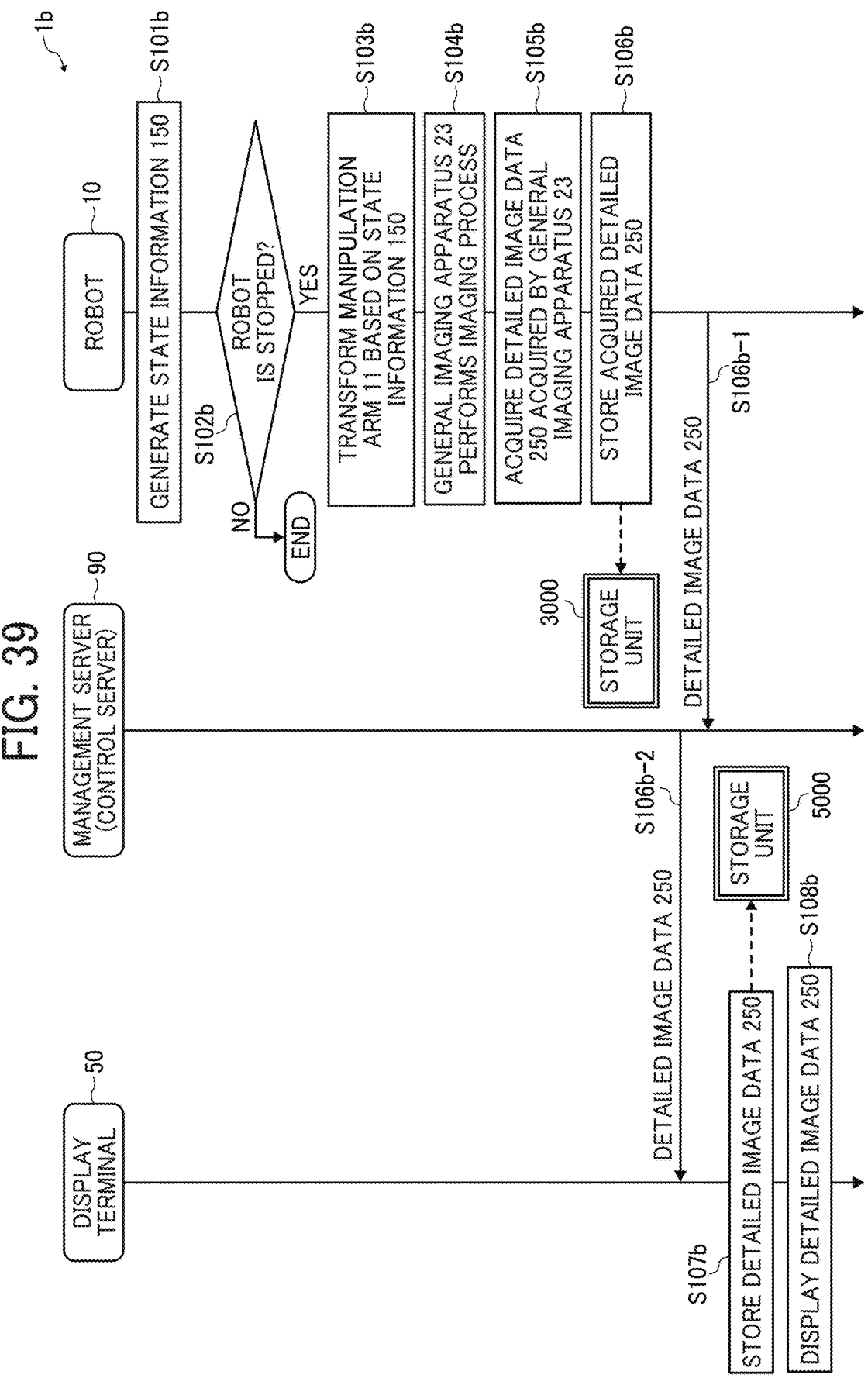

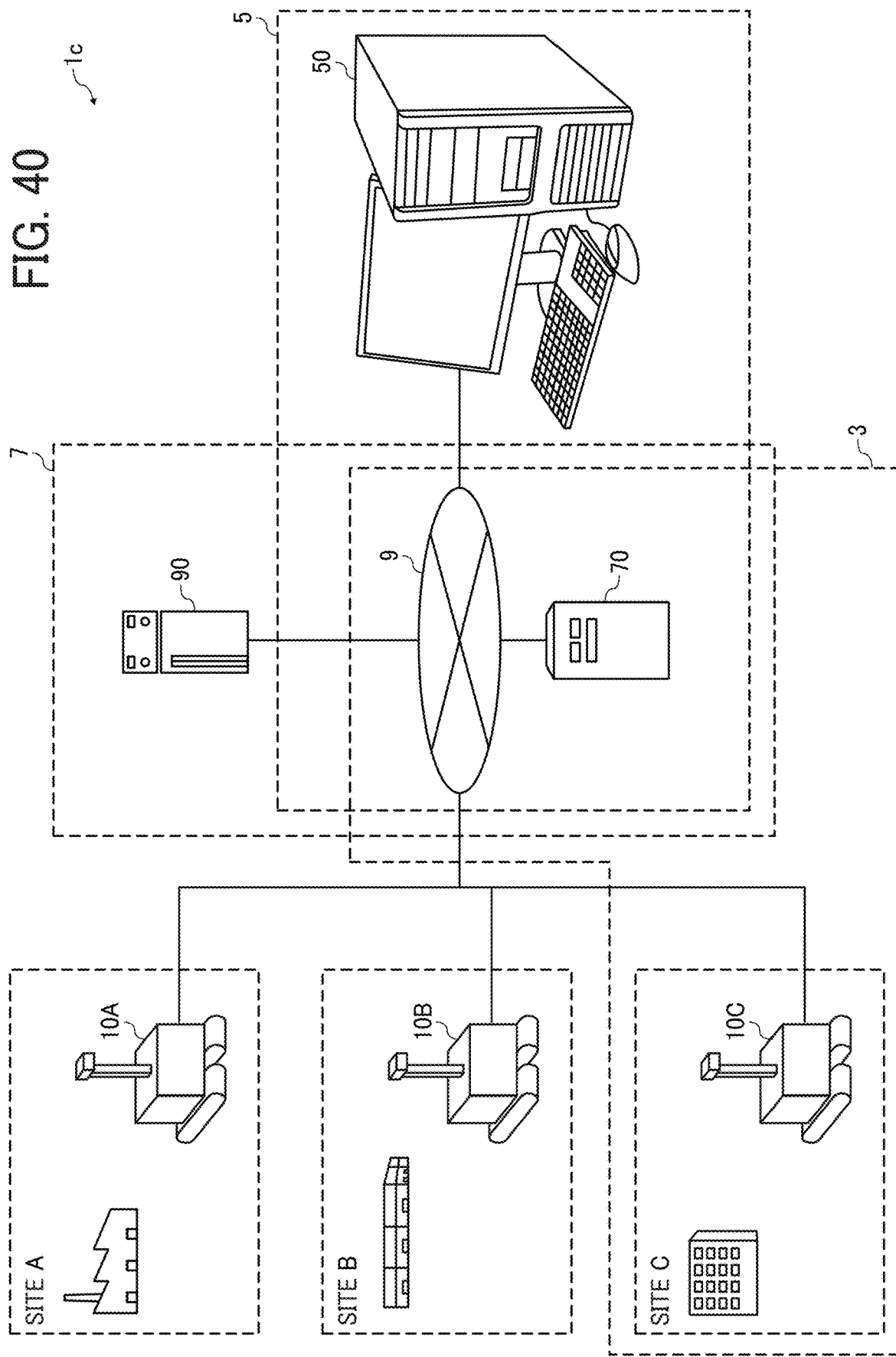

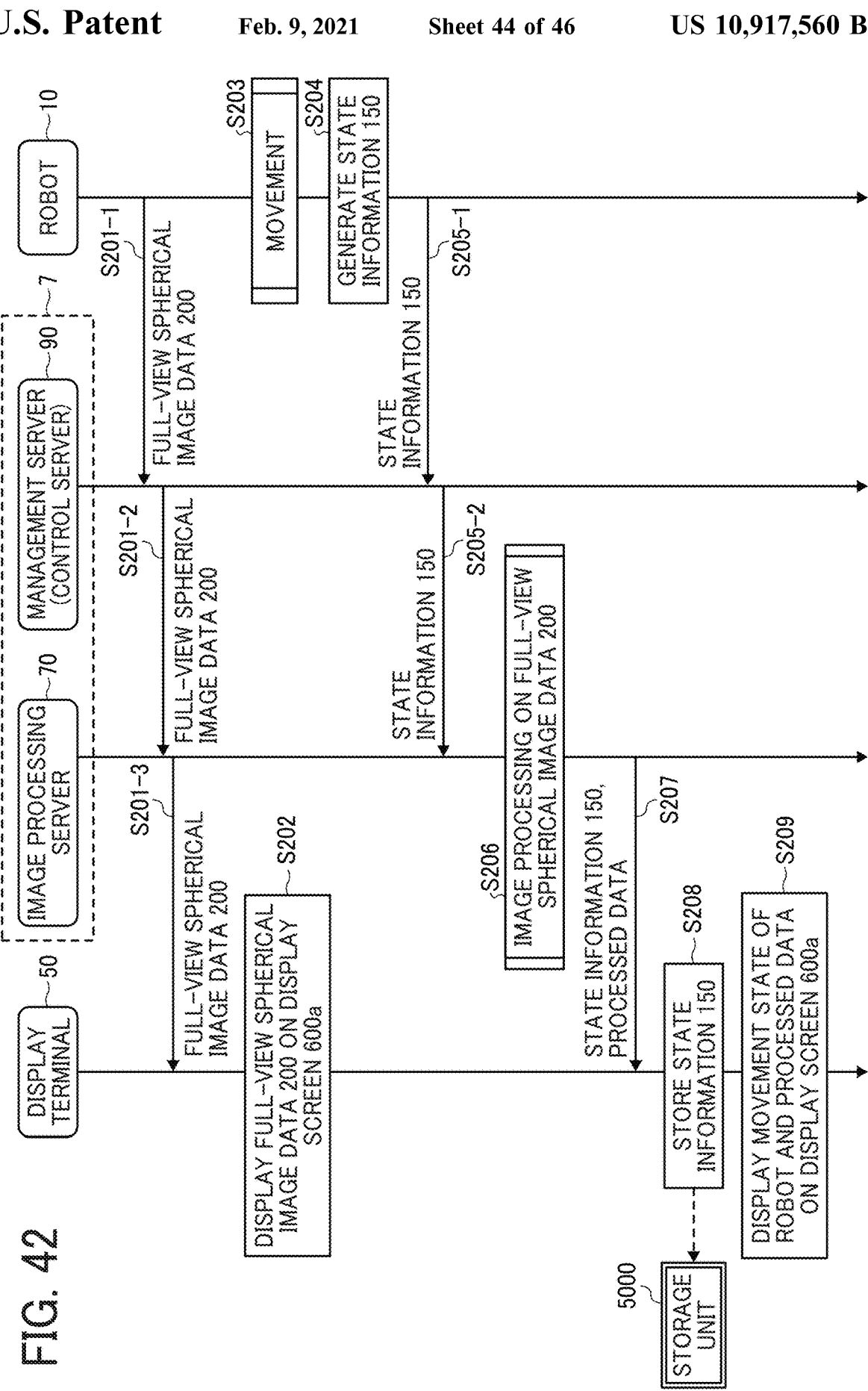

CONTROL APPARATUS, MOVABLE APPARATUS, AND REMOTE-CONTROL SYSTEM

CROSS-REFERENCE TO RELATED APPLICATION

This application claims priority pursuant to 35 U.S.C. § 119(a) to Japanese Patent Application No. 2018-123655, filed on Jun. 28, 2018 in the Japan Patent Office, the disclosure of which is incorporated by reference herein in its entirety.

BACKGROUND

Technical Field

This disclosure relates to a control apparatus, a display terminal, an information processing apparatus, a movable apparatus, a remote-control system, an output control method, and an imaging control apparatus.

Background Art

Remote-control systems that remotely operate one or more robots (hereinafter, referred to as robot or robots) disposed at one or more remote sites or locations are known as the systems to remotely operate the robots using a display terminal located at another remote site (e.g., control center) communicable with the robots via a communication network. The remote-control system can check or confirm information of each site where each robot is located by displaying images, captured by an imaging apparatus provided for each robot, on the display terminal disposed at the remote site (e.g., control center).

Further, technologies using robots equipped with different types of imaging apparatuses or devices to accurately confirm situations around the robots are also known. For example, one technology discloses a wirelessly-controllable movable apparatus equipped with a front camera for capturing images of the front region of the movable apparatus, a rear camera for capturing images of the rear region of the movable apparatus, and a full-view camera that can capture the entire perimeter around the movable apparatus.

SUMMARY

As one aspect of the present invention, a control apparatus for controlling a movable apparatus including a first imaging apparatus for imaging a target to acquire a first image and a second imaging apparatus for imaging a part of the target to acquire a second image is devised. The control apparatus for controlling the movable apparatus includes circuitry configured to acquire, from the movable apparatus, state information indicating a movement state of the movable apparatus, receive the first image and the second image from the movable apparatus based on the acquired state information, and output the first image and the second image selectively based on the acquired state information.

As another aspect of the present invention, a movable apparatus is devised. The movable apparatus includes a movement mechanism configured to move the movable apparatus, a first imaging apparatus for imaging a target to acquire a first image, a second imaging apparatus for imaging a part of the target to acquire a second image, and circuitry configured to acquire state information indicating a movement state of the movable apparatus, acquire the first image using the first imaging apparatus and the second image using the second imaging apparatus, and output the acquired first image and second image to a display terminal, communicable with the circuitry, based on the acquired state information.

As another aspect of the present invention, a remote-control system is devised. The remote-control system includes a movable apparatus including a first imaging apparatus for imaging a target to acquire a first image and a second imaging apparatus for imaging a part of the target to acquire a second image, a display terminal communicable with the movable apparatus via a communication network for remotely operating the movable apparatus, and circuitry configured to acquire, from the movable apparatus, state information indicating a movement state of the movable apparatus, receive the first image and the second image from the movable apparatus based on the acquired state information, and output, to the display terminal, the first image and the second image selectively based on the acquired state information.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 9A is a conceptual diagram illustrating a state in which a sphere is covered with an equirectangular projection image;

FIG. 9B illustrates an example of a full-view spherical image;

FIG. 10 illustrates a position of a virtual camera and a position of a specific region when a full-view spherical image corresponds to a three-dimensional stereoscopic sphere;

FIG. 17A illustrates an example of a command table according to a first embodiment;

FIG. 17B illustrates an example of an imaging parameter table according to a first embodiment;

FIG. 18 illustrates an example of a state management table (state control table) according to a first embodiment;

FIG. 19 illustrates an example of a condition table according to a first embodiment;

FIG. 20 illustrates an example of a user command table according to a first embodiment;

FIG. 21A is an example of an authentication management DB (authentication control DB);

FIG. 21B is an example of a terminal management DB (terminal control DB);

FIG. 22A is an example of a destination list management DB (destination list control DB);

FIG. 22B is an example of a session management DB (session control DB);

FIG. 24 illustrates an example of a destination list screen displayed on a display terminal according to a first embodiment;

FIG. 28 illustrates an example of state information according to a first embodiment;

FIG. 39 is an example of a sequence diagram illustrating a process of switching an image displayed on a display terminal in an environment of a remote-control system according to a second embodiment.

FIG. 40 illustrates an example of a system configuration of a remote-control system according to a third embodiment;

FIG. 42 is an example of a sequence diagram illustrating processing when a robot moves in an environment of a remote-control system according to a third embodiment.

Figure 1:
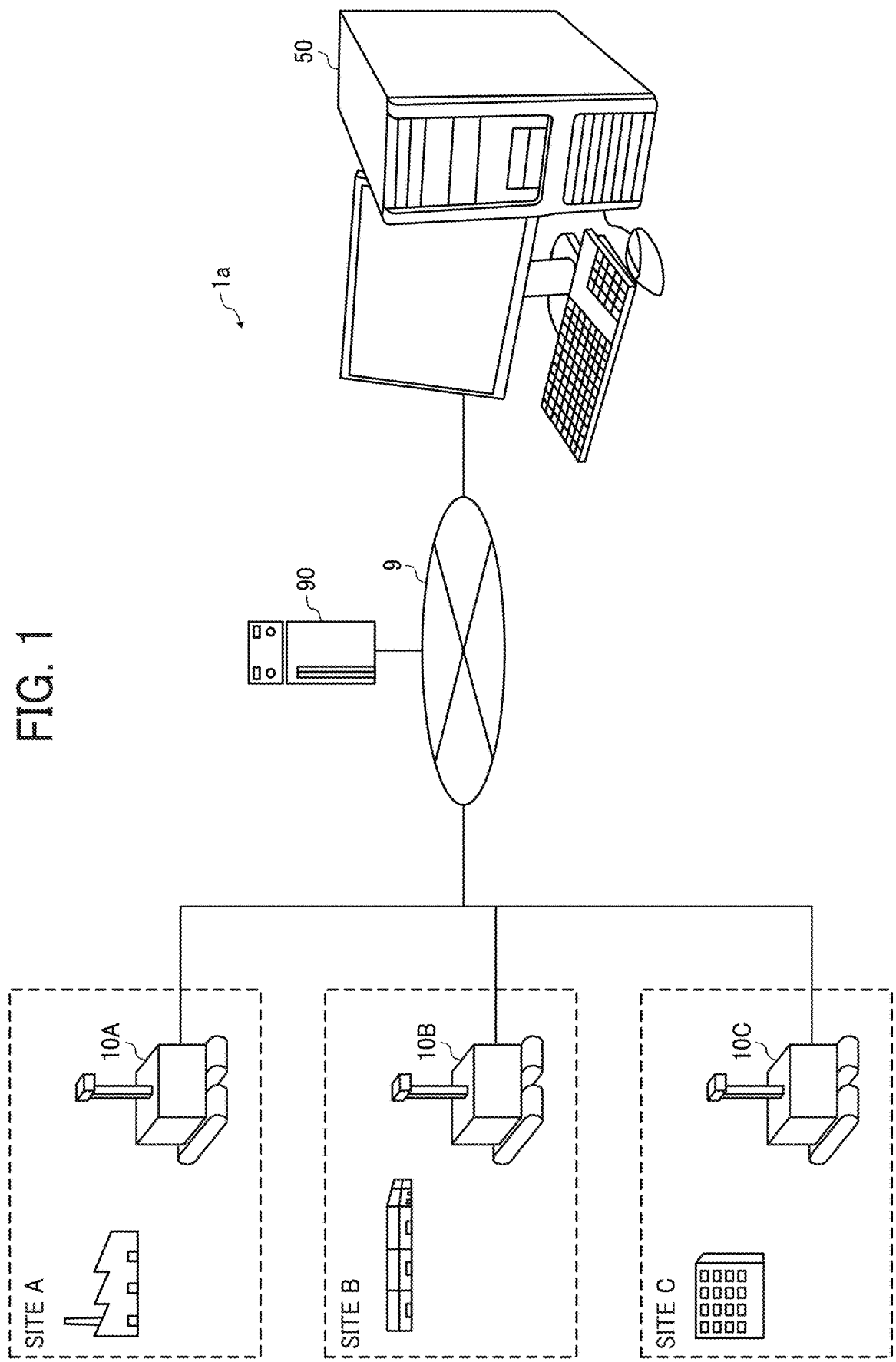
FIG. 1 illustrates an example of a system configuration of a remote-control system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a configuration for carrying out one or more embodiments of the present invention with reference to the drawings. In the description of the drawings, the same elements are denoted by the same reference numerals, and duplicated descriptions may be omitted.

In conventional technologies, images acquired by different cameras (i.e., imaging apparatuses) provided for a robot (i.e., movable apparatus) are output without an effective method, with which the control of the movable apparatus may not be performed with higher precision depending on methods.

System Configuration:

FIG. 1 illustrates an example of a system configuration of a remote-control system 1a according to an embodiment. The remote-control system 1a illustrated in FIG. 1 can remotely control one or more robots 10 located at one or more sites, such as remote sites, using a display terminal 50 to perform the operation management, maintenance operations or the like for devices or apparatuses disposed at one or more sites and to confirm positions and movement lines of persons existing in one or more sites.

As illustrated in FIG. 1, the remote-control system 1a includes, for example, a plurality of robots 10 (robots 10A, 10B, 10C) disposed in each of a plurality of sites (sites A, B, C), the display terminal 50, and a management server (control server) 90. Hereinafter, the robots 10A, 1013, and 10C may be simply referred to the robot 10 if the distinction of each robot is not required. In this description, the term of "manage" and "management" are also referred to as "control" and "controlling," As illustrated in FIG. 1, the robot 10, the display terminal 50 and the management server 90 are communicably connected to each other via a communication network 9. The communication network 9 employs, for example, a local area network (LAN), a dedicated line, the Internet, and the like. The communication network 9 can use a wireless connection communication, such as Wi-Fi (registered trademark), in addition to the wired connection communication.

The robot 10, disposed at each site (site A, site B, site C), is an example of a movable apparatus that can be autonomously driven under an a remote-control using, for example, the display terminal 50. The robot 10 can move in each site while capturing images (first image) of one or more targets (e.g., objects) in a wide range using a special imaging apparatus 21 (first imaging apparatus), which will be described later, and transmits the images acquired by the special imaging apparatus 21 to the display terminal 50 to provide information (e.g., images) in each site to an operator who operates the robot 10 using the display terminal 50.

Further, the robot 10 can acquire images of a part or portion of the targets e.g., objects), captured by the special imaging apparatus 21, as detailed images (second image), using a general imaging apparatus 23 (second imaging apparatus), which will be described later, and transmits the detailed images acquired by the general imaging apparatus 23 to the display terminal 50 to provide detailed information (e.g., images) in a specific region in each site to the operator who operates the robot 10 using the display terminal 50.

In this description, the robot 10 is an example of movable apparatus or machine, the special imaging apparatus 21 is used as first imaging apparatus, the general imaging apparatus 23 is used as second imaging apparatus, the image captured by the special imaging apparatus 21 (first imaging apparatus) is referred to as the first image, and the image captured by the general imaging apparatus 23 (second imaging apparatus) is referred to as the second image.

The display terminal 50 is a terminal device or apparatus, such as a personal computer (PC) that can be used to perform a remote control of the robot 10 disposed at each site (site A, site B, site C). The display terminal 50 can display images, for example, full-view spherical images and/or detailed images transmitted from the robot 10. Then, the operator can perform the remote control of the robot 10 by viewing the images displayed on the display terminal 50.

The display terminal 50 may be provided with a display device used for displaying the images transmitted from the robot 10. The display terminal 50 can be a tablet terminal, a cellular phone, a smart phone, a wearable terminal such as a head-mounted display (HIVED), and a communication terminal such as a personal digital assistant (PDA) equipped with a wide-angle screen (e.g., cylinder screen, full-view spherical screen, a half spherical screen).

The management server 90 is a control server used for managing or controlling communication between the display terminal 50 and the robot 10 located at each site. The management server 90 can be also referred to as the control server 90. The management server 90 can be connected to the robot 10 and the display terminal 50 via the communication network 9. It should be noted that the management server 90 can be configured by a plurality of servers, in which any server can be provided with any functions.

The site where the robot 10 is disposed includes, for example, indoor sites, such as offices, warehouses, factories, schools, and the like, and outdoor sites, such as construction sites, and the like. The operator who operates the robot 10 using the display terminal 50 can confirm the position and the movement line of persons existing in the site and perform the management operation and maintenance operation of devices or apparatuses disposed at the site by checking the captured images of the site transmitted from the robot 10. Further, the robot 10 and the display terminal 50 can also perform bidirectional communication (remote communication conference) by transmitting and receiving the captured images between the robot 10 and the display terminal 50.

In the configuration in FIG. 1, one robot 10 is disposed in each site, but a plurality of robots 10 can be disposed at each one site. Further, the display terminal 50 can be configured to communicate with each of the robots 10 disposed in a plurality of sites or can be configured to communicate with only the robot 10 disposed in one site.

Figure 2:
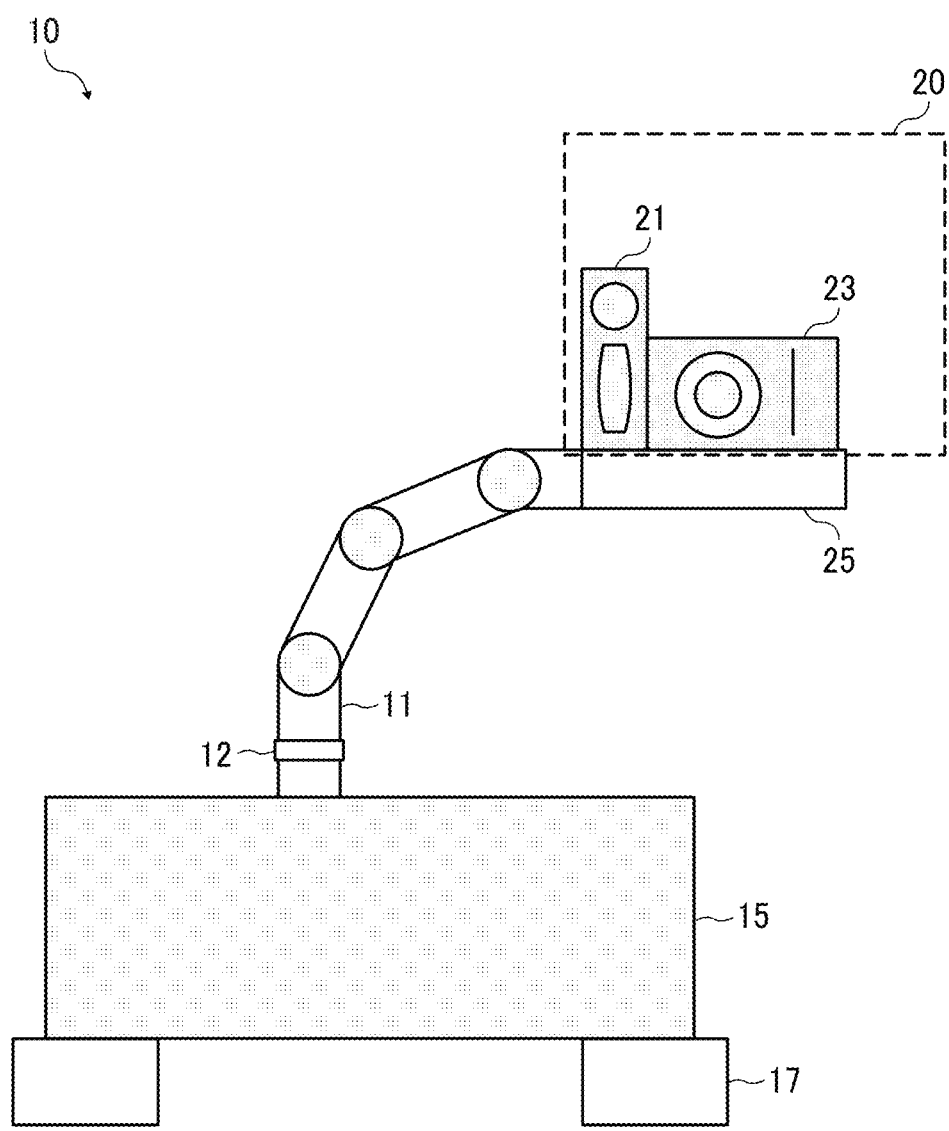
FIG. 2 illustrates an example of a schematic configuration of a robot according to an embodiment.

Configuration of Robot:

Hereinafter, a description is given of a configuration the robot 10 of FIG. 1 with reference to FIGS. 2 to 9. FIG. 2 illustrates an example of a structure of the robot 10 according to the embodiment.

As illustrated in FIG. 2, the robot 10 includes, for example, a movement mechanism 17, a housing 15, a manipulation arm 11, a rotary shaft 12, an image capture mechanism 20, and a mounting member 25. The movement mechanism 17 is used for moving the robot 10. The housing 15 includes a control device 30 (FIG. 13) used for controlling processing and operation of the robot 10. The rotary shaft 12, such as a joint, is used for rotating (transforming) the manipulation arm 11. The mounting member 25 is connected to the manipulation arm 11 and supports the image capture mechanism 20.

As illustrated in FIG. 2, the image capture mechanism 20 includes, for example, the special imaging apparatus 21 (first imaging apparatus) and the general imaging apparatus 23 (second imaging apparatus).

The special imaging apparatus 21 can capture images of targets (e.g., objects), such as persons, physical objects, landscape, and the like and acquire special images (first image), such as a panoramic image or fill-view spherical image (i.e., 360-degree image). The general imaging apparatus 23 captures images of a part or portion of the targets (e.g., objects), captured by the special imaging apparatus 21, to acquire the detailed images (second image) of the targets (e.g., objects). The special imaging apparatus 21 is, for example, a special digital camera for capturing images of the targets (e.g., objects, such as two hemispherical images used as the source of the full-view spherical image (panorama image) used as the first image. Further, the first image is not limited to the full-view spherical image, but can be any image capturing a relatively wide range such as the wide-angle image, which can be used to check or confirm a relatively wider area around the robot 10.

The general imaging apparatus 23 is, for example, a digital camera, such as a digital single lens reflex (SLR) camera, a compact digital camera, or the like capable of acquiring planar images (detailed image) used as the second image. The second image is an image capturing a relatively smaller range, which can be used to check or confirm a relatively narrower area or focused area around the robot 10.

The details of the full-view spherical image captured by the special imaging apparatus 21 and the hemispherical image used as the source of the full-view spherical image will be described later (see FIGS. 8 to 12). In this description, the special imaging apparatus 21 is an example of the first imaging apparatus or device, and the general imaging apparatus 23 is an example of the second imaging apparatus or device. Hereinafter, the target to be captured may be also referred to as the object.

The robot 10 is configured to transmit full-view spherical image data 200, which is the full-view spherical image acquired by the special imaging apparatus 21, to the display terminal 50. The image of the full-view spherical image data 200 can be still images or video images, and can be both of video images and still images. The full-view spherical image data 200 can further include audio data together with the image data.

The image acquired by the special imaging apparatus 21 is not limited to the full-view spherical image but can be a wide-angle image having an angle of view equal to or greater than a specific value of angle of view. In this case, the wide-angle image is acquired by the special imaging apparatus 21, such as a wide-angle camera or a stereo camera. Specifically, the special imaging apparatus 21 is an imaging unit capable of acquiring the image (e.g., full-view spherical image and wide-angle image) captured by using a lens having a focal length shorter than a specific value of focal length. The image (e.g., full-view spherical image, wide-angle image) acquired by the special imaging apparatus 21 is an example of the first image in this description. In each of the following description, the image acquired by the special imaging apparatus 21 is assumed to be, for example, the full-view spherical image.

Further, the robot 10 is configured to transmit detailed image data 250, which is a detailed image acquired by the general imaging apparatus 23, to the display terminal 50. The detailed image acquired by the general imaging apparatus 23 is an image acquired by imaging a part or portion of an object, which is captured by the special imaging apparatus 21, with an angle of view equal to or greater than a specific value. That is, the general imaging apparatus 23 is an imaging unit capable of acquiring the image (detailed image) captured by using a lens having a focal length longer than the focal length of the lens of the special imaging apparatus 21. The image acquired by the general imaging apparatus 23 (detailed image and planar image) is an example of the second image in this description.

Specifically, when the robot 10 is moved using the remote control performed by the operator of the robot 10, the display terminal 50 displays the full-view spherical image, which can view a wide range of the circumference or surroundings of the robot 10. Further, if the operator of the robot 10 wants to confirm detailed information about a specific region included in the full-view spherical image, the display terminal 50 displays the detailed image acquired by the general imaging apparatus 23. In this configuration, the special imaging apparatus 21 is one imaging unit used for performing imaging processing to acquire the image (e.g., full-view spherical image and wide angle image) to be used by the operator of the robot 10 for confirming or checking the circumference or surroundings of the robot 10, and the general imaging apparatus 23 is another imaging unit used for performing imaging processing to acquire the image (e.g., detailed image) to be used by the operator of the robot 10 for confirming or checking a state of a specific region around the robot 10. With this configuration, the display terminal 50 can change or switch a display of the full-view spherical image (first image) and the detailed image (second image) to improve the operability of the robot 10 by the operator.

Hereinafter, it is assumed that the image capture mechanism 20 includes the special imaging apparatus 21 and the general imaging apparatus 23 as separate imaging apparatuses, but the functions of the special imaging apparatus 21 and the general imaging apparatus 23 can be implemented by a single imaging apparatus.

The movement mechanism 17 is a unit for moving the robot 10, and includes, for example, one or more wheels, a drive motor, a drive encoder, a steering motor, a steering encoder, and the like. Since the movement control of the robot 10 is known technology, the detailed description is omitted. Typically, the robot 10 receives a travel instruction from the operator (e.g., display terminal 50), and then the movement mechanism 17 moves the robot 10 based on the received travel instruction.

Hereinafter, the movement mechanism 17 is assumed to include two wheels, but the movement mechanism 17 can employ any mechanisms, such as a two-leg walking type and a single wheel. Further, the shape of the robot 10 is not limited to a vehicle type illustrated in FIG. 2, but can be, for example, a humanoid type of two legs, a form of reproducing an animal form, a form of reproducing a specific character, or the like.

The housing 15 is disposed at a body portion of the robot 10, and includes, for example, a power supply unit for supplying power necessary for the robot 10 and the control device 30 for controlling the processing or operation of the robot 10.

The manipulation arm 11 is a movable member used for adjusting the image capture position of the special imaging apparatus 21 and the general imaging apparatus 23 disposed on the mounting member 25. The manipulation arm 11 can be rotated using the rotary shaft 12 to change the orientation of the special imaging apparatus 21 and the general imaging apparatus 23. The robot 10 can change the image capture direction of the image capture mechanism 20 (i.e., first image capture direction used for the special imaging apparatus 21 and second image capture direction used for the general imaging apparatus 23) by changing the direction of the robot 10 by the movement mechanism 17 and by rotating or transforming the manipulation arm 11.

In addition to the above described configuration, the robot 10 may include various sensors capable of detecting the information around the robot 10. The sensors are, for example, sensor devices such as barometers, thermometers, photometers, human sensory sensors, and illuminance meters. Further, in addition to the image capture mechanism 20 disposed on the manipulation arm 11, the robot 10 can include an operation unit enabling an additional operation of the robot 10 other than the movement of the robot 10. The operation unit is, for example, a hand that can grip an object.

Variance of Robot:

Variant Example 1 of Robot:

Hereinafter, a description is given of a configuration of the robot 10 of variant examples 1-1 and 1-2 with reference to FIG. 3 and FIG. 4. The robots 10 illustrated in FIGS. 3A to 3C (FIG. 3) differ from the configuration illustrated in FIG. 2 in the arrangement of the special imaging apparatus 21 and the image capture mechanism 20. As described with reference to FIG. 2, since the special imaging apparatus 21 and the general imaging apparatus 23 are different in imaging purposes, it is preferable to change the arrangement of the special imaging apparatus 21 and the general imaging apparatus 23 according to the imaging purposes.

Figure 3A:
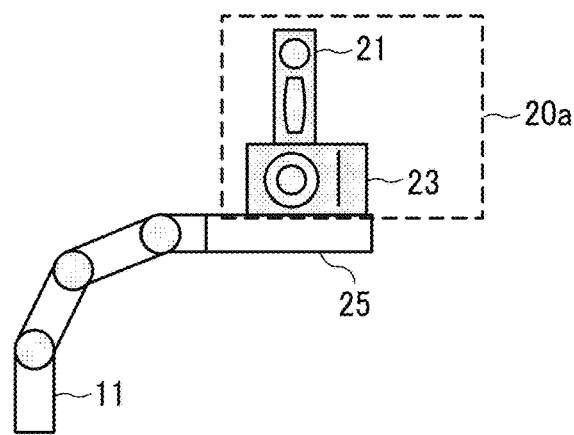
FIGS. 3A to 3C (FIG. 3) illustrate another example of schematic configurations of a robot of variant example 1-1 according to an embodiment.

In an image capture mechanism 20a illustrated in FIG. 3A, the special imaging apparatus 21 is disposed on the upper part of the general imaging apparatus 23. The special imaging apparatus 21 is used to capture a wide range of the surroundings around the robot 10. Therefore, if the robot 10 has the configuration of the image capture mechanism 20a arranged as illustrated in FIG. 3A, the special imaging apparatus 21 and the general imaging apparatus 23 can be effectively used separately.

Figure 3B:
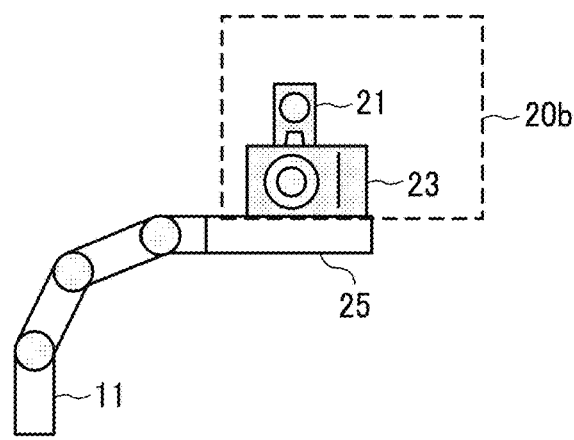

In an image capture mechanism 20b illustrated in FIG. 3B, the special imaging apparatus 21 is disposed at the rear of the general imaging apparatus 23. The region in the front direction (second image capture direction) of the general imaging apparatus 23 is a region where the operator of the robot 10 wants to check in detail. Therefore, by arranging the image capture mechanism 20b as illustrated in FIG. 3B, the general imaging apparatus 23 can capture images of a region in the front direction (second image capture direction) without interference of obstacles or the like. Further, by arranging the image capture mechanism 20b as illustrated in FIG. 3B, the special imaging apparatus 21 can capture images of a region where the general imaging apparatus 23 cannot capture images (e.g., rear region of the general imaging apparatus 23) with a relatively good resolution without capturing an image of the general imaging apparatus 23.

Figure 3C:
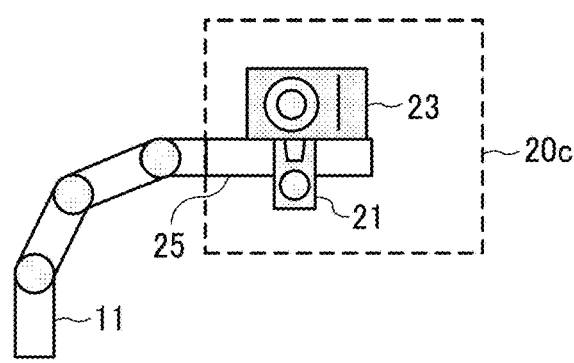

Further, in an image capture mechanism 20c illustrated in FIG. 3C, the special imaging apparatus 21 is disposed at the lower part of the general imaging apparatus 23. The state of the ground (foot area) becomes important when the robot 10 is moved. Therefore, by arranging the image capture mechanism 20c as illustrated in FIG. 3C, the special imaging apparatus 21 can capture images of the ground (foot area) without being obstructed by the general imaging apparatus 23 and/or the mounting member 25. With this configuration, the operator of the robot 10 can move the robot 10 more safely by viewing the full-view spherical image acquired by the special imaging apparatus 21.

Figure 4A:
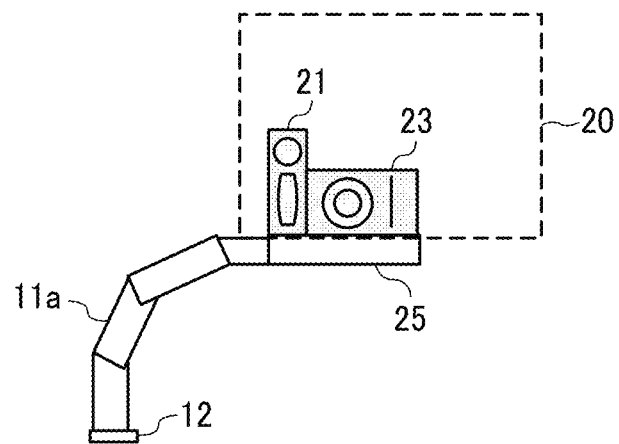
FIGS. 4A and 4B (FIG. 4) illustrate another example of schematic configurations of a robot of variant example 1-2 according to an embodiment.
Figure 4B:
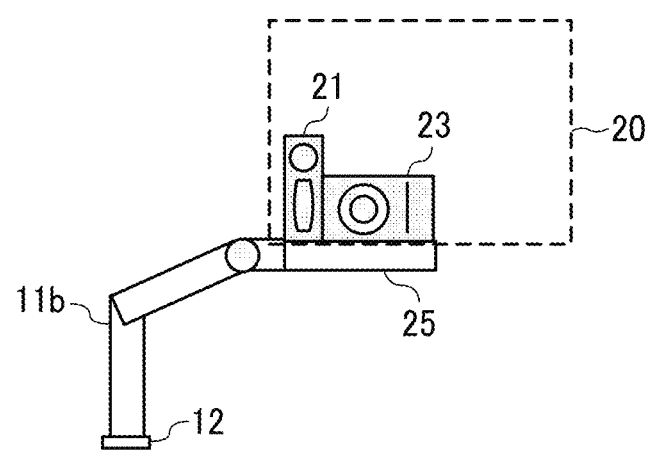

FIGS. 4A and 4B (FIG. 4) illustrate example of structures of the manipulation arm 11 of the robot 10 different from the structure illustrated in FIG. 2. It is preferable that the manipulation arm 11 can secure a given movable range, which can change depending on applications of the robot 10. In a case of FIG. 4A, a manipulation arm 11a has no joint members, and the direction or orientation of the manipulation arm 11a can be changed by the rotary shaft 12. If the height and distance of a portion to be captured by the special imaging apparatus 21 or the general imaging apparatus 23 are constant, the robot 10 does not have a problem with such structure. Further, FIG. 4B illustrates a manipulation arm 11b having a transformable joint member compared to the manipulation arm 11a illustrated in FIG. 4A. In this case, the manipulation arm 11b can be transformed in the upward and downward directions.

The examples of FIGS. 3 and 4 illustrate the cases where the special imaging apparatus 21 and the general imaging apparatus 23 are disposed on one manipulation arm 11, but not limited thereto. For example, when both the special imaging apparatus 21 and the general imaging apparatus 23 or any one of the special imaging apparatus 21 and the general imaging apparatus 23 are disposed on a plurality of manipulation arms 11, variations according to the positional relationship illustrated in FIG. 3 or variations according to the structures of the manipulation arm 11 illustrated in FIG. 4 can be used with the same effect.

Variant Example 2 of Robot:

Hereinafter, a description is given of a configuration of the robot 10 of variant examples 2-1 and 2-2 with reference to FIGS. 5 and 6.

Figure 5A:
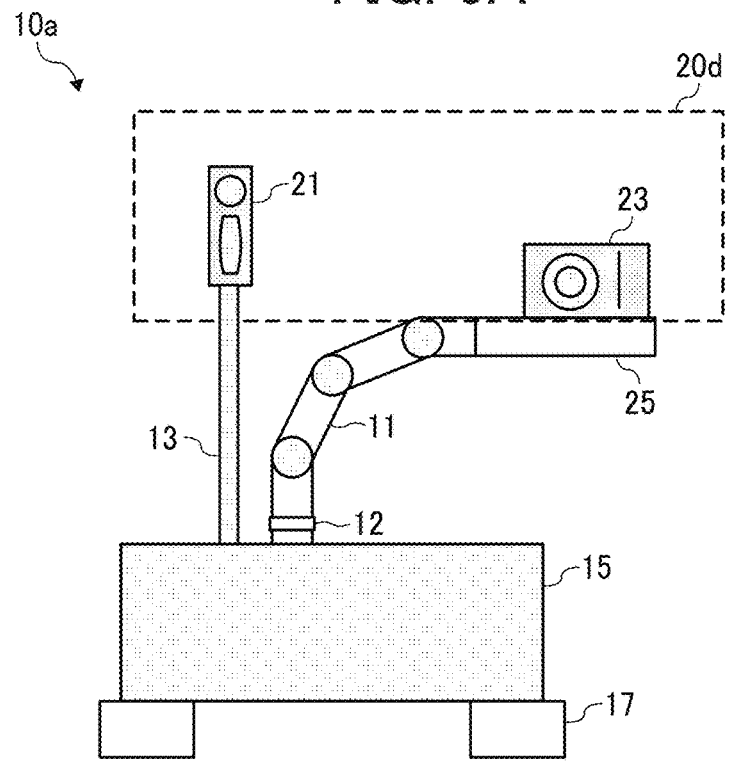
FIGS. 5A and 5B (FIG. 5) illustrate another example of schematic configurations of a robot of variant example 2-1 according to an embodiment.

As to a robot 10a illustrated in FIG. 5A, the arrangement of the special imaging apparatus 21 in the image capture mechanism 20 differs from the configuration illustrated in FIG. 2. As to the robot 10a illustrated in FIG. 5A, the special imaging apparatus 21 is disposed on a support member 13 fixed to the housing 15. With this configuration, the special imaging apparatus 21 always faces the traveling direction of the robot 10, with which the operator who operates the robot 10 can operate the robot 10 easily by viewing the hill-view spherical image acquired by the special imaging apparatus 21.

Figure 5B:
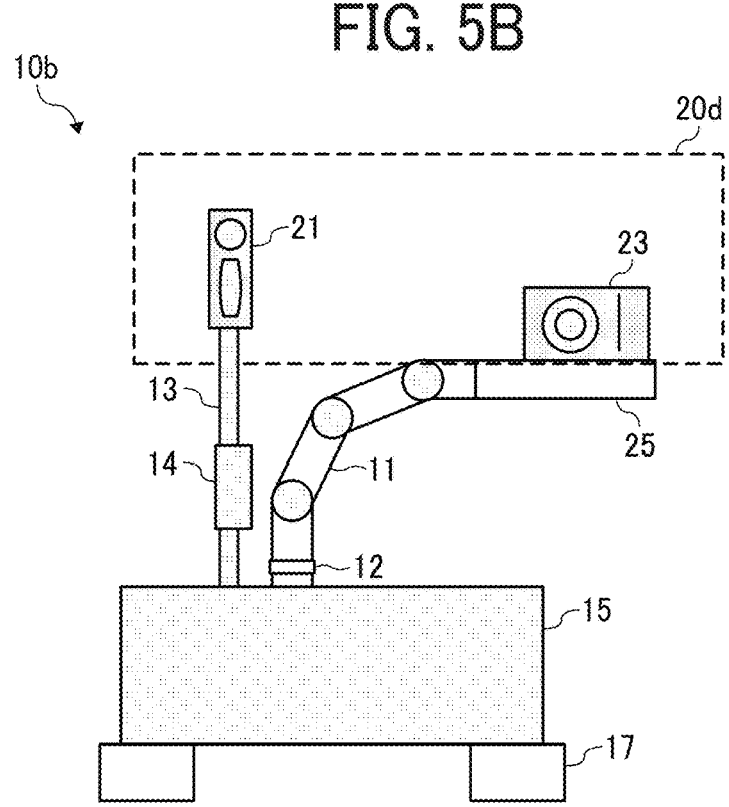

As to a robot 10b illustrated in FIG. 5B, the robot 10b includes a telescopic member 14 capable of extending and contracting the support member 13 of the robot 10a illustrated in FIG. 5A. As to the robot 10b illustrated in FIG. 5B, the height of the special imaging apparatus 21 can be adjusted by extending and contracting the support member 13 using the telescopic member 14. With this configuration, the height of the special imaging apparatus 21 can be set higher by extending the support member 13, with which images of objects surrounding the robot 10b can be captured by the special imaging apparatus 21 from the far distance, and the height of the special imaging apparatus 21 can be set lower by contracting the support member 13, with which the special imaging apparatus 21 can capture images of the ground (foot area) while the robot 10b moves, and thereby the operation and processing can be performed flexibly. The support member 13 illustrated in FIGS. 5A and 5B can be a pole fixed to the housing 15 or a pedestal fixed to the housing 15.

As to a robot 10c illustrated in FIG. 6A, a mask 27 imitating a human face is disposed near the special imaging apparatus 21. The mask 27 can rotate about the support member 13 so that the direction of the full-view spherical image acquired by the special imaging apparatus 21 can be seen on the display terminal 50 displaying the full-view spherical image. With this configuration, the direction that the operator of the robot 10 is seeing using the full-view spherical image displayed on the display terminal 50 can be informed to persons around the robot 10 by the direction of the mask 27. If this configuration is not used, persons around the robot 10 feel very uncomfortable and stressful because persons do not know whether they are seen or not by the robot 10. If the robot 10c provided with the mask 27 is used, persons around the robot 10 can feel sense of peace of mind because the direction not facing the mask 27 is not seen by the robot 10.

Figure 6:
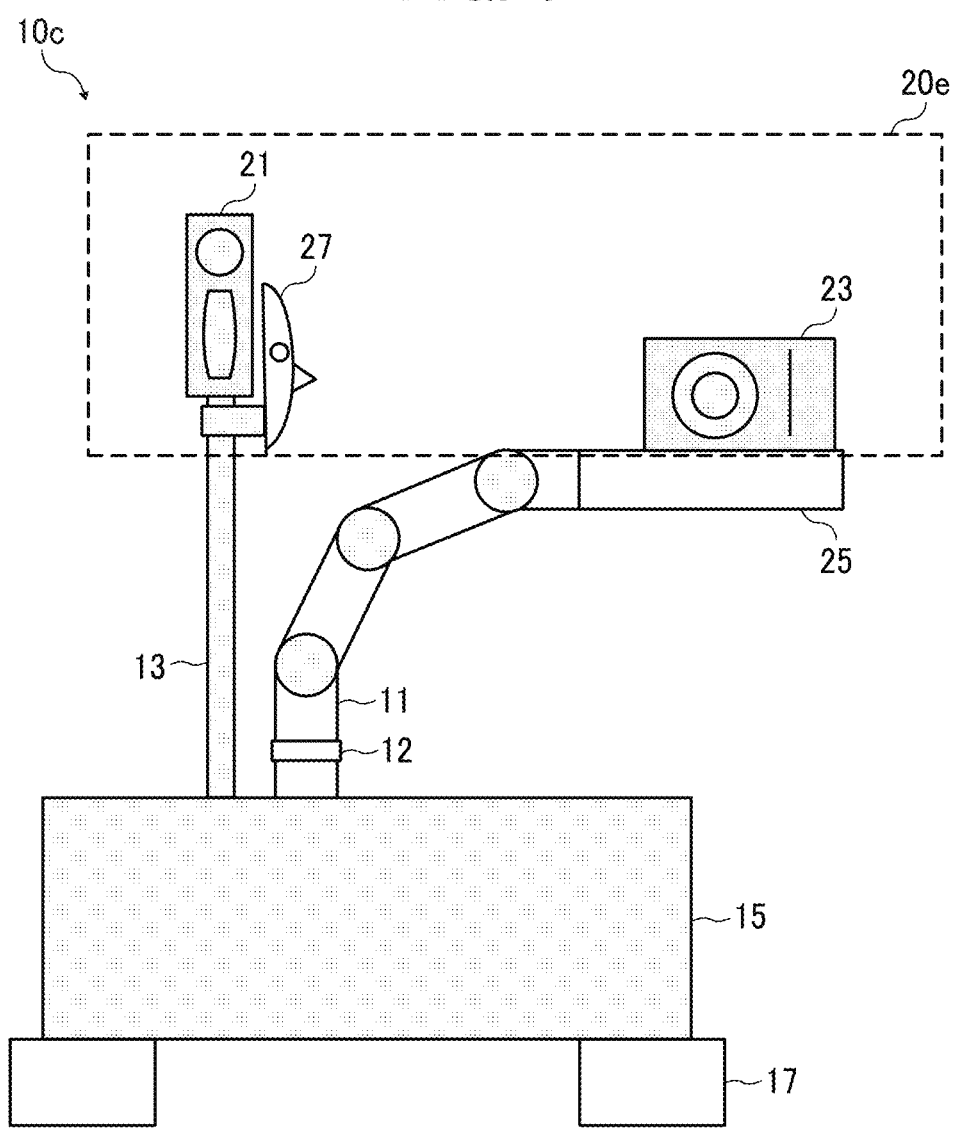
FIG. 6 illustrates another example of a schematic configuration of a robot of variant example 2-2 according to an embodiment.

In FIG. 6, the configuration disposing the mask 27 in the robot 10c is described, but not limited thereto. For example, the robot 10c can employ a configuration disposing a lamp arranged in a circular shape or a spherical shape with respect to the traveling direction of the robot 10c, or a direction display marker, in which the direction that the operator of the robot 10 is seeing can be informed to persons around the robot 10c using a light-ON of the lamp or a lighting pattern of the lamp indicating the direction that the operator of the robot 10 is seeing.

Figure 7:
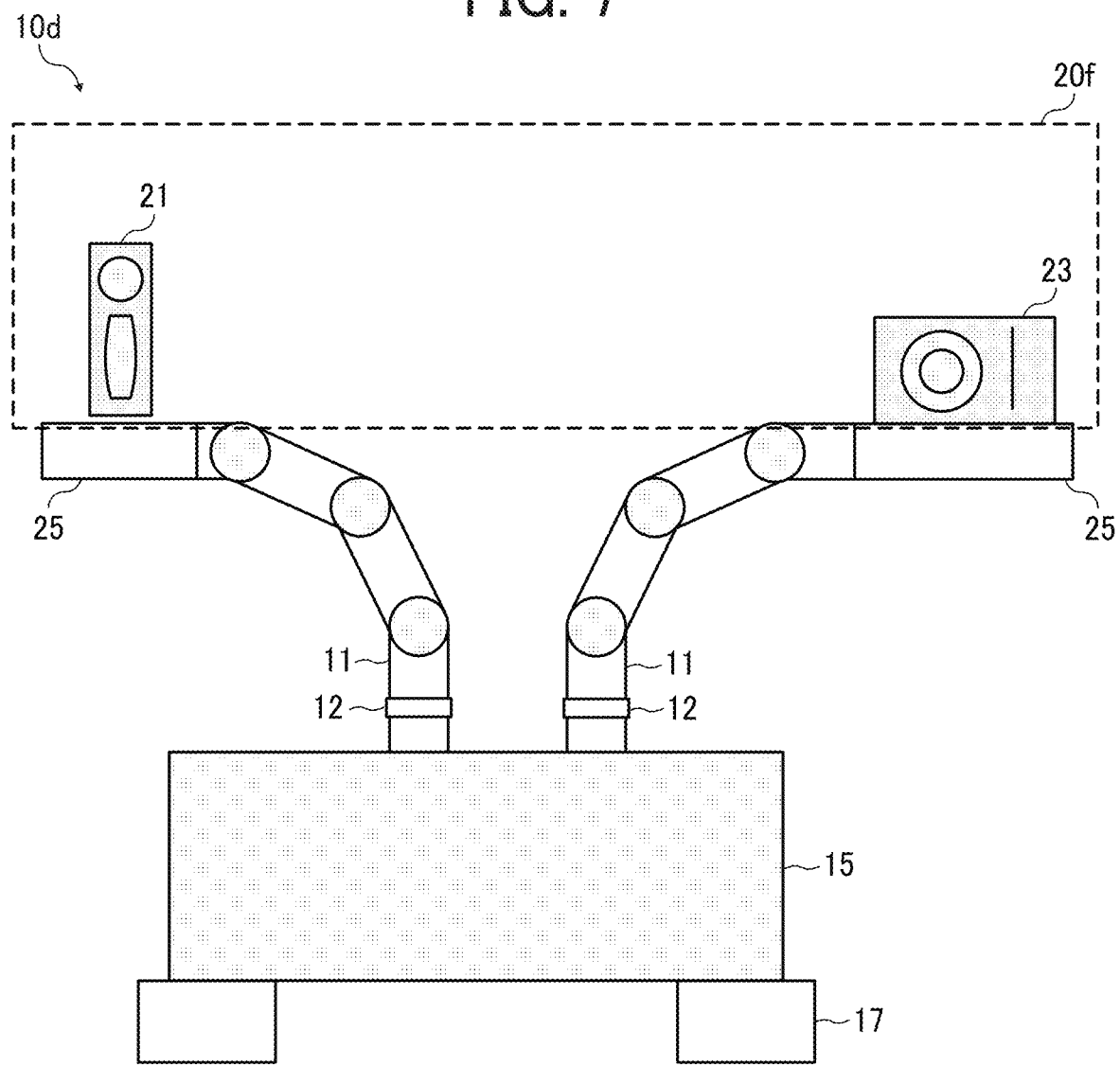
FIG. 7 illustrates another example of a schematic configuration of a robot according of variant example 3 according to an embodiment.

Variant Example 3 of Robot:

Hereinafter, a description is given of a configuration of the robot 10 of variant example 3 with reference to FIG. 7. As to a robot 10d illustrated in FIG. 7, the special imaging apparatus 21 and the general imaging apparatus 23 are disposed on different manipulation arms 11, respectively. With this configuration, the robot 10d can perform the imaging by the special imaging apparatus 21 from an appropriate position by transforming the manipulation arm 11 disposing the special imaging apparatus 21, and the robot 10d can perform the imaging by the general imaging apparatus 23 at a portion required to be checked in further detail by transforming the manipulation arm 11 disposing the general imaging apparatus 23. It should be noted that the types of robot of the embodiment can include any type of robots, such as industrial robots, domestic robots, medical robots, service robots, military robots, space robots, drones, or the like that can travel in any environment, such as land, air, sea, and underwater depending on application fields of the robots.

Full-View Spherical Image:

Hereinafter, a description is given of an example of a full-view spherical image acquired by the special imaging apparatus 21 with reference to FIGS. 8 to 12. In this description, it is assumed that a plurality of imaging units, each configured with an image capture device and a lens, is provided in the special imaging apparatus 21. For example, an image capture unit F is provided at the front side of the special imaging apparatus 21, and an image capture unit B is provided at the rear side of the special imaging apparatus 21.

At first, with reference to FIGS. 8 and 9, a description is given of an outline of the process until an equire—projection image EC and a full-view spherical image CE are created from the images captured by the special imaging apparatus 21.

Figure 8A:
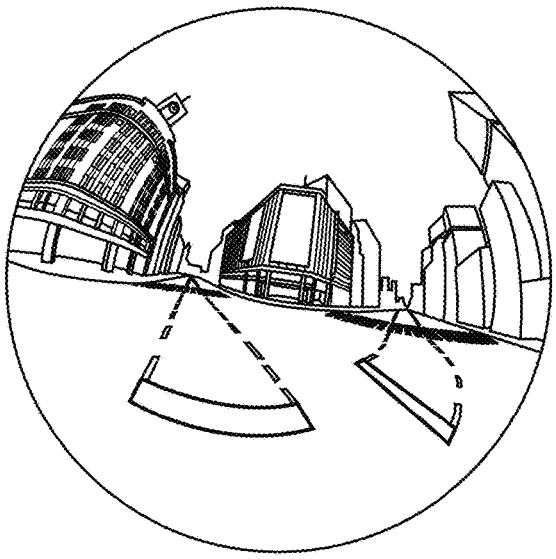
FIG. 8A illustrates an example of a hemispherical image (at front side) captured by a special imaging apparatus.
Figure 8B:
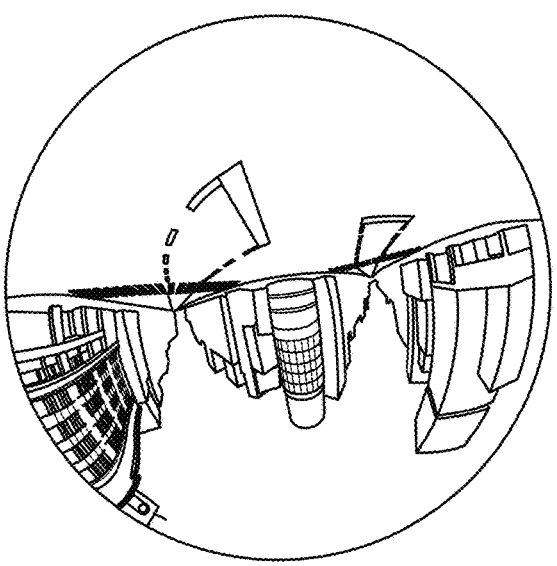
FIG. 8B illustrates an example of a hemispherical image (at rear side) captured by the special imaging apparatus.
Figure 8C:
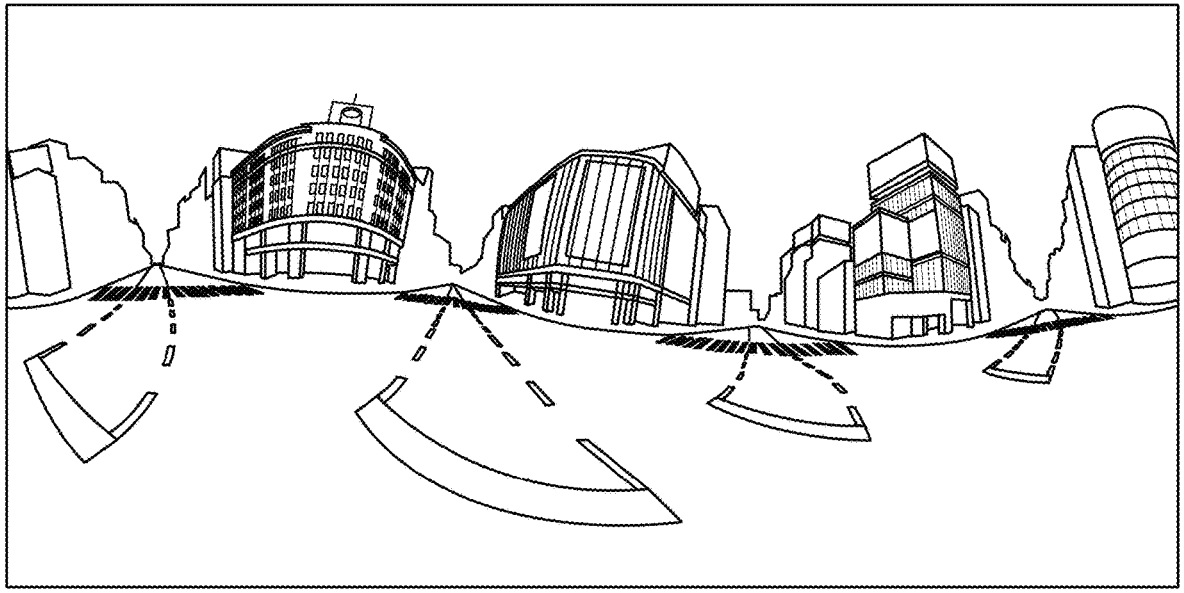
FIG. 8C illustrates an example of an image expressed by the equirectangular projection method.

FIG. 8A illustrates an example of a hemispherical image (at front side) captured by the special imaging apparatus 21. FIG. 8B illustrates an example of a hemispherical image (at rear side) captured by the special imaging apparatus 21, and FIG. 8C illustrates an example of an image expressed by the equirectangular projection method (hereinafter, referred to as equirectangular projection image EC). FIG. 9A is a conceptual diagram illustrating a state in which a sphere is covered with the equirectangular projection image EC, and FIG. 9B illustrates an example of the full-view spherical image CE.

As illustrated in FIG. 8A, the image acquired by the image capture unit F provided on the front side of the special imaging apparatus 21 becomes a curved hemispherical image (front side). Further, as illustrated in FIG. 8B, the image acquired by the image capture unit B provided on the rear side of the special imaging apparatus 21 becomes a curved hemispherical image (rear side). Then, the special imaging apparatus 21 synthesize the hemispherical image (front side) and the half-sphere image (rear side) inverted by 180 degrees to create the equirectangular projection image EC illustrated in FIG. 8C.

Then, the special imaging apparatus 21 uses Open Graphics Library for Embedded Systems (OpenGL ES) to attach the equirectangular projection image by covering the sphere as illustrated in FIG. 9A and creates the full-view spherical image CE as illustrated in FIG. 9B. Thus, the full-view spherical image CE is represented as an image in which the equirectangular projection image EC is directed toward the center of the sphere. The OpenGL ES is a graphics library used for visualizing 2D (2-dimensions) data and 3D (3-dimensions) data. Further, the full-view spherical image CE can be a still image or a video image.

As described above, since the full-view spherical image CE is an image which is attached to cover the spherical surface, humans may be puzzled hen the human sees the image. Therefore, the special imaging apparatus 21 can display an image of a part specific region) of the full-view spherical image CE (hereinafter referred to as a "specific region image") as a planar image having less curvature on a specific display, with which the image not causing puzzlement to the human can be displayed. This will be described with reference to FIGS. 10 and 11.

FIG. 10 illustrates a position of a virtual camera IC and a position of a specific region when a full-view spherical image corresponds to a three-dimensional stereoscopic sphere CS. The virtual camera IC corresponds to a position of a user viewing the full-view spherical image CE displayed as the three-dimensional stereoscopic sphere CS.

Figure 11A:
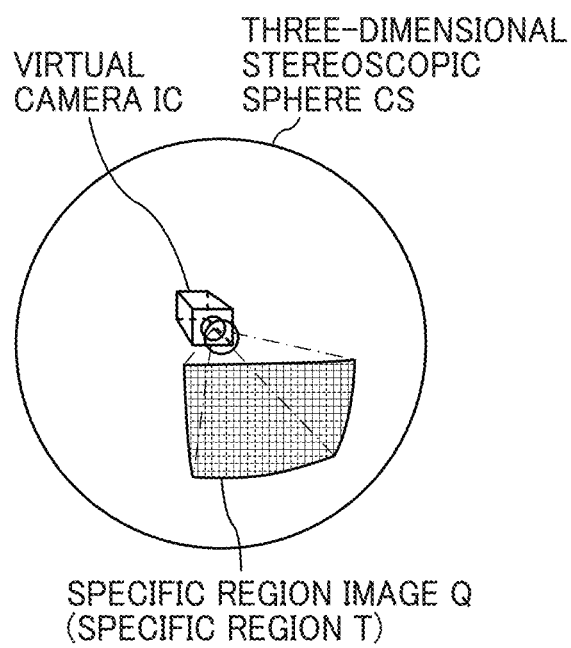
FIG. 11A is a perspective view of a virtual camera and a three-dimensional stereoscopic sphere of FIG. 10.
Figure 11B:
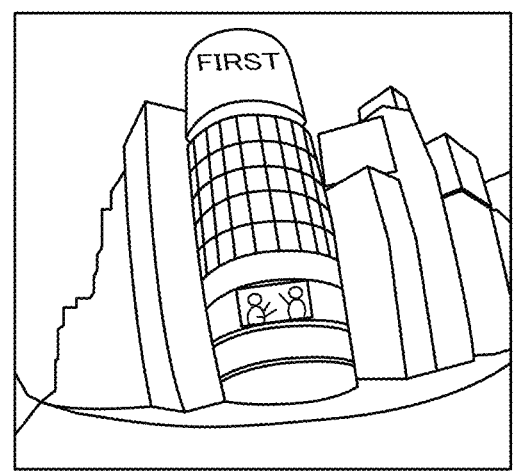
FIG. 11B illustrates an example of a specific region image when displayed on a display of a display terminal.

Further, FIG. 11A is a perspective view of the virtual camera IC and the three-dimensional stereoscopic sphere CS of FIG. 10, and FIG. 11B illustrates an example of a specific region image when displayed on the display. Further, FIG. 11A illustrates the full-view spherical image CE of FIG. 9 as the three-dimensional stereoscopic sphere CS. If the generated full-view spherical image CE is the stereoscopic sphere CS, as illustrated in FIG. 10, the virtual camera IC is set inside the full-view spherical sphere image CE. A specific region T in the full-view spherical image CE is an image capture region of the virtual camera IC. The specific region T can be specified by specific region information indicating the image capture direction and the angle of view of the virtual camera IC in a three-dimensional virtual space including the full-view spherical image CE.

Then, a specific region image Q indicated in FIG. 11A is displayed as an image of the image capture region of the virtual camera IC on a specific display as illustrated in FIG. 11B. The image illustrated in FIG. 11B is the specific region image represented by the specific region information set as the initial setting (default). Hereinafter, a description is given using the image capture direction (ea, aa) and the angle of view ($\alpha$) of the virtual camera IC.

Figure 12:
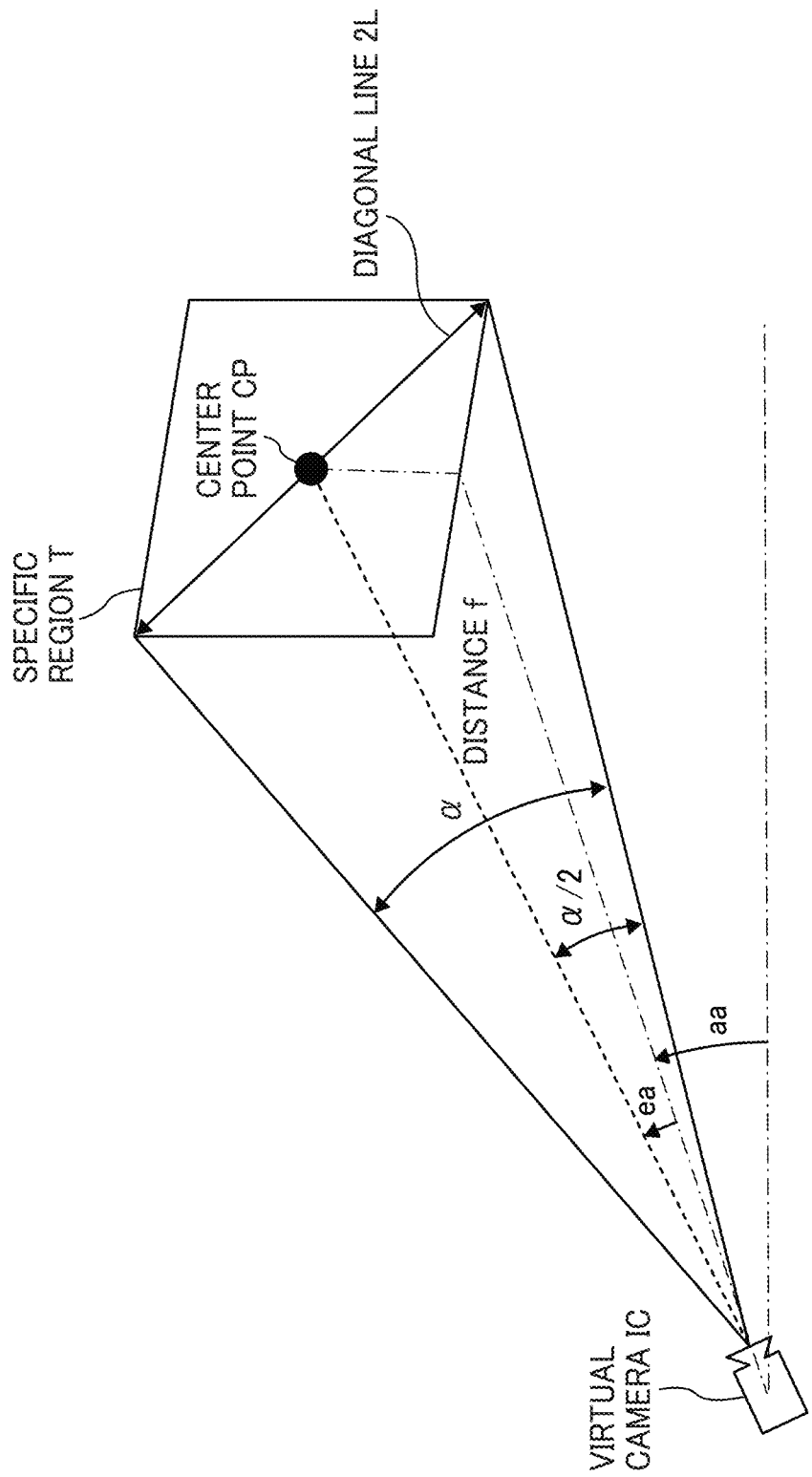
FIG. 12 illustrates a relationship between specific region information and an image of a specific region.

With reference to FIG. 12, the relationship between the specific region information and the image of the specific region T is described. FIG. 12 illustrates a relationship between the specific region information and an image of the specific region T. In FIG. 12, "ea" indicates "elevation angle," "aa" indicates "azimuth angle," and "$\alpha$" indicates "angle of view (Angle)." That is, the posture of the virtual camera IC is changed such that the point of interest of the virtual camera IC indicated by the image capture direction (ea, aa) becomes the center point CP of the specific region T, which is the image capture region of the virtual camera IC. The specific region image Q is an image of the specific region T in the full-view spherical image CE. In FIG. 12 "f"

denotes a distance from the virtual camera IC to the center point CP. "L" is a distance between a vertex and the center point CP of the specific region T (2L is a diagonal line of the specific region T). In FIG. 12, the triangle function represented by the following [Math. 1] is satisfied.

$$L/f=\tan(\alpha 2) \quad \text{[Math. 1]}$$

Hardware Configuration

Hereinafter, a description is given of a hardware configuration of the robot 10, the display terminal 50 and the management server 90 according to the embodiment with reference to FIGS. 13 to 15. The hardware configuration illustrated in FIGS. 13 to 15 may have a similar configuration in each embodiment, and the components may be added or deleted if necessary.

Hardware Configuration of Robot:

At first, a hardware configuration of the robot 10 is described with reference to FIG. 13. FIG. 13 illustrates an example of a hardware block diagram of the robot 10 according to the embodiment. As to the hardware block diagram illustrated in FIG. 13, components can be added or deleted as needed. The robot 10 includes, for example, the control device 30 that controls the processing or operation of the robot 10. As described above, the control device 30 can be provided inside the housing 15 of the robot 10. Further, the control device 30 can be provided outside the housing 15 of the robot 10 or can be provided as a separate device from the robot 10. The control device 30 is an example of an information processing apparatus.

Figure 13:
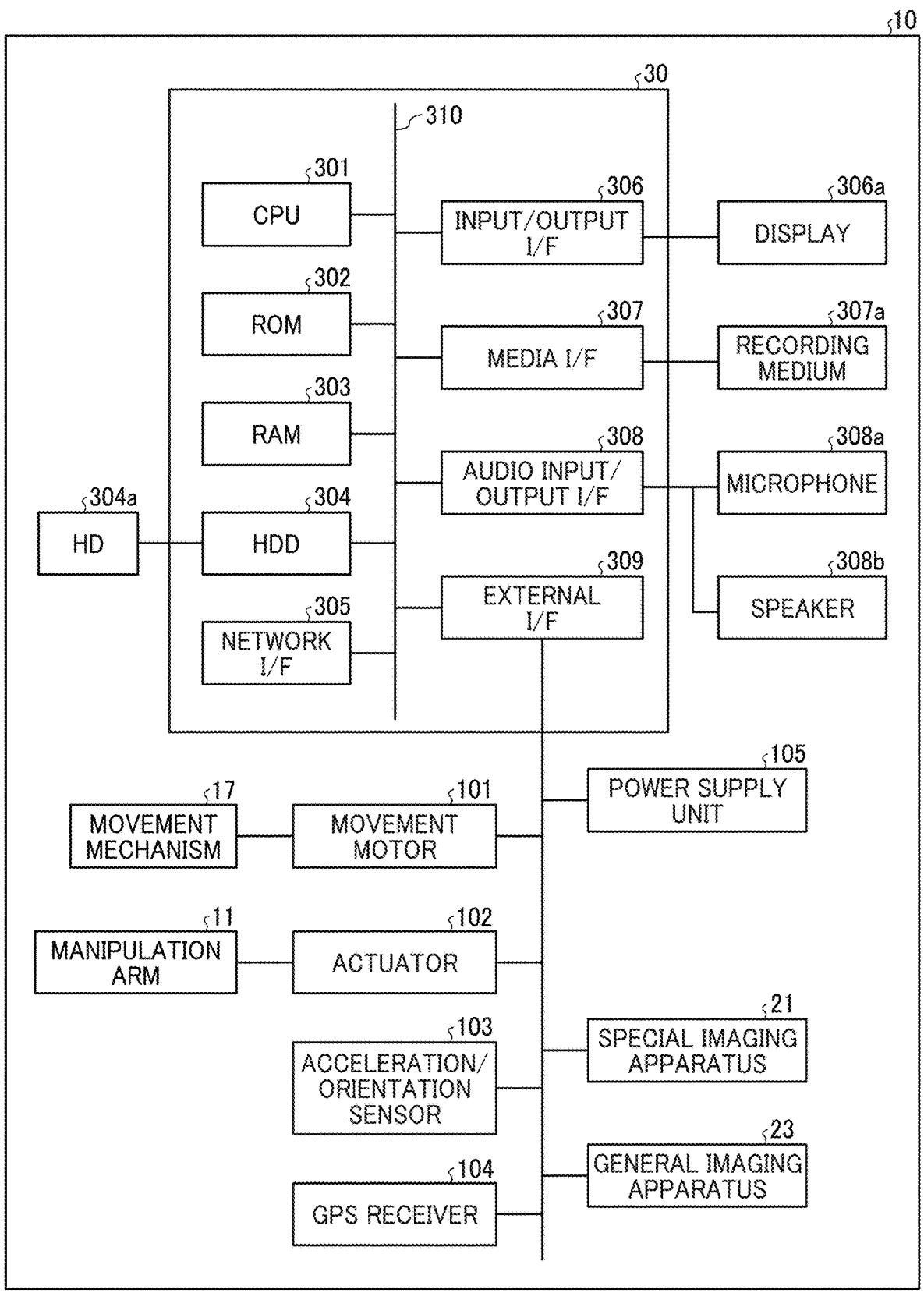
FIG. 13 illustrates an example of a hardware block diagram of a robot according to an embodiment.

As illustrated in FIG. 13, the control device 30 includes, for example, a central processing Unit (CPU) 301, a read only memory (ROM) 302, a random access memory (RAM) 303, a hard disk drive (HDD) 304, a network interface (I/F) 305, an input-output I/F 306, a media I/F 307, an audio input/output I/F 308, an external I/F 309, and a bus line 310.

The CPU 301 controls the robot 10 entirely. The CPU 301 is a computing device that reads programs or data stored in the ROM 302 or the hard disk (HD) 304a, and executes the processing to implement the respective functions of the robot 10. The remote-control system 1a can implement an output control method according to the embodiment by executing some or all of programs according to the embodiment using the CPU 301.

The RAM 303 is a volatile memory used as a working memory and of the CPU 301. The ROM 302 is a non-volatile memory that can retain programs or data even when the power supply is turned off. The HDD 304 controls reading and writing of various data to the HD 304a under the control of the CPU 301. The HD 304a stores various kinds of data such as programs.

The network I/F 305 is a communication interface that communicates (connects) with the display terminal 50 via the communication network 9. The network I/F 305 is a communication interface, such as a wired or a wireless local area network (LAN). Further, the network I/F 305 can also include a communication interface, such as 3G (3rd Generation), LTE (Long Term Evolution), 4G (4th Generation), 5G (5th Generation), Zigbee (registered trademark), BLE (Bluetooth (registered trademark) Low Energy), and millimeter wave radio communication interface.

The input/output I/F 306 is an interface for inputting and outputting text, numbers, various instructions, and the like with various external devices and the like. The input/output I/F 306 controls display of various information, such as a cursor, a menu, window, text, and images on a display 306a, such as liquid crystal display (LCD). The display 306a can be a touch panel display having an input unit. In addition to the display 306a, the input/output I/F 306 can be connected to an input device, such as a mouse and a keyboard.

The media 307 controls reading and writing (storing) of data to a recording medium 307a, such as a universal serial bus (USB) memory, a memory card, an optical disk or a flash memory. The audio input/output I/F 308 is one or more circuits that processes audio signals input from the microphone 308a and output from the speaker 308b under the control of the CPU 301. The external I/F 309 is an interface for connecting the control device 30 with another device.

The bus line 310 is an address bus and a data bus for electrically connecting the above components, and transmits address signals, data signals, various control signals, and the like. The CPU 301, the ROM 302, the RAM 303, the HDD 304, the network I/F 305, the input/output I/F 306, the media I/F 307, the audio input/output I/F 308 and the external I/F 309 are connected to each other via the bus line 310.

Further, as illustrated in FIG. 13, the control device 30 is connected to a movement motor 101, an actuator 102, an acceleration/orientation sensor 103, a global positioning system (GPS) receiver 104, a power supply unit 105, and the above described special imaging apparatus 21 and the general imaging apparatus 23 via the external I/F 309.

Based on an instruction from the CPU 301, the movement motor 101 rotates the movement mechanism 17 to move the robot 10 on a surface, such as ground or floor. The actuator 102 transforms the manipulation arm 11 based on an instruction from the CPU 301. The acceleration/orientation sensor 103 includes sensors, such as an electronic magnetic compass for detecting the geomagnetism, a gyrocompass, and an acceleration sensor. The GPS receiver 104 receives GPS signals from GPS satellites. The power supply unit 105 is a unit for supplying a power required for the robot 10 entirely.

Hardware Configuration Display Terminal:

Hereinafter, a description is given of a hardware configuration of the display terminal 50 with reference to FIG. 14. FIG. 14 illustrates an example of a hardware block diagram of the display terminal 50 according to the embodiment. As illustrated in FIG. 14, the display terminal 50 includes, for example, a CPU 501, a ROM 502, a RAM 503, an electrically erasable programmable read-only memory (EEPROM) 504, an imaging element 505, a complementary metal oxide semiconductor (CMOS) sensor 505a, an acceleration/orientation sensor 506, a media I/F 507, and a GPS receiver 508.

The CPU 501 controls the operation of the display terminal 50 entirely. The CPU 501 is a computing device that reads programs and data stored in the ROM 502 onto the RAM 503, and executes the processing to implement the respective functions of the display terminal 50. The remote-control system 1a implements the output control method according to the embodiment of the present invention by executing some or all of the programs using the CPU 501.

The ROM 502 stores programs used for driving the CPU 501, such as the initial program loader (IPL) or the like. The RAM 503 is used as a working memory of the CPU 501. The EEPROM 504 reads or writes various data, such as a display terminal program, under the control of the CPU 501.

The CMOS sensor 505a captures an image of an object under the control of the CPU 501 to obtain image data of the object. The imaging element I/F 505 is one or more circuits, which controls the driving of the CMOS sensor 505a. The acceleration/orientation sensor 506 includes various sensors, such as an electronic magnetic compass for detecting geomagnetism, a gyrocompass, and an acceleration sensor. The media I/F 507 controls reading and writing (storing) of data to a recording medium 507a, such as the flash memory, or the like. The GPS receiver 508 receives GPS signals from the GPS satellites.

Figure 14:
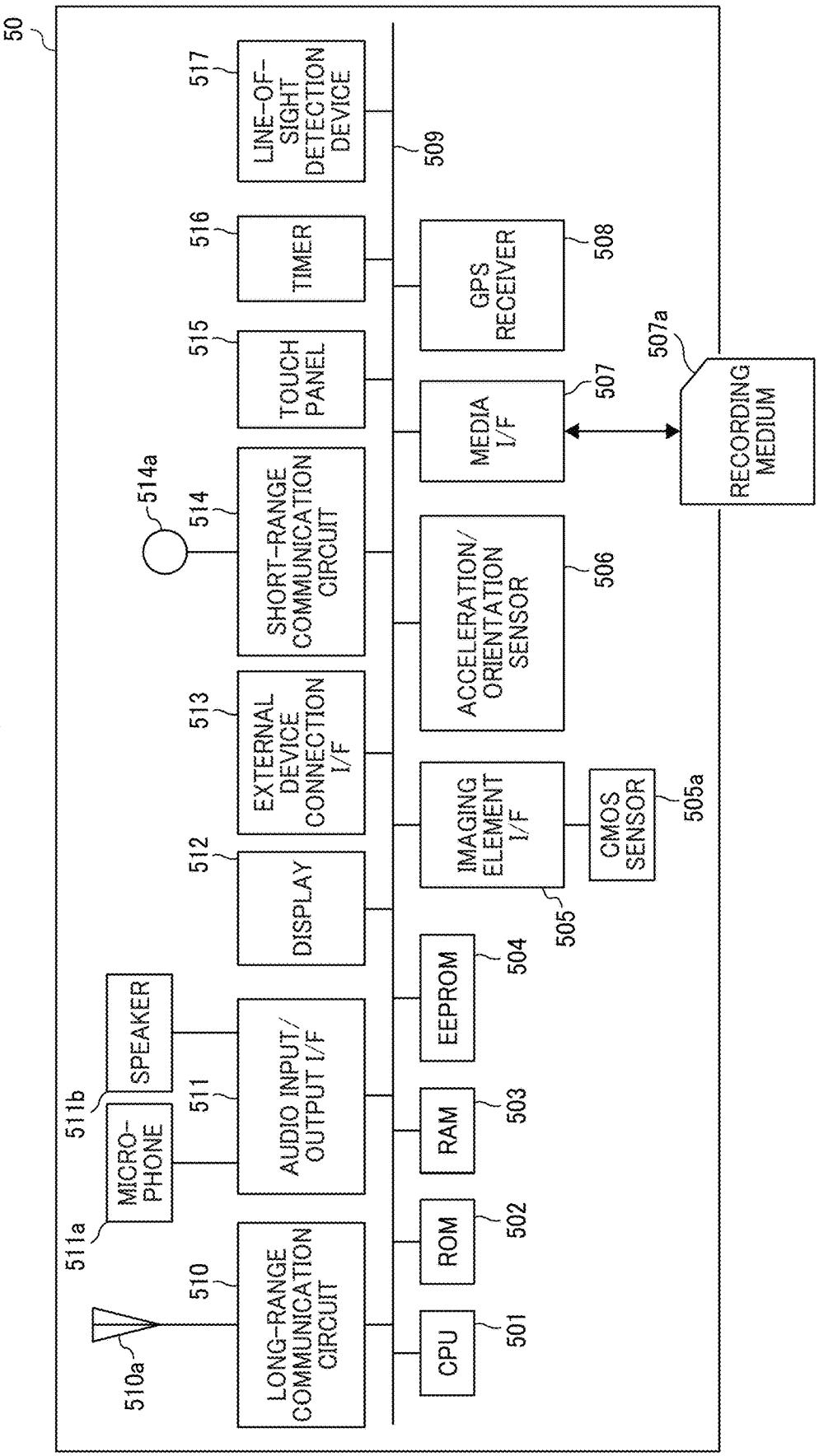
FIG. 14 illustrates an example of a hardware block diagram of a display terminal according to an embodiment.

Further, as illustrated in FIG. 14, the display terminal 50 includes, for example, a long-range communication circuit 510, an antenna 510a for the long-range communication circuit 510, an audio input/output I/F 511, a microphone 511a, a speaker 511b, a display 512, an external device connection I/F 513, a short-range communication circuit 514, an antenna 514a for the short-range communication circuit 514, a touch panel 515, a timer 516, and a line-of-sight detection device 517.

The long-range communication circuit 510 is one or more circuits, which communicates with another device via the communication network 9. The microphone 511a is, for example, a type of built-in audio collecting unit for inputting audio. The audio input/output I/F 511 is one or more circuits that processes audio signals input from the microphone 511a and output from the speaker 511b under the control of the CPU 501.

The display 512 is a type of display, such as a liquid crystal and an organic electro-luminescence (OEL) and the like, which can display images of objects and various icons. The external device connection I/F 513 is an interface for connecting the display terminal 50 with various external devices. The short-range communication circuit 514 is a communication circuit, such as near field communication (NFC), or Bluetooth. The touch panel 515 is a type of input unit for operating the display terminal 50 by the user when a portion of the display 512 is pressed. The timer 516 is a measurement device having a time measurement function. The timer 516 can be a software timer implemented by the computer. The line-of-sight detection device 517 continuously detects the position of the user's line-of-sight as line of sight information.

The line-of-sight detection device 517 includes, for example, an image processing device used for analyzing an image captured by the CMOS sensor 505a. For example, the line-of-sight detection device 517 detects the direction of the line of sight based on the positional relationship between the inner corner of the eye and the iris of the eye by setting the inner corner of the eye as the reference point.

The display terminal 50 further includes a bus line 509. The bus line 509 is an address bus and a data bus for electrically connecting each of the components, such as the CPU 501.

Hardware Configuration of Management Server: Hereinafter, a description is given of a hardware configuration of the management server 90 (control server) with reference to FIG. 15. FIG. 15 illustrates an example of a hardware block diagram of the management server 90 according to the embodiment. The management server 90 is, for example, a general computer used as the control server. As illustrated FIG. 15, the management server 90 includes, for example, a CPU 901, a ROM 902, a RAM 903, an HDD 905, a media I/F 907, a display 908, a network I/F 909, a keyboard 911, a mouse 912, a compact disc-rewritable (CD-RW) drive 914, a timer 915, and a bus line 910. Since the management server 90 functions as the control server, the management server 90 can omit some devices, such as an input device (e.g., keyboard 911, mouse 912) and an output device (e.g., display 908).

The CPU 901 controls the operation of the management server 90 entirely. The ROM 902 stores programs to be used for the driving the CPU 901. The RAM 903 is used as a working memory of the CPU 901. The HDD 905 controls reading and writing of various data to the HD 904 under the control of the CPU 901. The HD 904 stores various kinds of data, such as programs. The media I/F 907 controls data reading and writing (storing) to a recording medium 906, such as a flash memory.

The display 908 displays various information, such as a cursor, a menu, a window, text, and images. The network I/F 909 is an interface for performing data communication using the communication network 9. The keyboard 911 is one type of input unit equipped with a plurality of keys for inputting text, numerals, various instructions, and the like. The mouse 912 is a type of input unit for selecting and executing various instructions, selecting a process target object, moving a cursor, and the like. The CD-RW drive 914 controls reading of various data from the CD-RW 913, which is an example of a removable recording medium. The timer 915 is a measurement device having a time measurement function. The timer 915 can be a software timer implemented by the computer.

The management server 90 further includes a bus line 910. The bus line 910 is an address bus and a data bus for electrically connecting each component of the CPU 901 and the like illustrated in FIG. 15.

First Embodiment

Hereinafter, a description is given of a configuration of the remote-control system 1a according to the first embodiment with reference to FIGS. 16 to 38.

Figure 16A:
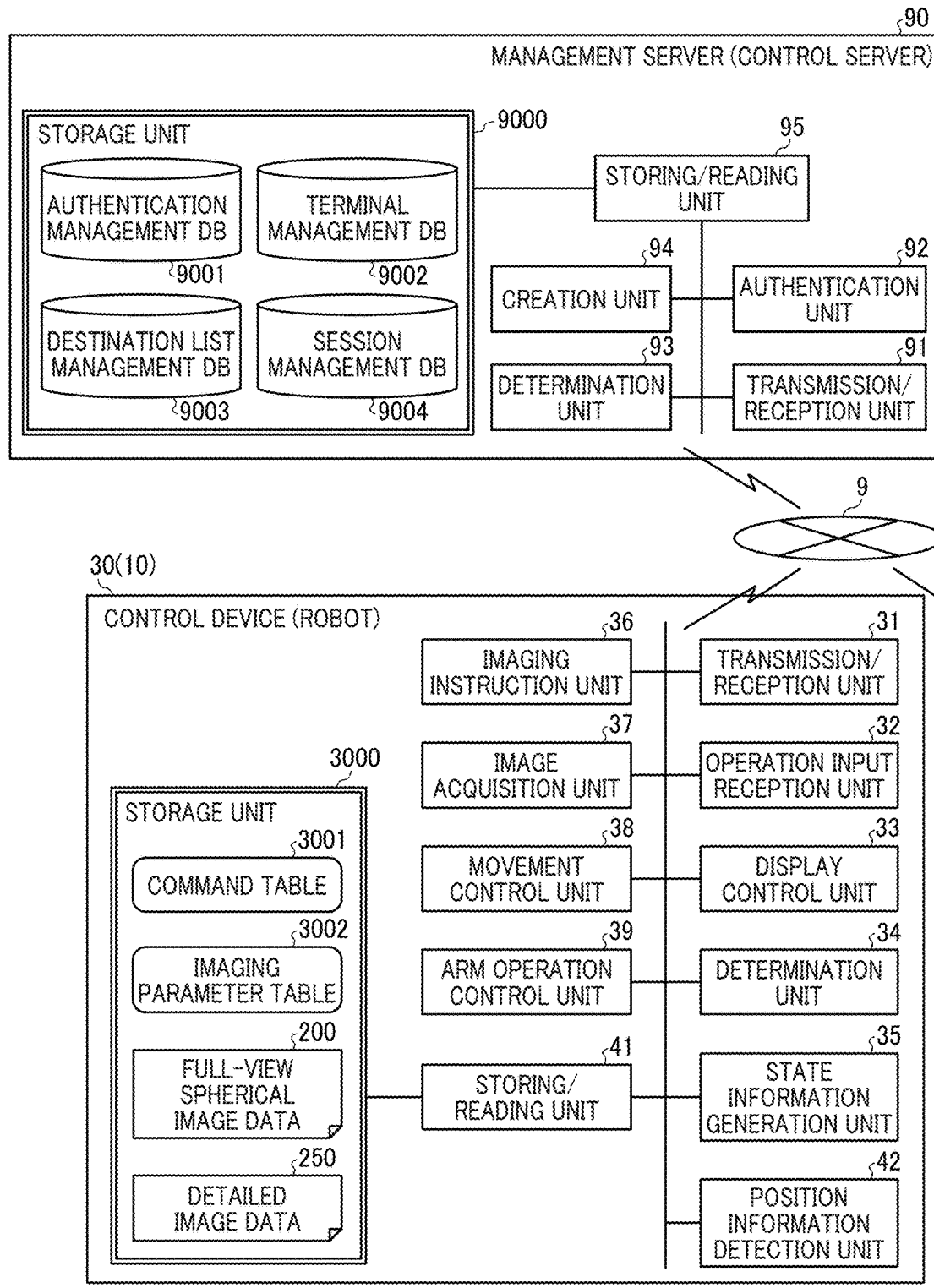
FIGS. 16A and 16B (FIG. 16) illustrate an example of a functional block diagram of a remote-control system according to a first embodiment.
Figure 16B:
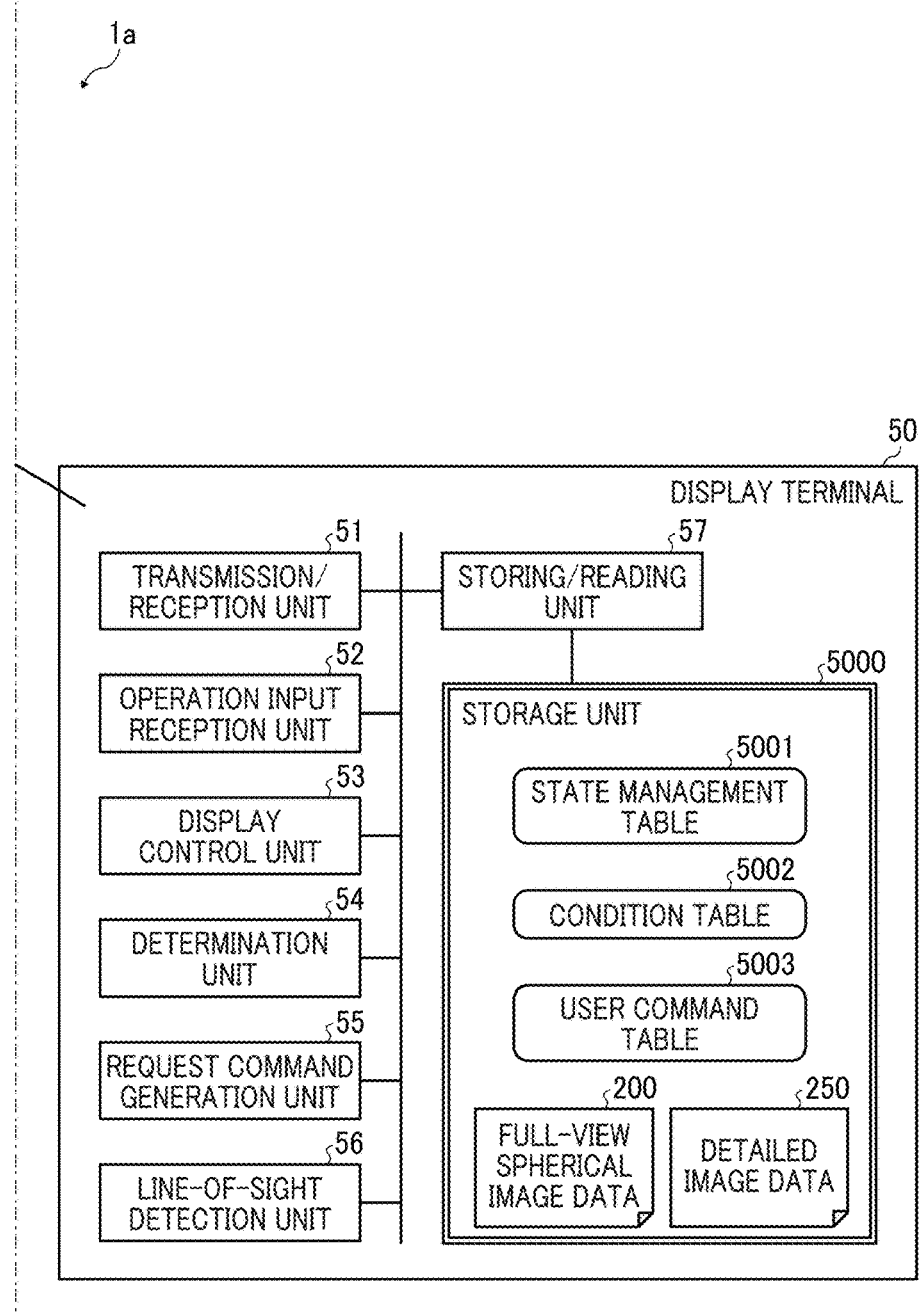

Functional Configuration:

At first, a functional configuration of the remote-control system 1a according to the first embodiment is described with reference to FIG. 16. FIGS. 16A and 16B (FIG. 16) illustrate an example of a functional block diagram of the remote-control system 1a according to the first embodiment.

Functional Configuration of Control Device:

At first, with reference to FIG. 16, a description is given of a functional configuration of the control device 30 that controls the processing or operation of the robot 10. The function implementable by the control device 30 includes, for example, a transmission/reception unit 31, an operation input reception unit 32, a display control unit 33, a determination unit 34, a state information generation unit 35, an imaging instruction unit 36, an image acquisition unit 37, a movement control unit 38, an arm operation control unit 39, a storing/reading unit 41, a position information detection unit 42, and a storage unit 3000.

The transmission/reception unit 31 transmits and receives various data or information to and from other device via the communication network 9. The transmission/reception unit 31 transmits, for example, the full-view spherical image data 200 or the detailed image data 250 acquired by the image acquisition unit 37 to the display terminal 50 via the communication network 9. The transmission/reception unit 31 is mainly implemented by the CPU 301 and the network I/F 305 of FIG. 13. The transmission/reception unit 31 is an example of a second transmission unit in this description.

The operation input reception unit 32 has a function that receives an operation input to an input unit, such as the display 306a. The operation input reception unit 32 is mainly implemented by the CPU 301 and the input/output I/F 306 of FIG. 13.

The display control unit 33 has a function of displaying various screens on the display 306a. The display control unit 33 is mainly implemented by the CPU 301 and the input/output I/F 306 of FIG. 13.

The determination unit 34 has a function of determining a process or an operation to be performed by the robot 10 in response to a request command transmitted from the display terminal 50. The determination unit 34 is mainly implemented by processing performed by the CPU 301 of FIG. 13.

The state information generation unit 35 generates state information 150 indicating a state of the robot 10, such as a movement state indicating whether or not the robot 10 is moving. The state information generation unit 35 generates and acquires the state information 150 indicating the state of the robot 10, such as movement state of the robot 10, based on a drive state of the movement mechanism 17 acquired from the movement control unit 38. The details of the state information 150 generated (acquired) by the state information generation unit 35 will be described later. The state information generation unit 35 is implemented mainly by the CPU 301 and the external I/F 309 of FIG. 13. The state information generation unit 35 is an example of a first acquisition unit in this description.

The imaging instruction unit 36 has a function of instructing the special imaging apparatus 21 and the general imaging apparatus 23 to perform the imaging process. For example, the imaging instruction unit 36 transmits to the special imaging apparatus 21, instruction information for instructing the imaging by the special imaging apparatus 21. Further, for example, the imaging instruction unit 36 transmits to the general imaging apparatus 23, instruction information for instructing the imaging by the general imaging apparatus 23. The imaging instruction unit 36 is implemented mainly by the CPU 301 and the external I/F 309 of FIG. 13.

The image acquisition unit 37 has a function of acquiring the full-view spherical image acquired by the special imaging apparatus 21 and the detailed image acquired by the general imaging apparatus 23. For example, the image acquisition unit 37 acquires the full-view spherical image data 200 of the full-view spherical image acquired by the special imaging apparatus 21 by capturing an image of an object, from the special imaging apparatus 21. Further, for example, the image acquisition unit 37 acquires the detailed image data 250 of the detailed image acquired by the general imaging apparatus 23 by capturing an image of a part or portion of the object, captured by the special imaging apparatus 21, from the general imaging apparatus 23. The image acquisition unit 37 is implemented mainly by the CPU 301 and the external I/F 309 of FIG. 13. The image acquisition unit 37 is an example of a second acquisition unit in this description.

The movement control unit 38 has a function of driving the movement mechanism 17 to control the movement of the robot 10. For example, the movement control unit 38 can move the robot 10 by controlling the driving of the movement mechanism 17 in response to a request command transmitted from the display terminal 50. The movement control unit 38 is mainly implemented by the CPU 301 and the external I/F 309 of FIG. 13.

The arm operation control unit 39 controls the operation of the manipulation arm 11. For example, the arm operation control unit 39 changes the direction or orientation of the manipulation arm 11 by transforming the manipulation arm 11 based on "ARM" command included in the request command transmitted from the display terminal 50. The arm operation control unit 39 is mainly implemented by the CPU 301 and the external I/F 309 of FIG. 13.

The position information detection unit 42 has a function of acquiring detection results, such as direction for each bearing (azimuth angle, magnetic north) detected by the acceleration/orientation sensor 103 and/or the GPS receiver 104. The detection result of the direction of each bearing is positional information indicating the position and orientation of the robot 10 at a specific time. The position information detection unit 42 is mainly implemented by the CPU 301 and the external I/F 309 of FIG. 13.

The storing/reading unit 41 has a function of storing various data in the storage unit 3000 or reading various kinds of data from the storage unit 3000. The storing/reading unit 41 is mainly implemented by processing performed by the CPU 301 of FIG. 13. The storage unit 3000 is mainly implemented by the ROM 302, the HD 304a, and the recording medium 307a of FIG. 13.

Further, the storage unit 3000 stores the full-view spherical image data 200 and the detailed image data 250 acquired by the image acquisition unit 37. Further, the storage unit 3000 stores, for example, a command table 3001 and an imaging parameter table 3002. The full-view spherical image data 200 and the detailed image data 250 stored in the storage unit 3000 can be deleted when a specific time elapses after the image acquisition unit 37 has acquired the image data, or can be deleted after the full-view spherical image data 200 and the detailed image data 250 have been transmitted to the display terminal 50.

Command Table:

Hereinafter, a description is given of the details of data stored in the storage unit 3000 with reference to FIGS. 17A and 17B (FIG. 17). FIG. 17A illustrates an example of the command table 3001 according to the first embodiment. The command table 3001 illustrated in FIG. 17A is used to specify the processing or operation to be performed by the robot 10 based on the request command transmitted from the display terminal 50. The command table 3001 respectively stores variables and processing contents corresponding to each one of commands, in association with each other. The determination unit 34 of the control device 30 specifies the processing corresponding to the request command transmitted from the display terminal 50 using the command table 3001.

For example, in the command table 3001, the processing corresponding to a command of "MOVE (variable L, R)" is a process of rotating a left wheel of the movement mechanism 17 for L° (L degrees) and rotating a right wheel of the movement mechanism 17 for R° (R degrees). Although the robot 10 is assumed to move using two independent left and right wheels, the same processing can be performed even if the movement mechanism 17 is a foot type or a single wheel as long as the movement mechanism 17 can move into a specific direction Imaging Parameter Table:

FIG. 117B illustrates an example of the imaging parameter table 3002 according to the first embodiment. The imaging parameter table 3002 (FIG. 17B) stores parameters setting image quality of the full-view spherical image captured by the special imaging apparatus 21. In the imaging parameter table 3002, each parameter is stored for each item defining the image quality of the full-view spherical image. For example, the image quality item includes the frame rate (frame per second (FPS), update frequency per second) and the resolution (RESOLUTION) of the full-view spherical image. The image quality item is not limited thereto, but the image quality item may include other items related to the quality of the full-view spherical image. The imaging instruction unit 36 of the control device 30 updates (changes) the parameters stored in the imaging parameter table 3002 every time the image quality of the full-view spherical image to be acquired by the special imaging apparatus 21 is changed.

Functional Configuration of Display Terminal:

Hereinafter, a description is given of a functional configuration of the display terminal 50 with reference to FIG. 1613. The functions implementable by the display terminal 50 includes, for example, a transmission/reception unit 51, an operation input reception unit 52, a display control unit 53, a determination unit 54, a request command generation unit 55, a line-of-sight detection unit 56, a storing/reading unit 57, and a storage unit 5000. The display terminal 50 is installed with one or more dedicated application programs for performing the remote control of the robot 10. For example, the display terminal 50 implements each of the functions by executing the installed application programs using the CPU 501.

The transmission/reception unit 51 transmits and receives various data or information to and from the other device via the communication network 9. For example, the transmission/reception unit 51 receives the full-view spherical image data 200 or the detailed image data 250 from the robot 10 (control device 30) via the communication network 9. Further, for example, the transmission/reception unit 51 transmits the state information 150 indicating the state of the robot 10 from the robot 10 (control device 30) via the communication network 9. Further, for example, the transmission/reception unit 51 transmits a request command generated by the request command generation unit 55 to the robot 10 (control device 30) via the communication network 9. Further, for example, based on the received state information 150, the transmission/reception unit 51 outputs a request command, which is a request for imaging to the general imaging apparatus 23 included in the robot 10. The transmission/reception unit 51 is mainly implemented by the CPU 501 and the long-range communication circuit 510 of FIG. 14. The transmission/reception unit 51 is an example of a first acquisition unit in this description. Further, the transmission/reception unit 51 is an example of a first reception unit in this description. Further, the transmission/reception unit 51 is an example of a first transmission unit in this description.

The operation input reception unit 52 has a function of receiving various selections or operations input to the display terminal 50. The operation input reception unit 52 is mainly implemented by the CPU 501 and the touch panel 515 of FIG. 14. It should be noted that the touch panel 515 may be shared with the display 512. Further, the operation input reception unit 52 can be implemented using an input unit other than the touch panel. The operation input reception unit 52 is an example of a reception unit in this description.

The display control unit 53 has a function of displaying various images on the display 512 of the display terminal 50. For example, the display control unit 53 instructs the display 512 to display the full-view spherical image data 200 or the detailed image data 250 received by the transmission/reception unit 51. Further, based on the state information 150 received (acquired) by the transmission/reception unit 51, the display control unit 53 switches the image data displayed on the display 512 between the full-view spherical image data 200 and the detailed image data 250. That is, the display control unit 53 outputs the full-view spherical image data 200 or the detailed image data 250 based on the state information 150 received (acquired) by the transmission/reception unit 51. The display control unit 53 is mainly implemented by the CPU 501 and the display 512 illustrated in FIG. 14. The display control unit 53 is an example of a display control unit in this description. Further, the display 512 is an example of a display unit in this description.

The determination unit 54 has a function of determining a specific process to be requested to the robot 10. For example, the determination unit 54 determines the specific process to be requested to the robot 10 based on an operation input received by the operation input reception unit 52. Further, the determination unit 54 determines the specific process to be requested to the robot 10 based on the state information 150 received (acquired) by the transmission/reception unit 51. The determination unit 54 is mainly implemented by processing performed by the CPU 501 of FIG. 14.

The request command generation unit 55 generates a request command to be requested to by the robot 10, which is a request for executing a specific process by the robot 10. For example, the request command generation unit 55 generates the request command, such as a request for imaging to be requested to the general imaging apparatus 23 included in the robot 10. Hereinafter, the request for imaging to be requested to the general imaging apparatus 23 is referred to as the imaging request. The request command generation unit 55 is mainly implemented by processing performed by the CPU 501 of FIG. 14.

The line-of-sight detection unit 56 detects the line of sight of an operator who operates the robot 10 using the display terminal 50. The line-of-sight detection unit 56 is mainly implemented by the CPU 501 and the line-of-sight detection device 517 of in FIG. 14.

The storing/reading unit 57 has a function of storing various data in the storage unit 5000 or reading various kinds of data from the storage unit 5000. The storing/reading unit 57 is mainly implemented by processing performed by the CPU 501 of FIG. 14. The storage unit 5000 is mainly implemented by the ROM 502, the EEPROM 504, and the recording medium 507a of FIG. 14.

Further, the storage unit 5000 stores the full-view spherical image data 200 and the detailed image data 250 received by the transmission/reception unit 51. The storage unit 5000 further stores, for example, a state management table 5001 (state control table), a condition table 5002, and a user command table 5003. Further, the full-view spherical image data 200 and the detailed image data 250 stored in the storage unit 5000 can be deleted when a given time elapses after receiving the data by the transmission/reception unit 51, or the full-view spherical image data 200 and the detailed image data 250 can be deleted based on a user's deletion instruction received by the operation input reception unit 52.

State Management Table:

Hereinafter, a description is given of contents of data stored in the storage unit 5000. FIG. 18 is an example of the state management table 5001 (state control table) according to the first embodiment. Specifically, the current state of the robot 10 can be stored in the state management table 5001 as illustrated in FIG. 18. For example, the state management table 5001 stores a value indicating the current movement state of the robot 10 for the traveling direction and the traveling velocity of the robot 10. The traveling direction of the robot 10 is specified or defined by the horizontal angle (H_ANGLE) and the vertical angle (V_ANGLE). Each time the robot 10 moves, the display terminal 50 updates (changes) values of each item included in the state management table 5001. Specifically, the storing/reading unit 57 of the display terminal 50 updates the contents of the state management table 5001 based on the state information 150 (see FIG. 28) received by the transmission/reception unit 51.

Condition Table:

FIG. 19 is an example of the condition table 5002 according to the first embodiment. The condition table 5002 (FIG. 19) is used to specify the contents of processing or operation to be requested to the robot 10 based on the state information 150 received by the transmission/reception unit 51. The condition table 5002 stores, for example, conditions of the movement state of the robot 10 in association with contents of processing and contents of command, to be transmitted to the robot 10. For example, if the traveling velocity of the robot 10 becomes greater than 5.0 km ("SPEED>5 km/h"), the display terminal 50 specifies the processing content of "lowering the frame rate to 3" as the content of the processing and specifies "FPS(3)" as a command to be transmitted to the robot 10. In the condition table 5002, "RESOLUTION" is a command related to the resolution of the full-view spherical image, and "ZOOM" is a command related to a display range (output range) of the full-view spherical image. The conditions and/or the processing contents included in the condition table 5002 are not limited thereto, but can be modified, changed, added, and deleted appropriately by an operator or the like who operates the robot 10 using the display terminal 50.

User Command Table:

FIG. 20 is an example of the user command table 5003 according to the first embodiment. The user command table 5003 (FIG. 20) is used to specify the contents of processing or operation to be requested to the robot 10 based on an operation input received by the operation input reception unit 52. The user command table 5003 stores input commands corresponding to operation inputs received by the operation input reception unit 52 in association with respective corresponding processing content and corresponding type of processing.

Functional Configuration of Management Server:

Hereinafter, a description is given of a functional configuration of the management server 90 (control server) with reference to FIG. 16. The functions implementable by the management server 90 include, for example, a transmission/reception unit 91, an authentication unit 92, a determination unit 93, a creation unit 94, a storing/reading unit 95, and a storage unit 9000. To be described later, the storage unit 9000 includes an authentication management database (DB) 9001, a terminal management DB 9002, a destination list management DB 9003, and a session management DB 9004.

The transmission/reception unit 91 transmits and receives various data or information to and from other device via the communication network 9. The transmission/reception unit 91 is mainly implemented by the CPU 901 and the network I/F 909 of FIG. 15.

The authentication unit 92 performs authentication of a login requesting source (e.g., user, apparatus) based on a login request received by the transmission/reception unit 91. For example, the authentication unit 92 searches the authentication management DB 9001 of the storage unit 9000 using a terminal identification (ID) and a password included in the login request received by the transmission/reception unit 91 as a search key. Then, the authentication unit 92 performs the authentication of a terminal by determining whether or not the same set of terminal ID and password are stored in the authentication management DB 9001. The authentication unit 92 is mainly implemented by processing performed by the CPU 901 of FIG. 15.

The determination unit 93 has a function of determining whether the terminal ID of the display terminal 50 is managed in a session management table to be described later. The determination unit 93 is mainly implemented by processing performed by the CPU 901 of FIG. 15.

The creation unit 94 has a function of creating a session identification (ID) to be used for communication. The creation unit 94 is mainly implemented by processing performed by the CPU 901 of FIG. 15.

The storing/reading unit 95 stores various data in the storage unit 9000 or reads various kinds of data from the storage unit 9000. The storing/reading unit 95 is mainly implemented by processing performed by the CPU 901 of FIG. 15.

Figure 15:
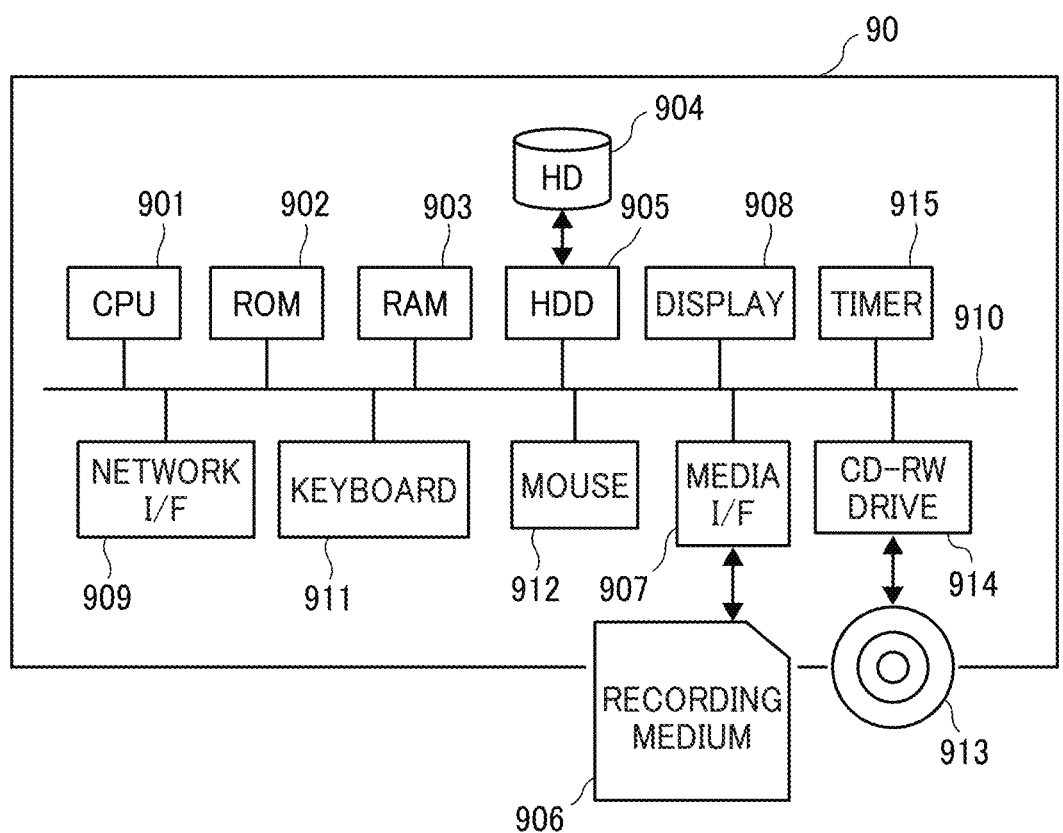
FIG. 15 illustrates an example of a hardware block diagram of a management server (control server) according to an embodiment.

The storage unit 9000 is mainly implemented by the ROM 902, the HD 904, or the recording medium 906 of in FIG. 15. Further, the storage unit 9000 stores destination list frame data used for a destination list screen 500 illustrated in FIG. 24 to be described later. The destination list frame data does not include destination list content information, such as icons, "rA01," and "robot 10A-1" indicated in FIG. 24.

Authentication Management Table:

The storage unit 9000 stores the authentication management DB 9001 (authentication control DB) including an authentication management table (authentication control table) illustrated in FIG. 21A. In the authentication management table, information associated with each password is managed for the respective terminal IDs of all of the display terminals 50 managed or controlled by the management server 90. For example, in the authentication management table illustrated in FIG. 21A, the terminal ID of the display terminal 50A is "o01" and the corresponding password is "aaaa."

Terminal Management Table:

The storage unit 9000 stores the terminal management DB 9002 (terminal control DB) including a terminal management table (terminal control table) illustrated in FIG. 21B. The terminal management table stores information related to the terminal ID of each terminal (e.g., robot 10, display terminal 50), such as terminal name of each terminal, internet protocol (IP) address of each terminal, operation state information indicating the current operation state of each terminal, and site name indicating a site where the robot 10 is located in a case that the terminal is the robot 10, which are stored in association with each other.

For example, in the terminal management table illustrated in FIG. 21B, the display terminal 50 having the terminal ID of "o01" has the terminal name of "display terminal 50A," the IP address of "1.2.1.3" and the operation state of "online (can communicate)." Further, the robot 10 having the terminal ID of "rA01" has the terminal name of "robot 10A-1," the IP address of "1.3.2.3," the operation state of "online (can communicate)" and the site name of "site A."

Destination List Management Table:

Further, the storage unit 9000 stores the destination list management DB 9003 (destination list control DB) including a destination list management table (destination list control table) illustrated in FIG. 22A. Specifically, the destination list management table stores information related to the terminal ID of the display terminal 50 and the terminal ID of the robot 10 (i.e., destination candidate, which are stored in association with each other. For example, the display terminal 50 is used as a starting terminal for requesting a start of communication for performing the remote control of the robot 10, and the robot 10 is registered as the destination candidate to be operated under the remote control performed from the display terminal 50.

For example, in the destination list management table illustrated in FIG. 22A, the destination candidate that the starting terminal (i.e., display terminal 50A) having the terminal ID of "o01" can request a start of communication includes the robot 10A-1 having the terminal ID of "rA01,"

the robot 10A-2 having the terminal ID of "rA02," and the robot 10C-1 having the terminal ID of "rC01." The terminal ID of the robot 10 settable as the destination candidate can be updated by adding or deleting the terminal ID of the robot 10 based on a request of adding or deleting the terminal ID of the robot 10 to the management server 90 from any starting terminal (e.g., display terminal 50).

Session Management Table:

Further, the storage unit 9000 stores the session management DB 9004 (session control DB) including a session management table (session control table) illustrated in FIG. 22B. The session management table includes the session ID and the terminal ID of the display terminal 50 and the robot 10, which are stored in association with each other. The session ID identifies a session used for communication between the robot 10 and the display terminal 50. The terminals ID of the robot 10 and the terminal ID of the display terminal 50 using a session, identified by the session ID, are associated with the session ID. For example, in the session management table illustrated in FIG. 22B, the terminal using the session performed by using the session ID of "se1" includes the display terminal 50a having the terminal ID of "o01," the robot 10A-2 having the terminal ID of "rA02," and the robot 10C-1 having the terminal ID of "rC01,"

Processing and Operation in First Embodiment:

Hereinafter, a description is given of operation and processing of the remote-control system 1a according to the first embodiment with reference to FIGS. 23 to 38. In the following description, the processing performed by the control device 30 included in the robot 10 will be described as the processing performed by the robot 10.

Figure 23:
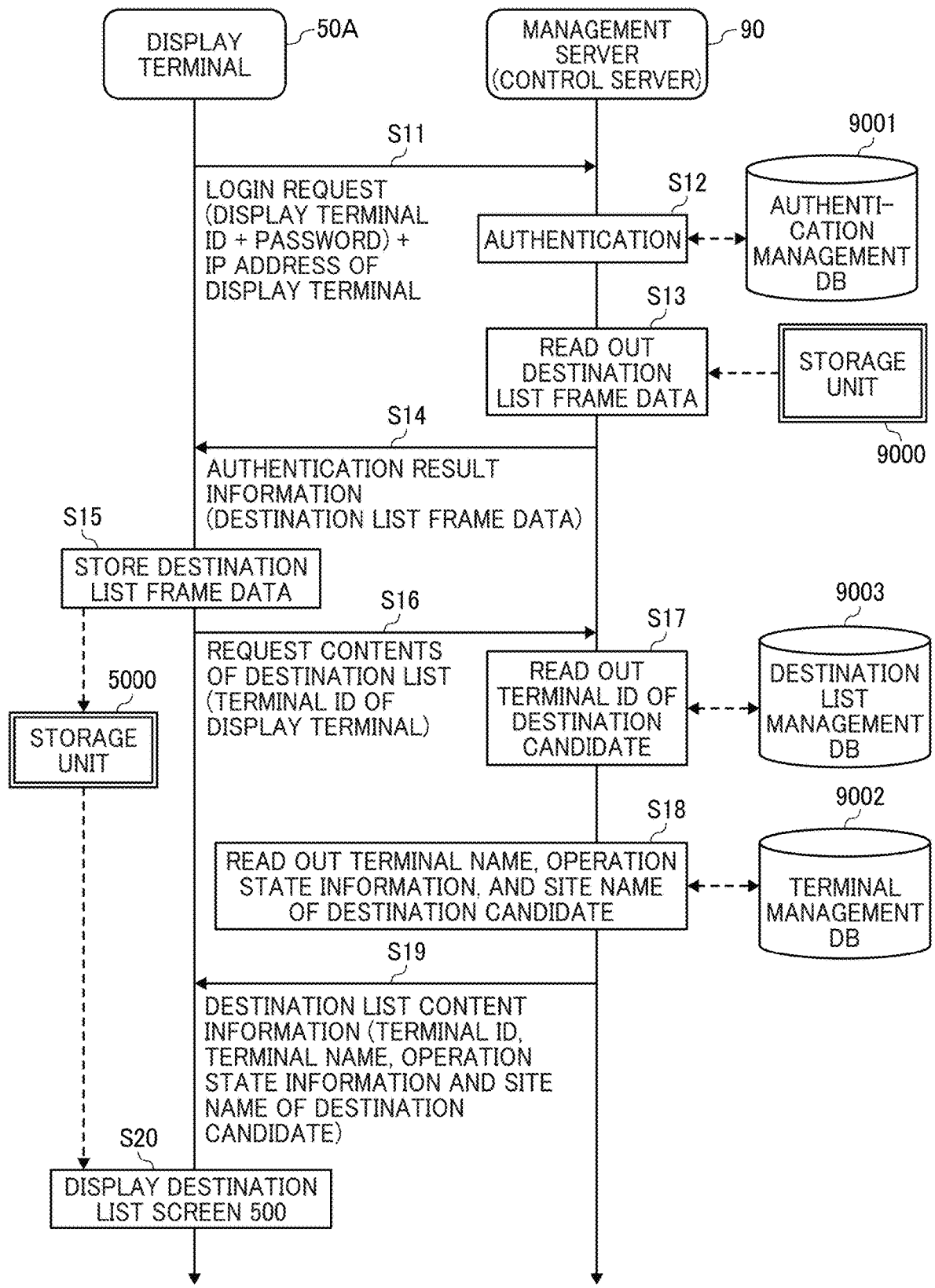
FIG. 23 is an example of a sequence diagram illustrating a preparatory stage for starting data transmission and reception between a robot and a display terminal.
Figure 25:
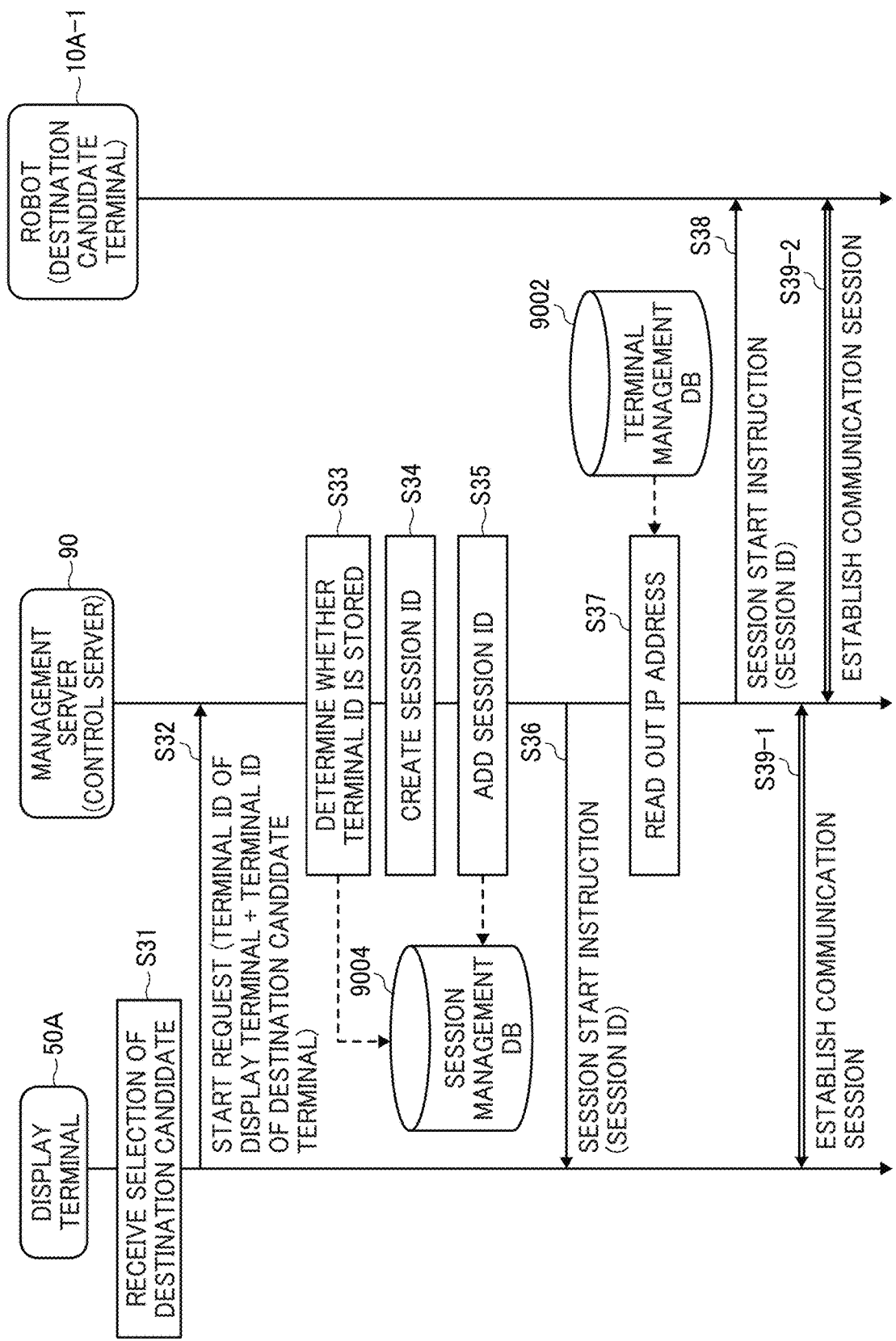
FIG. 25 is an example of a sequence diagram illustrating processing from selecting a destination candidate to starting transmission and reception of image data.

Processing of Session Establishment:

At first, a communication session establishment process between the robot 10 and the display terminal 50 is described with reference to FIGS. 23 to 25. FIG. 23 is an example of a sequence diagram illustrating a preparatory stage for starting data transmission and reception between the robot 10 and the display terminal 50. Hereinafter, a description is given of the transmission/reception processing for each management information in the preparatory stage before starting the data transmission/reception between the display terminal 50A, used as the starting terminal, and the robot 10A-1, used as the destination terminal.

At first, in step S11, the transmission/reception unit 51 of the display terminal 50A transmits a login request to the management server 90 via the communication network 9. Specifically, when a user of the display terminal 50A turns on the power switch (ON) of the display terminal 50A, the power supply is turned ON. In response to the turning on of the power supply, the transmission/reception unit 51 of the display terminal 50A transmits a login request to the management server 90 via the communication network 9. With this configuration, the transmission/reception unit 91 of the management server 90 receives the login request transmitted from the display terminal 50A.

The login request includes, for example, a terminal ID identifying the starting terminal such as the display terminal 50A and a password. The terminal ID and password are data, read by the storing/reading unit 57 from the storage unit 5000, and transmitted to the transmission/reception unit 51. The terminal ID and password are not limited thereto. For example, the terminal ID and password input by a user using the input unit such as the touch panel 515 can be transmitted. Further, the terminal ID and password read out from a storage medium such as a subscriber identity module (SIM) card or a secure digital (SD) card connected to the display terminal 50A can be transmitted.

Further, when the login request is transmitted from the display terminal 50A to the management server 90, the management server 90, which is a receiving side of the login request, can acquire the IP address of the display terminal 50A, which is a transmitting side of the login request. Further, the start of login request does not necessarily at the time of turning on the power switch (ON). For example, the login request can be transmitted in response to an input to the input unit such as the touch panel 515 by a user.

In step S12, the authentication unit 92 of the management server 90 searches the authentication management table (FIG. 21A) in the storage unit 9000 using the terminal ID and password included in the login request received via the transmission/reception unit 91 as a search key, and determines whether the authentication management DB 9001 stores the same terminal ID and the same password to perform the authentication. Hereinafter, a description is given of a case when the authentication unit 92 determines that the display terminal 50A is a terminal having a valid use authentication.

If the authentication unit 92 of the management server 90 determines that the login request is transmitted from the starting terminal having the valid use authentication based on the same terminal ID and the same password stored in the authentication management DB 9001 in step S12, in step S13, the storing/reading unit 95 reads out the destination list frame data from the storage unit 9000.

In step S14, the transmission/reception unit 91 transmits authentication result information indicating the authentication result determined by the authentication unit 92, to the display terminal 50 that has transmitted the login request, via the communication network 9. Then, the transmission/reception unit 51 of the display terminal 50 receives the authentication result information. The authentication result information includes the destination list frame data read out in step S13.

In step S15, the storing/reading unit 57 of the display terminal 50A stores the destination list frame data, received in step S14, in the storage unit 5000.

If the transmission/reception unit 51 of the display terminal 50A receives the authentication result information indicating the authentication result determining that the terminal 50A has the valid use authentication, in step S16, the transmission/reception unit 51 of the display terminal 50A requests contents of the destination list to the management server 90 via the communication network 9. Then, the transmission/reception unit 91 of the management server 90 receives a request of the contents of destination list. The request includes the terminal ID of the display terminal 50A.

In step S17, the storing/reading unit 95 of the management server 90 uses the terminal ID of "o01" of the display terminal 50A, received in step S16, as a search key to search the destination list management table (FIG. 22A) to read out the terminal ID of one or more of the corresponding destination candidates.

In step S18, the storing/reading unit 95 uses the terminal ID, read in step S17, as a search key to search the terminal management table (FIG. 21B) to read out the terminal name, operation state information, and site name of the corresponding destination candidate.

In step S19, the transmission/reception unit 91 of the management server 90 transmits the destination list content information to the display terminal 50A via the communication network 9. Then, the transmission/reception unit 51 of the display terminal 50A receives the destination list content information. The destination list content information includes, for example, the terminal ID of destination candidate, the terminal name of destination candidate, the operation state information of destination candidate, and the site name of destination candidate, read out in steps S17 and S18.

In step S20, the display control unit 53 of the display terminal 50A instructs the display 512 to display the destination list screen 500 FIG. 24), which is generated from the destination list frame data stored in the storage unit 5000 in step S15 and the destination list content information received in step S19.

The display 512 displays the destination list screen 500 as illustrated in FIG. 24. Specifically, the destination list screen 500 displays an icon indicating the operation state of the destination candidate terminal (e.g., robot 10), a terminal ID of the destination candidate terminal, a destination name of the destination candidate terminal, and a site name where the destination candidate terminal is located for each of the destination candidate terminals. The "terminal name" transmitted from the management server 90 in step S19 can be displayed as "destination name" in the destination list screen 500 illustrated in FIG. 24.

Hereinafter, a description is given of a process from selecting the destination candidate to starting the transmission/reception of image data using the display terminal 50 with reference to FIG. 25. FIG. 25 is an example of a sequence diagram illustrating processing from selecting the destination candidate (e.g., terminal, apparatus) to starting the transmission and reception of image data.

At first, in step S31, the operation input reception unit 52 of the display terminal 50A receives a selection of destination candidate (e.g., robot 10A-1) on the destination list screen 500 (FIG. 24) from a user.

In step S32, the transmission/reception unit 51 of the display terminal 50A transmits a start request indicating that the display terminal 50A is ready to start the transmission/reception of image data, to the management server 90. Then, the transmission/reception unit 91 of the management server 90 receives the start request from the display terminal 50A. The start request includes, for example, the terminal ID of the display terminal 50A and the terminal ID of the selected destination candidate.

In step S33, the determination unit 93 of the management server 90 determines whether the terminal ID of the display terminal 50A, received in step S32, is stored in the session management table (FIG. 22B) in the session management DB 9004. Hereinafter, a description is given of a case that the terminal ID of the destination candidate terminal (i.e., robot 10A-1) is not stored in the session management table in the session management DB 9004.

If the terminal ID of the destination candidate is not stored in the session management table, in step S34, the creation unit 94 of the management server 90 creates a new session ID.

In step S35, the storing/reading unit 95 additionally stores a new record in the session management table (FIG. 22B), in which the new session ID created in step S34, and the terminal ID of the display terminal 50A and the terminal ID of the destination candidate terminal, received in step S32, are associated with each other and stored as the new record. In this case, as illustrated in FIG. 22B, the session ID of "se3" and the terminal IDs of "o01" and "rA01" associated with each other are added and stored as the new record.

In step S36, the transmission/reception unit 91 of the management server 90 transmits a session start instruction including the session ID created in step S34 to the display terminal 50A. Then, the transmission/reception unit 51 of the display terminal 50A receives the session start instruction from the management server 90.

In step S37, the storing/reading unit 95 of the management server 90 searches the terminal management table (FIG. 21B) using the terminal ID of the destination candidate terminal (i.e., robot 10A-1), received in step S32, to read out the corresponding IP address of the destination candidate terminal from the terminal management table.

In step S38, the transmission/reception unit 91 of the management server 90 transmits a session start instruction including the session ID, created in step S34, to the IP address read out in step S37. Then, the transmission/reception unit 31 of the destination terminal (i.e., robot 10A-1) receives the session start instruction from the management server 90.

Then, each of the starting terminal (i.e., display terminal 50A) and the destination terminal (i.e., robot 10A-1) establishes a communication session with the management server 90 in steps S39-1 and S39-2.

Figure 26:
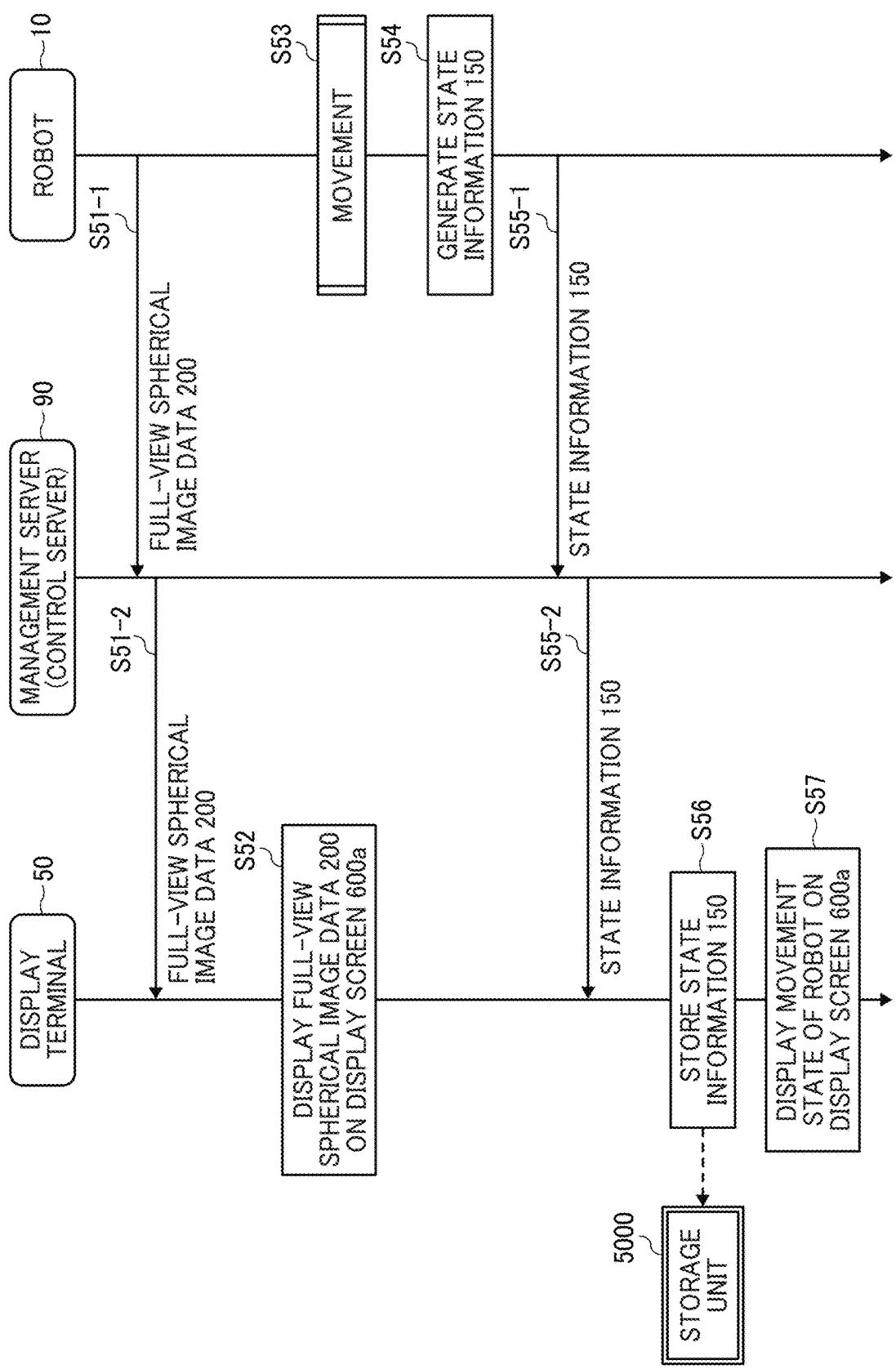
FIG. 26 is an example of a sequence diagram illustrating a transmission process of various data from a robot to a display terminal in a remote-control system according to a first embodiment.

Transmission and Display of Image Data:

Hereinafter, a description is given of data transmitted from the robot 10 to the display terminal 50 and controlling the processing or operation of the robot 10 using the display terminal 50 establishing the communication session with the management server 90. FIG. 26 is an example of a sequence diagram illustrating a transmission process of various data from the robot 10 to the display terminal 50 in the remote-control system 1a according to the first embodiment.

In steps S51-1 and S51-2, the transmission/reception unit 31 of the robot 10 transmits the full-view spherical image data 200 acquired by the special imaging apparatus 21 to the display terminal 50 using the communication session established with the management server 90. Then, the transmission/reception unit 51 of the display terminal 50 receives the full-view spherical image data 200 from the robot 10 via the management server 90.

In this case, the robot 10 starts the image capturing using the special imaging apparatus 21 based on an imaging instruction transmitted from the imaging instruction unit 36 to the special imaging apparatus 21 as a trigger. The image acquisition unit 37 of the robot 10 acquires the full-view spherical image data 200, which is the full-view spherical image acquired by the special imaging apparatus 21, from the special imaging apparatus 21. Then, the transmission/reception unit 31 of the robot 10 transmits the full-view spherical image data 200 acquired by the image acquisition unit 37 to the display terminal 50 via the management server 90.

In step S52, the display control unit 53 of the display terminal 50 instructs the display 512 to display a display screen 600a (FIG. 27) for displaying the full-view spherical image data 200 received by the transmission/reception unit 51. With this configuration, an operator who remotely operates the robot 10 using the display terminal 50 can confirm the status of the site where the robot 10 is located by viewing the display screen 600a displaying the full-view spherical image data 200.

Since the operator of the robot 10 remotely operates the robot 10 by viewing the full-view spherical image data 200 being displayed on the display terminal 50, the real-time property is required for the full-view spherical image data 200 being displayed on the display terminal 50. Therefore, the transmission/reception unit 31 of the robot 10 continuously or constantly transmits the full-view spherical image data 200 acquired by the special imaging apparatus 21 to the display terminal 50 via the management server 90. Therefore, it is preferable that the full-view spherical image data 200 acquired by the special imaging apparatus 21 is video image data. With this configuration, the operator who operates the robot 10 by using the display terminal 50 can remotely control the robot 10 by checking the video image data of the full-view spherical image transmitted from the robot 10 and reproduced by the streaming play on the display terminal 50, with which the operator can check the surrounding of the robot 10 extensively or wider range without changing the direction of the special imaging apparatus 21 and/or the robot 10.

Figure 27:
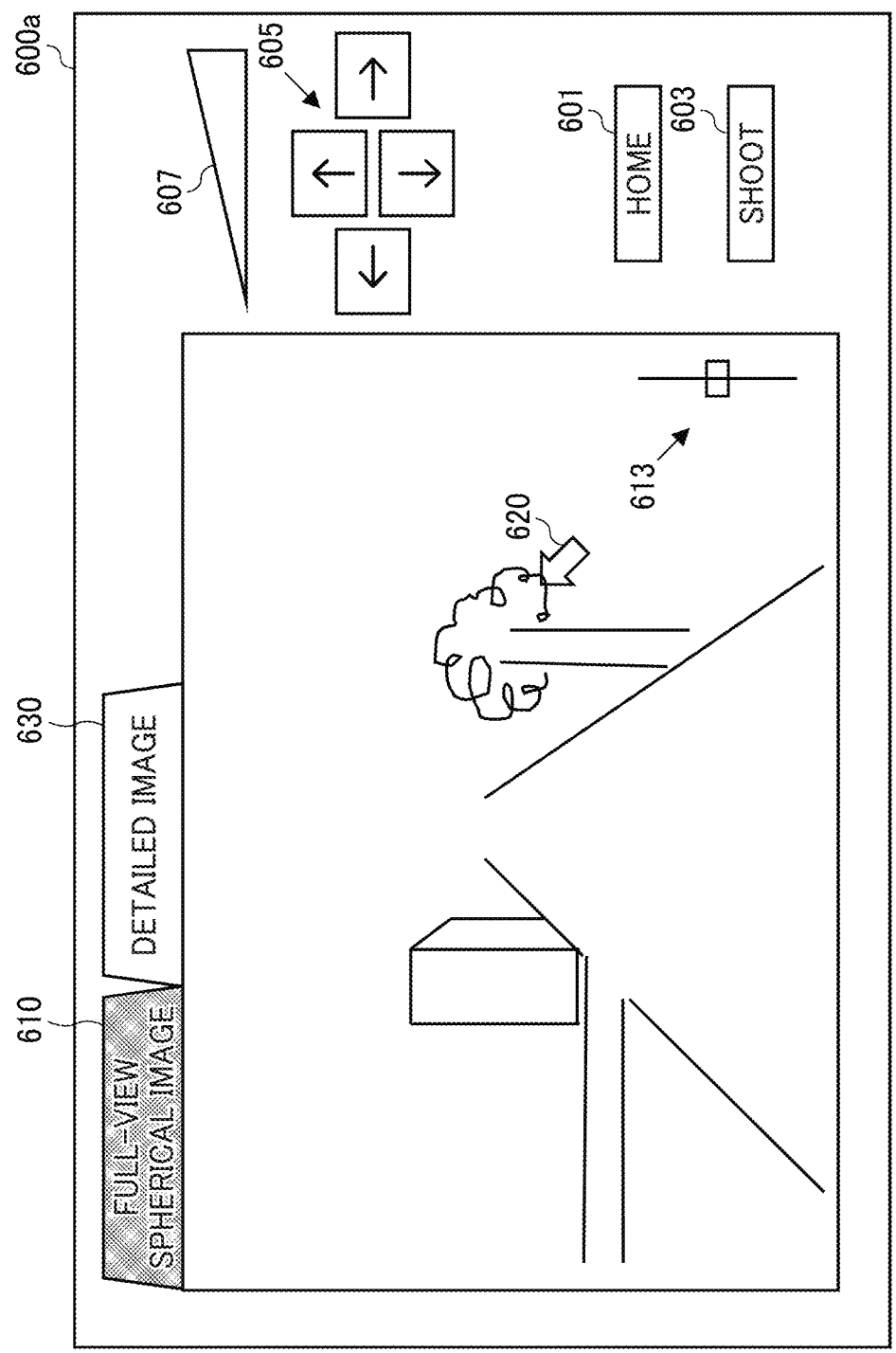
FIG. 27 illustrates an example of a display screen displayed on a display terminal according to a first embodiment.

FIG. 27 illustrates an example of the display screen 600a displayed on the display terminal 50 according to the first embodiment. In the display terminal 50, the display control unit 53 displays the display screen 600a on the display 512 as illustrated in FIG. 27. The display screen 600a includes, for example, a first display field 610, a second display field 630, a "home" button 601, a "shoot" button 603, a movement instruction key 605, a speed bar 607, and a zoom bar 613 as illustrated in FIG. 27.

The first display field 610 displays the full-view spherical image data 200 transmitted from the robot 10. The first display field 610 is also referred to as the full-view spherical image display field. The second display field 630 displays the detailed image data 250 transmitted from the robot 10. The second display field 630 is also referred to as the detailed image data display field.

The "home" button 601 is pressed when the first image capture direction of the full-view spherical image data 200 displayed in the first display field 610 is changed (reset) to the current traveling direction of the robot 10. The "shoot" button 603 is pressed when transmitting the imaging requesting to the general imaging apparatus 23 included in the robot 10.

The movement instruction key 605 is pressed when requesting the movement of the robot 10 in the horizontal direction (forward, rearward, right rotation, left rotation). The speed bar 607 displays a movement speed indicating the current state of the movement speed of the robot 10. The zoom bar 613 indicates the current zoom level of the full-view spherical image data 200 displayed in the first display field 610.

The operator who remotely controls the robot 10 using the display terminal 50 can select the respective tabs of the first display field 610 and the second display field 630 set at the top left on each display field to switch the image display between the full-view spherical image and the detailed image. In the first display field 610, a part or portion of the full-view spherical image data 200 transmitted from the robot 10 (e.g., a specific region image Q in FIG. 11) is displayed. The operator moves a mouse pointer 620 to perform a specific input operation within the first display field 610 displaying the full-view spherical image data 200 to change the first image capture direction and/or the zoom level of the full-view spherical image data 200.

Further, if the operator sees the full-view spherical image data 200 displayed in the first display field 610 and then wants to confirm the more detailed image, the operator presses the "shoot" button 603. In this case, in response to receiving the pressing of the "shoot" button 603 at the operation input reception unit 52, the request command generation unit 55 of the display terminal 50 generates a request command requesting the imaging in the direction same as the first image capture direction of the full-view spherical image data displayed on the first display field 610, to the general imaging apparatus 23. The detailed image data 250, which is the detailed image acquired by the general imaging apparatus 23, is acquired by the image acquisition unit 37 of the robot 10 and then transmitted to the display terminal 50 from the transmission/reception unit 31 via the management server 90. Then, the display terminal 50 instructs the display control unit 53 to display the detailed image data 250 received by the transmission/reception unit 51 in the second display field 630.

In an example case of FIG. 27, the movement of the robot 10 is remotely controlled by receiving an operation input to the movement instruction key 605 displayed on the display screen 600a, but not limited thereto. For example, the movement operation of the robot 10 can be performed using a dedicated controller, such as a game pad equipped with a keyboard or a joy stick.

Further, the display terminal 50 can employ a method of displaying, on the display screen 600a, a location name of the movement destination requested to the robot 10 and a list of persons to be met, with which a user can select or input an address of the requested movement destination. In this case, the display terminal 50 transmits a request command for moving the robot 10 to the input specified destination to the robot 10, and then the robot 10 autonomously moves to the destination specified by the request command.

The description returns to FIG. 26. In step S53, the robot 10 moves within the site based on the request command transmitted from the display terminal 50 to be described later. In this case, the movement control unit 38 of the robot 10 controls driving of the movement mechanism 17 based on a request command transmitted from the display terminal 50 to be described later.

In step S54, the state information generation unit 35 of the robot 10 generates the state information 150 indicating the movement state of the robot 10 based on the drive state of the movement mechanism 17 acquired from the movement control unit 38.

FIG. 28 illustrates an example of the state information 150 according to the first embodiment. As illustrated in FIG. 28, the state information 150 includes, for example, information corresponding to items, such as the traveling direction (horizontal angle and vertical angle) and the traveling velocity of the robot 10. The state information 150 includes, for example, a variable name corresponding to each item and a numerical value corresponding to the variable name. For example, in a case of the state information 150 illustrated in FIG. 28, the robot 10 is moving in the traveling direction defined by the horizontal angle of "37.2°" and the vertical angle of "45.3°" with the traveling velocity of "3.0 km/h." In this example case, the state information 150 includes information of the traveling direction (horizontal angle and vertical angle) and the traveling velocity of the robot 10 as the movement state of the robot 10, but not limited thereto. For example, the state information 150 can include information on the traveling distance of the robot 10.

Then, in steps S55-1 and S55-2, the transmission/reception unit 31 of the robot 10 transmits the state information 150 generated by the state information generation unit 35 to the display terminal 50 using the communication session established with the management server 90. Then, the transmission/reception unit 51 of the display terminal 50 receives (acquires) the state information 150 from the robot 10 via the management server 90.

In step S56, the storing/reading unit 57 of the display terminal 50 stores the state information 150 received (acquired) by the transmission/reception unit 51 in the state management table 5001 (FIG. 18) stored in the storage unit 5000. Specifically, the storing/reading unit 57 of the display terminal 50 stores the respective numerical values included in the state information 150, received (acquired) by the transmission/reception unit 51, in the corresponding variable name of the state management table 5001 to update the numerical values of each item included in the state management table 5001.

Then, in step S57, the display control unit 53 of the display terminal 50 displays the movement state of the robot 10 on the display screen as illustrated in FIG. 29.

Figure 29A:
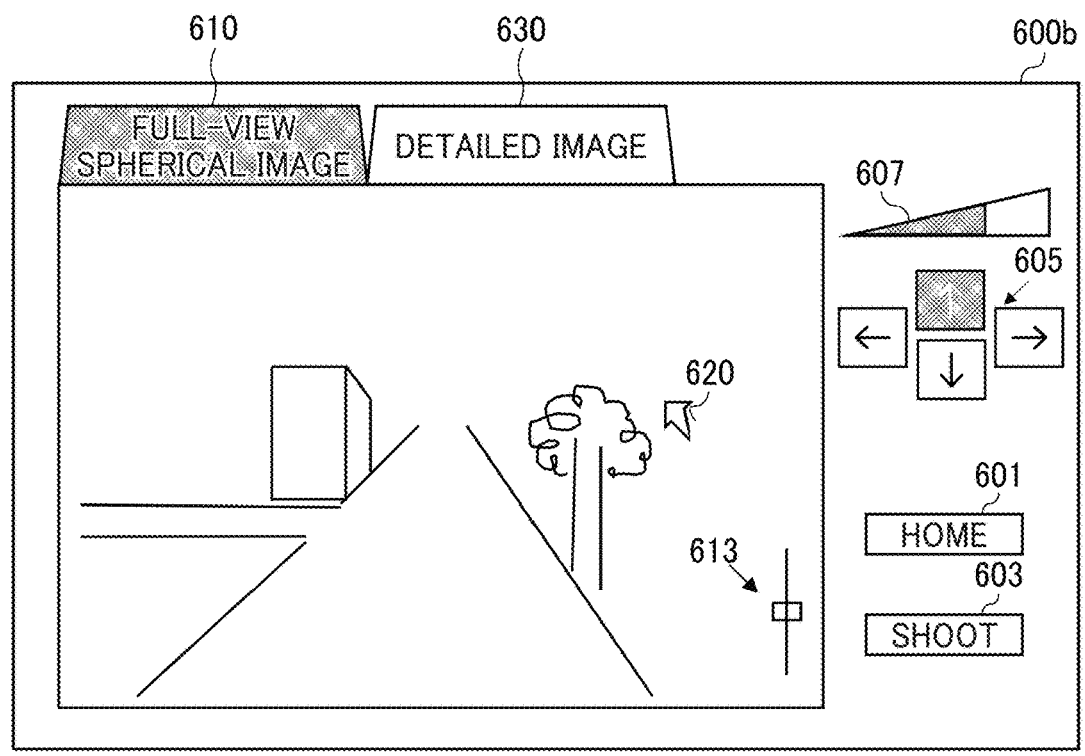
FIGS. 29A and 29B (FIG. 29) illustrate examples of a display screen displayed on a display terminal when a robot is moving in a forward direction.

FIG. 29A is an example of a screen displayed as a display screen 600b when the robot 10 is moving in a forward direction. The display screen 600b indicates that the robot 10 is moving in the forward direction by changing a color of a forward key in the movement instruction key 605. The display control unit 53 of the display terminal 50 updates the display of the movement instruction key 605 based on the numerical values corresponding to the variable names of "V_ANGLE" and "H_ANGLE," which are included in the state information 150 received by the transmission/reception unit 51. Further, the display control unit 53 can be configured to update the display of the movement instruction key 605 by receiving the operation input to the movement instruction keg 605.

Further, the display screen 600b indicates the traveling velocity of the robot 10 using a ratio of a black portion in the speed bar 607. The display control unit 53 of the display terminal 50 updates the display of the speed bar 607 based on the numerical value corresponding to the variable name of "SPEED" included in the state information 150 received by the transmission/reception unit 51.

Figure 29B:
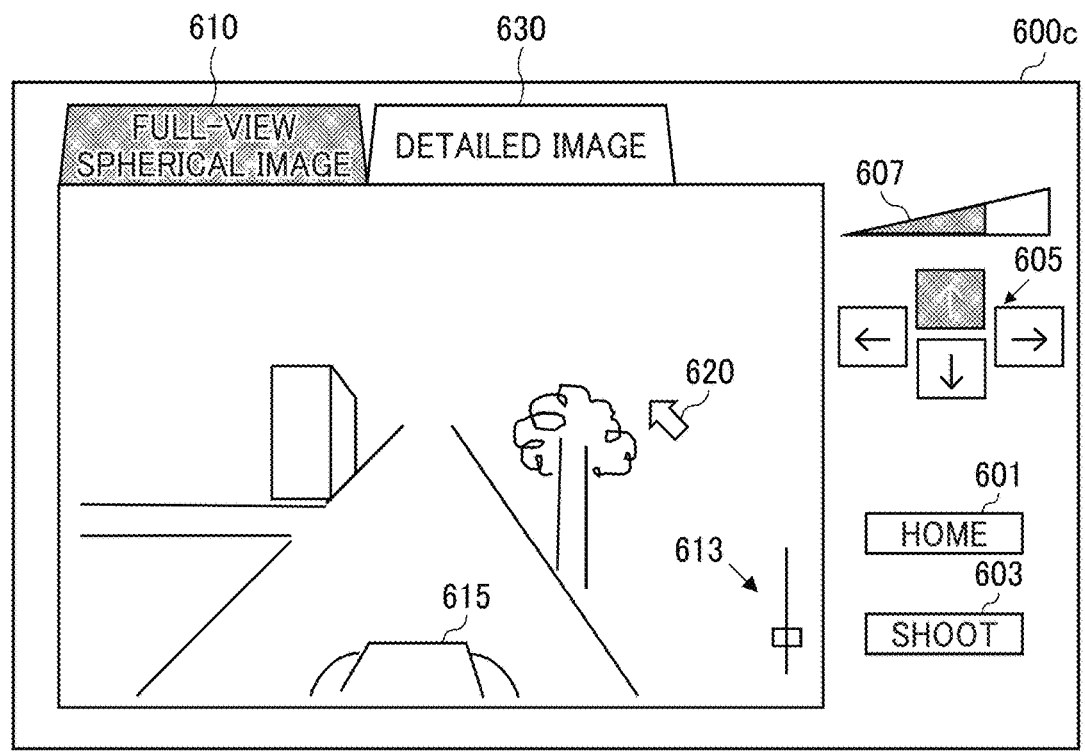

FIG. 29B is another example of a screen displayed as a display screen 600c when the robot 10 is moving in a forward direction. In the display screen 600c illustrated in FIG. 29B, a display range (output range) of the full-view spherical image displayed on the first display field 610 is different from the display screen 600b illustrated in FIG. 29A. Since the display screen 600c displays a zoom-out full-view spherical image on the first display field 610 (in a zoom-out state), the bar in the zoom bar 613 is moved to the downward. The zoom bar 613 indicates the zoom level of the full-view spherical image displayed on the first display field 610 by setting a bar indicator along the top and bottom of the zoom bar 613.

Further, since the display screen 600c displays the full-view spherical image in the zoom-out state, a head 615 of the robot 10 is also displayed. In this case, the operator who operates the robot 10 using the display terminal 50 can recognize the approximate positional relation and distance between the robot 10 and the periphery of the robot 10. Conventionally, the displaying of the display screen 600c requires to dispose another camera at the rear side of the robot 10. By contrast, the display terminal 50 can display the display screen 600c using the image captured by the special imaging apparatus 21 (one imaging apparatus) and providing the zoom function of the displayed full-view spherical image.

Figure 30:
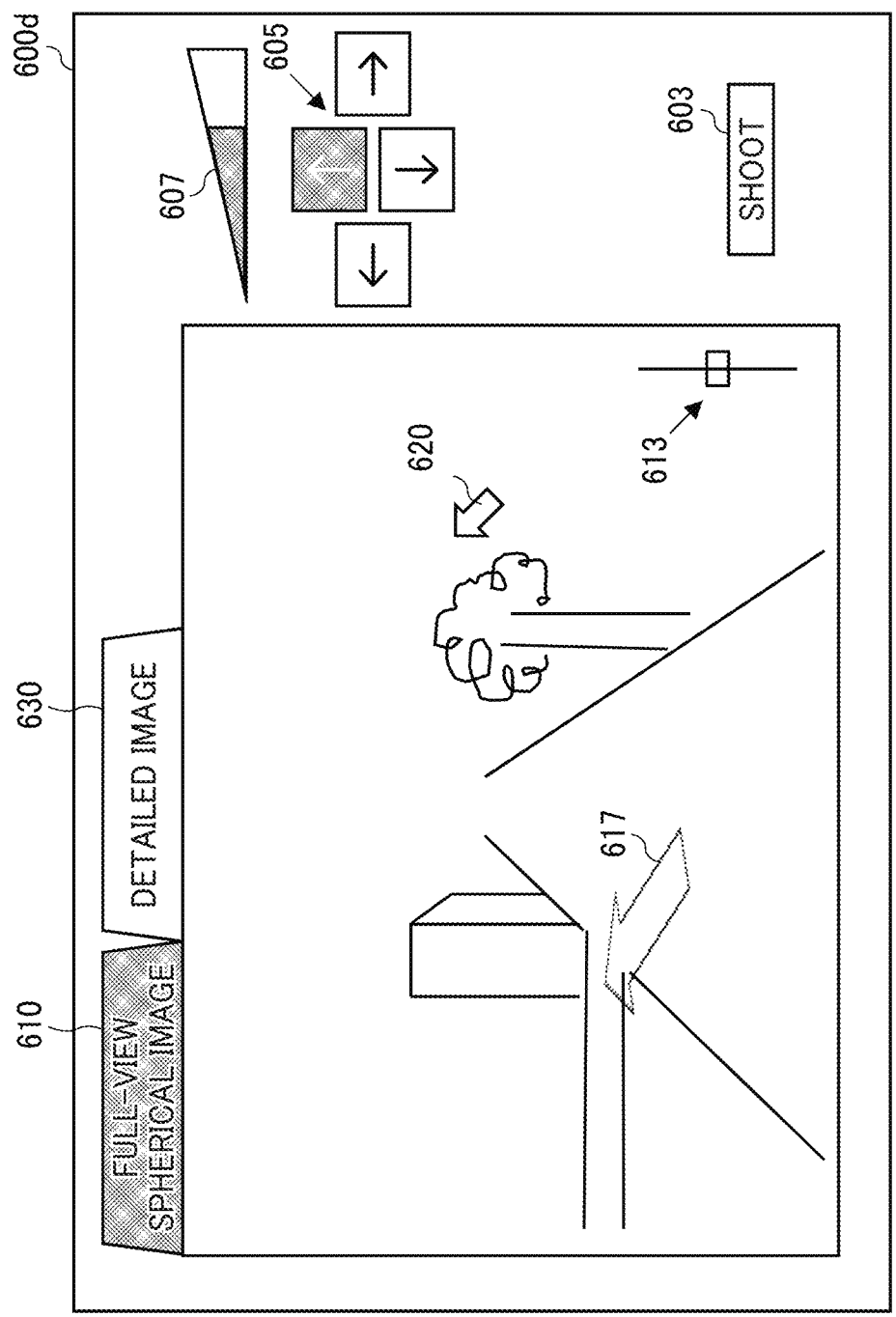
FIG. 30 illustrates another example of a display screen displayed on a display terminal when a robot is moving in a forward direction.

FIG. 30 is another example of a screen displayed as a display screen 600d when the robot 10 is moving in a forward direction. The display screen 600d in FIG. 30 indicates the traveling direction of the robot 10 in the first display field 610. In cases of the display screen 600b illustrated in FIG. 29A and the display screen 600c illustrated in FIG. 29B, when the operator presses the "home" button 601, the first image capture direction of the full-view spherical image displayed on the first display field 610 can be changed to the current traveling direction of the direction of the robot 10, with which the operator can confirm the traveling direction of the robot 10.

On the other hand, in the display screen 600c, a traveling direction icon 617 indicating the traveling direction of the robot 10 is superimposed and displayed on the full-view spherical image displayed on the first display field 610. With this configuration, the operator can confirm the traveling direction of the robot 10 by viewing the display screen 600c regardless of the first image capture direction of the full-view spherical image.

In the display screen 600d, the length of the traveling direction icon 617 can be changed depending on the traveling velocity of the robot 10. Further, when the robot 10 is stopped, the traveling direction of the robot 10 just before the robot 10 is stopped can be displayed using the traveling direction icon 617 in the display screen 600d. In this case, it is preferable that the display style of the traveling direction icon 617 when the robot 10 is stopped differs from the display style of the traveling direction icon 617 when the robot 10 is moving, such as a dotted line or a changed color can be used as the display style of the traveling direction icon 617 when the robot 10 is stopped.

With this configuration, the remote-control system 1a can display the full-view spherical image data 200 transmitted from the robot 10 (control device 30) on the display terminal 50, with which the operator who performs the remote control of the robot 10 using the display terminal 50 can recognize information around the robot 10 more accurately. Further, the display terminal 50 can display information indicating the movement state of the robot 10 together with the full-view spherical image data 200, with which the display terminal 50 can notify the operator who performs the remote control of the robot 10 using the display terminal 50, the information around the robot 10 and the movement state of the robot 10.

The state information generation unit 35 of the robot 10 can be configured to generate the state information 150 if a change occurs in the drive state of the movement mechanism 17 acquiring from the movement control unit 38. Further, the state information generation unit 35 can be also configured to generate the state information 150 with a pre-set given frequency. Further, the state information 150 generated by the state information generation unit 35 can be configured to be retained, and the transmission/reception unit 31 of the robot 10 can be configured to transmit the retained state information 150 with a pre-set given frequency. In this case, the remote-control system 1a can reduce difficulty of seeing the display screen caused by the frequent change of the movement state of the robot 10 displayed on the display terminal 50.

Figure 31:
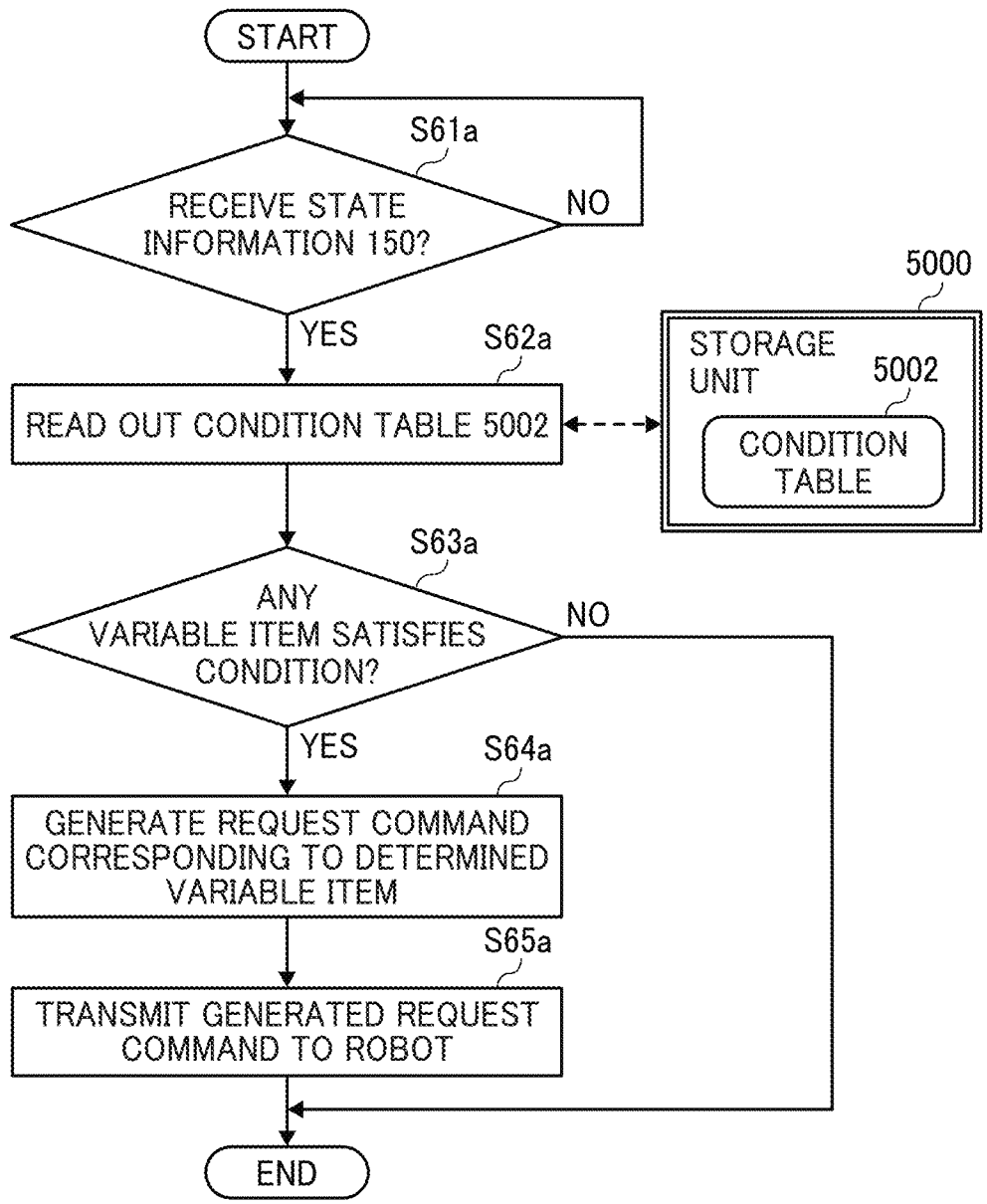
FIG. 31 is an example of a flowchart illustrating a robot control process based on a movement state of a robot using a display terminal according to a first embodiment.

Remote Control of Robot:

Hereinafter, a description is given of the remote control of the robot 10 performed by using a display screen displayed on the display terminal 50. At first, an example of an operation control of the robot 10 based on the state information 150 transmitted from the robot 10 is described with reference to FIG. 31. FIG. 31 is an example of a flowchart illustrating a robot control process based on the movement state of the robot 10 using the display terminal 50 according to the first embodiment.

In step S61a, if the transmission/reception unit 51 of the display terminal 50 receives (acquires) the state information 150 transmitted from the robot 10 (S61a: YES), the sequence proceeds to step S62a. On the other hand, if the transmission/reception unit 51 does not receive (acquire) the state information 150 (S61a: NO), the sequence repeats step S61a.

In step S62a, the storing/reading unit 57 of the display terminal 50 reads out the condition table 5002 (FIG. 19) stored in the storage unit 5000.

In step S63a, the determination unit 54 of the display terminal 50 searches the condition table 5002 read out by the storing/reading, unit 57, and if there is any variable that satisfies the condition included in the condition table 5002 among the variables included in the state information 150 received by the transmission/reception unit 51 (S63a: YES), the determination unit 54 proceeds the sequence to step S64a. For example, when the numerical value corresponding to the variable name of "SPEED" included in the state information 150 is "3.0 km/h," the determination unit 54 determines that "SPEED≤5.0 km/h," "SPEED>1.0 km/h" and "SPEED>2.0 km/h" satisfy the condition among the items included in the condition table 5002 (FIG. 19). The variable may be also referred to as the variable item, or item in this description.

On the other hand, in step S63a, if the determination unit 54 determines that the variables included in the state information 150 received by the transmission/reception unit 51 do not satisfy the condition included in the condition table 5002 (S63a: NO), the determination unit 54 terminates or end the sequence.

In step S64a, the request command generation unit 55 of the display terminal 50 specifies the process corresponding to the variable item determined in step S63 to generate a request command. For example, the request command generation unit 55 specifies a specific process corresponding to each of "SPEED≤5.0 km/h," "SPEED>1.0 km/h" and "SPEED>2.0 km/h" satisfying the condition included in the condition table 5002 (FIG. 19). Then, the request command generation unit 55 generates a request command using a command corresponding to the specified processing included in the condition table 5002. In this case, the commands included in the request command are "FPS(30)," "RESOLUTION(50%)" and "ZOOM=10." It should be noted that the request command can include all commands corresponding to the items satisfying the conditions, or one or more commands corresponding to the items selected (extracted) from all of the items satisfying the conditions.

In step S65a, the transmission/reception unit 51 of the display terminal 50 transmits the request command generated by the request command generation unit 55 to the robot 10 via the communication network 9. Then, the transmission/reception unit 31 of the robot 10 receives the request command corresponding to the current movement state of the robot 10 from the display terminal 50. When the robot 10 receives the request command, the robot 10 executes a command processing (see FIG. 33) which will be described later.

As above described, if the display terminal 50 requests to change the image quality of the full-view spherical image of the full-view spherical image data 200 acquired by the special imaging apparatus 21 based on the movement state of the robot 10, the image quality of the full-view spherical image displayed on the display terminal 50 can be changed. For example, when the robot 10 is moving, the display terminal 50 can transmit a request for reducing the image quality of the full-view spherical image to the robot 10. Specifically, the display terminal 50 transmits a request for reducing the resolution of the full-view spherical image and/or reducing the frame rate (update frequency) to the robot 10. With this configuration, by reducing the resolution and/or frame rate (update frequency) of the full-view spherical image displayed on the display terminal 50, the remote-control system 1a can reduce discomfort of the operator viewing the full-view spherical image data 200 displayed on the display terminal 50 while operating the robot 10, such as feeling of intoxication or the like.

Further, when performing the remote-control operation of the robot 10 using the display terminal 50, the operator performs the operation input while viewing the full-view spherical image data 200 displayed on the display terminal 50, in which the full-view spherical image data 200 transmitted from the robot 10 is required to be real time image. If the communication delay due to the congestion of the communication network 9 occurs, the full-view spherical image data 200 is displayed on the display terminal 50 with a time lag from the actual state around the robot 10, causing the degradation of the operability to the operator who remotely controls the robot 10. Therefore, the remote-control system 1a can prevent the deterioration of the operability, caused by the time lag of the display screen due to the communication delay, by changing the image quality of the full-view spherical image data 200 transmitted from the robot 10 depending on the movement state of the robot 10.

The conditions included in the condition table 5002 are not limited to the conditions related to the traveling velocity of the robot 10, but can be any condition related to the movement state that the robot 10 can acquire. For example, the condition table 5002 can include conditions related to the traveling direction of the robot 10.

Figure 32:
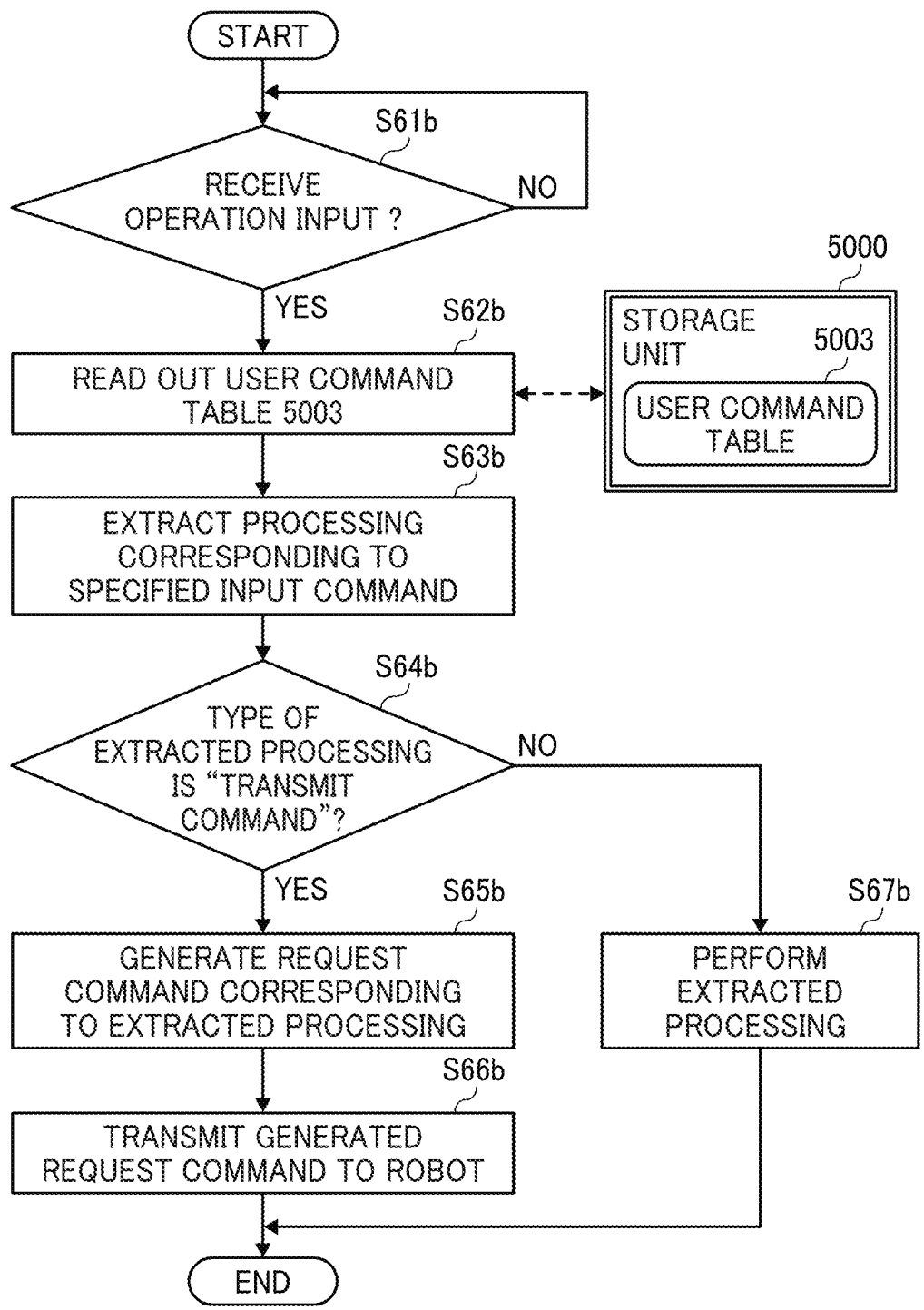
FIG. 32 is an example of a flowchart illustrating a robot control process based on an input command at a display terminal according to a first embodiment.

Hereinafter, a description is given of an example of an operation control of the robot 10 based on an input command input by an operator operating the robot 10 using the display terminal 50 with reference to FIG. 32. FIG. 32 is an example of a flowchart illustrating a robot control process based on an input command at the display terminal 50 according to the first embodiment. FIG. 32 illustrates a case in which the display screen 600a (FIG. 27) is displayed on the display 512 of the display terminal 50. The display screen being displayed on the display 512 of the display terminal 50 may be another display screen illustrated in FIG. 29 or FIG. 30.

In step S61b, if the operation input reception unit 52 of the display terminal 50 receives a specific operation input to the display screen 600a displayed on the display 512 (S61b: YES), the operation input reception unit 52 proceeds the sequence to step S62b. For example, the operation input reception unit 52 receives an operation input to any one of the keys of the movement instruction key 605 included in the display screen 600a. On the other hand, if the operation input reception unit 52 does not receive the specific operation input to the display screen 600a (S61b: N0), the sequence repeats step S61b.

In step S62b, the storing/reading unit 57 of the display terminal 50 reads out the user command table 5003 (FIG. 20) stored in the storage unit 5000.

In step S63b, the determination unit 54 of the display terminal 50 searches the user command table 5003 read out by the storing/reading unit 57 and specifies an input command corresponding to the operation input received by the operation input reception unit 52. Then, the determination unit 54 searches the user command table 5003 to extract the processing corresponding to the specified input command. For example, if an input to the "forward(↑)" key of the movement instruction key 605 is received by the operation input reception unit 52, the determination unit 54 specifies the "pressing of "forward(↑)" key as the input command. Then, the determination unit 54 extracts "MOVE (10.0, 10.0)" as a process corresponding to the specified input command.

In step S64b, if the type of processing corresponding to the extracted processing is "transmit command," the display terminal 50 proceeds the sequence to step S65b.

In step S65b, the request command generation unit 55 of the display terminal 50 generates a request command corresponding to the processing extracted by the determination unit 54. For example, if the extracted processing is "MOVE (10.0, 10.0)," the request command generation unit 55 generates the request command including "MOVE (10.0, 10.0)."

In step S66b, the transmission/reception unit 51 of the display terminal 50 transmits the request command generated by the request command generation unit 55 to the robot 10. Then, the transmission/reception unit 31 of the robot 10 receives the request command in response to the input operation by the operator, from the display terminal 50. When the robot 10 receives the request command, the robot 10 executes a command processing (see FIG. 33) which will be described later.

On the other hand, if the type of processing corresponding to the extracted processing is not "transmit command" in step S64b (S64b: NO), the display terminal 50 proceeds the sequence to step S67b.

In step S67b, the display terminal 50 performs the processing extracted in step S63b. For example, if the extracted processing is "VIEW_H_ANGLE=0, VIEW_V_ANGLE=0" corresponding to the pressing of the "home" button 601, the display terminal 50 uses the display control unit 53 to change the first image capture direction of the full-view spherical image displayed in the first display field 610.

In the above step S63b, the determination unit 54 extracts the specific processing using the user command table 5003, but the display terminal 50 can be configured to extract or execute the specific processing based on an event assigned to the movement instruction key 605.

Figure 33:
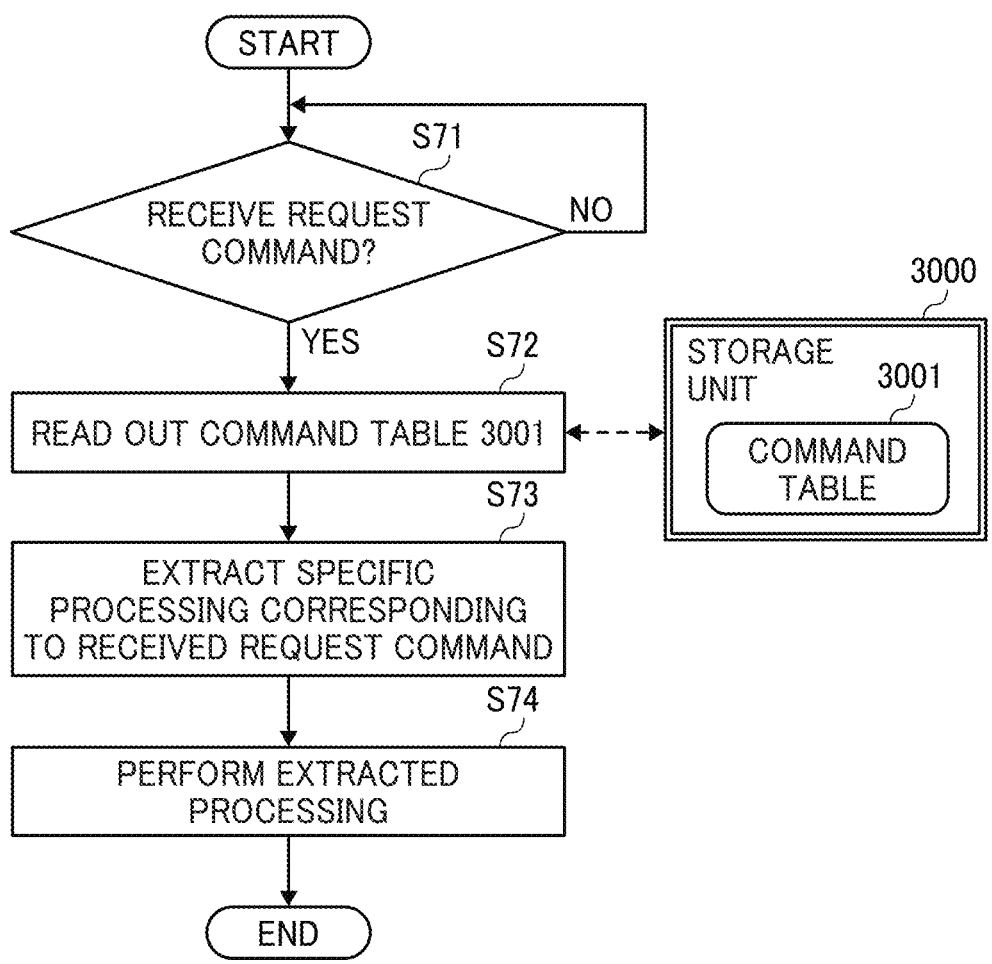
FIG. 33 is an example of a flowchart illustrating a robot control process based on a request command transmitted from a display terminal according to according to a first embodiment.

Hereinafter, with reference to FIG. 33, a description is given of a control process (e.g., movement control process) performed by the robot 10 using the request command transmitted from the display terminal 50 by performing the processing illustrated in FIG. 31 or FIG. 32. FIG. 33 is an example of a flowchart illustrating a control process of the robot 10 based on the request command transmitted from the display terminal 50 according to the first embodiment.

In step S71, if the transmission/reception unit 31 of the robot 10 receives the request command transmitted from the display terminal 50 (S71: YES), the transmission reception unit 31 proceeds the sequence to step S72. On the other hand, if the transmission/reception unit 31 does not receive the request command (S71: NO), the sequence repeats step S71.

In step S72, the storing/reading unit 41 of the robot 10 reads out the command table 3001 (FIG. 17A) stored in the storage unit 3000.

In step S73, the determination unit 34 of the robot 10 searches the command table 3001 read out by the storing/reading unit 41 to extract a specific processing corresponding to the request command received by the transmission/reception unit 31.

In step S74, the robot 10 performs the specific processing extracted in step S73.

For example, if the request command received by the transmission/reception unit 31 is "MOVE (10.0, 10.0)," the determination unit 34 searches the command table 3001 to extract the processing corresponding to the command name of "MOVE." In this case, the extracted processing is "10.0° rotation of the left wheel and 10.0° rotation of the right wheel." Then, the determination unit 34 notifies an execution request of the extracted processing to the movement control unit 38. Then, based on the processing extracted by the determination unit 34, the movement control unit 38 rotates the left wheel of the movement mechanism 17 of the robot 10 for 10.0° and rotates the right wheel of the movement mechanism 17 of the robot 10 for 10.0°. The notification destination of the execution request becomes different depending on the processing extracted by the determination unit 34. For example, if the request command received by the transmission/reception unit 31 is "ARM," the notification destination of the execution request becomes the arm operation control unit 39, and if the request command is "SHOOT," "FPS" or "RESOLUTION", the notification destination of the execution request becomes the imaging instruction unit 36.

As above described, the robot 10 can perform the processing or operation based on the request command transmitted from the display terminal 50 by performing the processing illustrated in FIG. 31 or FIG. 32, and can transmit the image (full-view spherical image data 200 or detailed image data 250) captured and acquired based on the request command to the display terminal 50. With this configuration, the remote-control system 1a can remotely control the operation of the robot 10 using the display terminal 50, and the information (e.g., full-view spherical image data 200, detailed image data 250) acquired by the robot 10 using the remote-control operation can be displayed on the display terminal 50.

Figure 34:
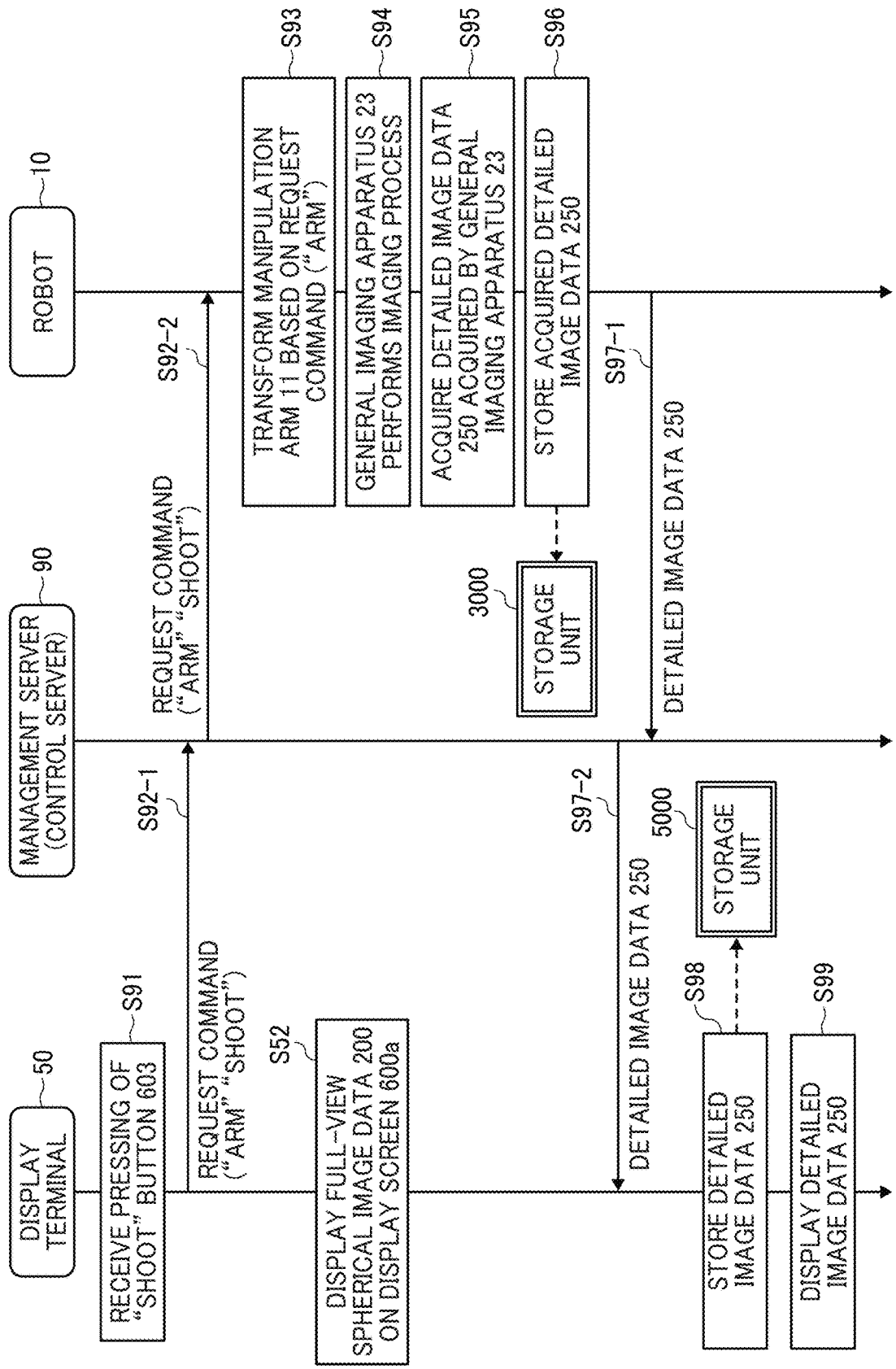
FIG. 34 is an example of a sequence diagram illustrating a process of displaying a detailed image in a remote-control system according to a first embodiment.

Transmission and Reception of Detailed Image:

Hereinafter, a description is given of a process of displaying the detailed image acquired by the general imaging apparatus 23 included in the robot 10 on the display terminal 50 with referenced to FIGS. 34 to 36. FIG. 34 is an example of a sequence diagram illustrating a process of displaying the detailed image in the remote-control system 1a according to the first embodiment. FIG. 34 illustrates a case in which the display screen 600a (FIG. 27) is displayed on the display 512 of the display terminal 50.

The display screen displayed on the display 512 of the display terminal 50 can be another display screen illustrated in FIG. 29 or FIG. 30.

In step S91, the operation input reception unit 52 of the display terminal 50 receives an operation input to the "shoot" button 603 included in the display screen 600a. If the operation input reception unit 52 receives the operation input to the "shoot" button 603, the request command generation unit 55 of the display terminal 50 generates a request command including a command of "ARM" and a command of "SHOOT." As indicated in the command table 3001 (FIG. 17A), the processing of the robot 10 corresponding to the "SHOOT" command is "imaging by the general imaging apparatus 23." That is, the request command generation unit 55 generates a control signal indicating an imaging request to the general imaging apparatus 23. Since the specific processing from the reception of the operation input to the generation of the request command is the same as the processing illustrated in FIG. 32, the description thereof will be omitted.

In steps S92-1 and S92-2, the transmission/reception unit 51 of the display terminal 50 transmits the request command generated by the request command generation unit 55 to the robot 10 via the management server 90. In this case, since the request command generated by the request command generation unit 55 includes the "SHOOT" command, the transmission/reception unit 51 transmits (outputs) the control signal indicating the imaging request to the general imaging apparatus 23. Then, the transmission/reception unit 31 of the robot 10 receives the request command from the display terminal 50 via the management server 90.

In step S93, the arm operation control unit 39 of the robot 10 transforms the manipulation arm 11 based on the request command received by the transmission/reception unit 31. The arm operation control unit 39 changes the direction or orientation of the manipulation arm 11 by transforming the manipulation arm 11 based on the "ARM" command included in the request command received by the transmission/reception unit 31.

Hereinafter, the control operation of the manipulation arm 11 by the arm operation control unit 39 is described. The variable (h,v) of "ARM" command included in the request command indicates the relative position on the screen in the first image capture direction of the full-view spherical image data 200 displayed on the display screen 600a. The "h" is the horizontal angle with respect to the traveling direction of the robot 10 and the "v" is the vertical angle in the vertical direction with respect to the traveling direction of the robot 10. The first image capture direction of the full-view spherical image data 200 displayed on the display screen 600a is set to $(h_0, v_0)$.

The arm operation control unit 39 corrects the variable (h,v) based on the first image capture direction $(h_0, v_0)$ of the full-view spherical image data 200 to change the direction or orientation of the manipulation arm 11 based on the corrected variable. For example, when the center in the first image capture direction of the full-view spherical image data 200 displayed on the display screen 600a is specified by the variable (h,v) of the "ARM" command, $(h,v)=(h_0,v_0)$ is set. On the other hand, if any position other than the center in the first image capture direction of the full-view spherical image data 200 displayed on the display screen 600a is specified by the variable (h,v) of the "ARM" command, (h, v) is corrected using the following [Math. 2] in which the deviation from the center is set as "α" and "β" by setting "α>0" and "β>0" for the upper right direction of the display screen 600a. In [Math. 2]"a" and "b" are specific coefficients.

$$h=h_0+\alpha \times a$$

$$v=v_0+\beta \times b \quad \text{[Math. 2]}$$

In this configuration, by specifying the variable indicating the relative position on the screen in the first image capture direction of the full-view spherical image data 200 displayed on the display screen 600a using the "ARM" command included in the request command, the arm operation control unit 39 can change the direction or orientation of the manipulation arm 11 by transforming the manipulation arm 11 based on the specified variable (h,v). That is, the second image capture direction to be used by the general imaging apparatus 23 is determined based on the first image capture direction of the full-view spherical image data 250, and the robot 10 changes the direction or orientation of the manipulation arm 11 into a direction or orientation that the general imaging apparatus 23 can capture images in the second image capture direction determined by the arm operation control unit 39. For example, when the upper right of the display screen is designated by the variable (h,v) of the "ARM" command, the arm operation control unit 39 can change the direction or orientation of the manipulation arm 11 to the upper tight direction for the specified variable. In a case that the vertical direction of the manipulation arm 11 cannot be changed due to the shape of the manipulation arm 11, the arm operation control unit 39 can change the horizontal direction of the manipulation arm 11 alone using only "h" of the variable (h,v) of the "ARM" command included in the request command.

In step S94, the imaging instruction unit 36 of the robot 10 outputs an imaging instruction to the general imaging apparatus 23 in response to a completion of changing the direction or orientation of the manipulation arm 11 by the arm operation control unit 39. Then, the general imaging apparatus 23 performs the imaging process in response to the imaging instruction output from the imaging instruction unit 36. In this case, the general imaging apparatus 23 acquires the detailed image data 250, which is a detailed image captured in the direction or orientation of the manipulation arm 11 changed by the arm operation control unit 39.

In step S95, the image acquisition unit 37 of the robot 10 acquires the detailed image data 250 acquired by the general imaging apparatus 23, from the general imaging apparatus 23.

In step S96, the storing/reading unit 41 of the robot 10 stores the detailed image data 250 acquired by the image acquisition unit 37 in the storage unit 5000.

In steps S97-1 and S97-2, the transmission/reception unit 31 of the robot 10 transmits the detailed image data 250 acquired by the image acquisition unit 37 to the display terminal 50 via the communication network 9. Then, the transmission/reception unit 51 of the display terminal 50 receives the detailed image data 250 transmitted from the robot 10. It should be noted that the order of processing of step S96, and steps S97-1 and S97-2 can be changed or can be performed in parallel with each other.

In step S98, the storing/reading unit 57 of the display terminal 50 stores the detailed image data 250 received by the transmission/reception unit 51 in the storage unit 5000.

In step S99, the display control unit 53 of the display terminal 50 displays, on the display 512, the detailed image data 250 received by the transmission/reception unit 51. It should be noted that the order of processing of step S98 and step S99 can be changed or can be performed in parallel with each other.

Figure 35:
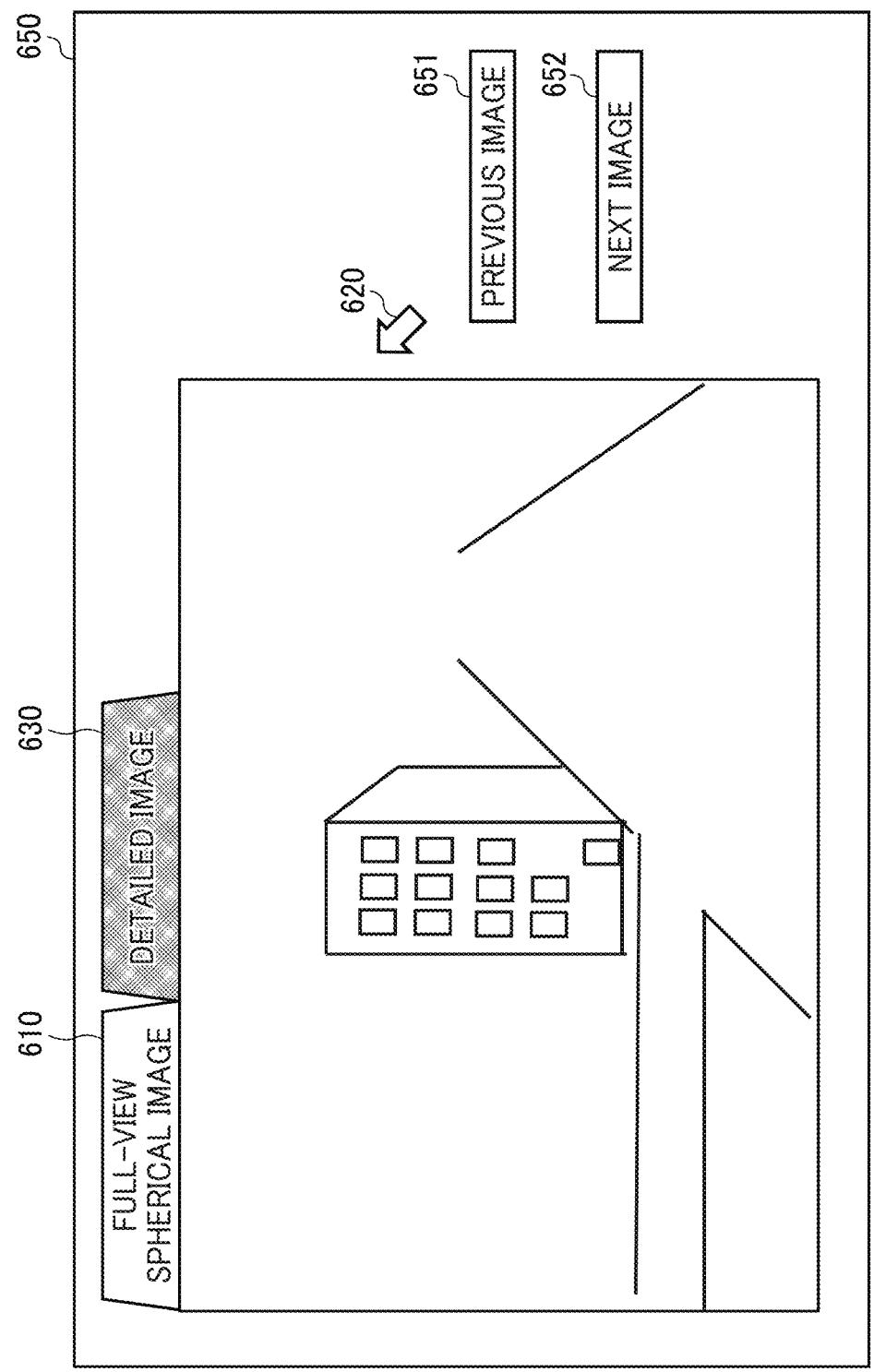
FIG. 35 illustrates an example of a display screen displaying detailed image data transmitted from a robot.

FIG. 35 illustrates an example of a display screen for displaying the detailed image data 250 transmitted from the robot 10. As to the display screen 650 illustrated in FIG. 35, the detailed image data 250 transmitted from the robot 10 is displayed in the second display field 630. The display screen 650 also includes, for example, a "previous image" button 651 and a "next image" button 652.

If the operation input reception unit 52 receives an input operation to the "previous image" button 651, the display control unit 53 displays the detailed image data 250 corresponding to a previous image (previous detailed image data) that was received just before receiving the detailed image data 250 corresponding to an image (detailed image data received just after previous detailed image data) being currently displayed in the second display field 630, in which these detailed image data are stored in the storage unit 5000.

Further, if the operation input reception unit 52 receives an input operation to the "next image" button 652, the display control unit 53 displays the detailed image data 250 corresponding to a next image (next detailed image data) that was received just after receiving the detailed image data 250 corresponding to an image (detailed image data received just before next detailed image data) being currently displayed in the second display field 630, in which these detailed image data are stored in the storage unit 5000.

The operator who operates the robot 10 using the display terminal 50 can select the respective tabs of "full-view spherical image" and "detailed image" set at the upper left of the first display field 610 and the second display field 630 to change the image display between of the full-view spherical image and the detailed image. For example, when the display screen 650 is displaying the detailed image on the display terminal 50, the operator can switch the display screen 650 to the display screen of the full-view spherical image data 200 (e.g., display screen 600a of FIG. 27) by selecting the tab of "full-view spherical image" set at the upper left of the first display field 610.

Although the configuration of switching the image display between the full-view spherical image data 200 and the detailed image data 250 based on the selection of the tabs is described, the display screen 650 can be configured to simultaneously display the full-view spherical image data 200 and the detailed image data 250. Further, the display terminal 50 can be configured to display the full-view spherical image data 200 as one screen and the detailed image data 250 as another screen, and display one screen over another screen or another screen over one screen by overlapping one screen and another screen at least partially.

In the above described configuration, the display of the detailed image data 250 stored in the storage unit 5000 is switched using the selection of the "previous image" button 651 and the "next image" button 652, but not limited thereto. For example, the display screen 650 can be configured to display an image list of the detailed image data 250 stored in the storage unit 5000 to allow the user to select the detailed image data 250 to be displayed.

In the above described configuration, the detailed image data 250 captured by the general imaging apparatus 23 can be displayed on the display terminal 50 when the operator presses the "shoot" button 603, but not limited thereto. For example, the line-of-sight position of the operator who operates the robot 10 using the display terminal 50 can be detected, and then the image capture position can be specified and then the imaging instruction can be performed.

Figure 36:
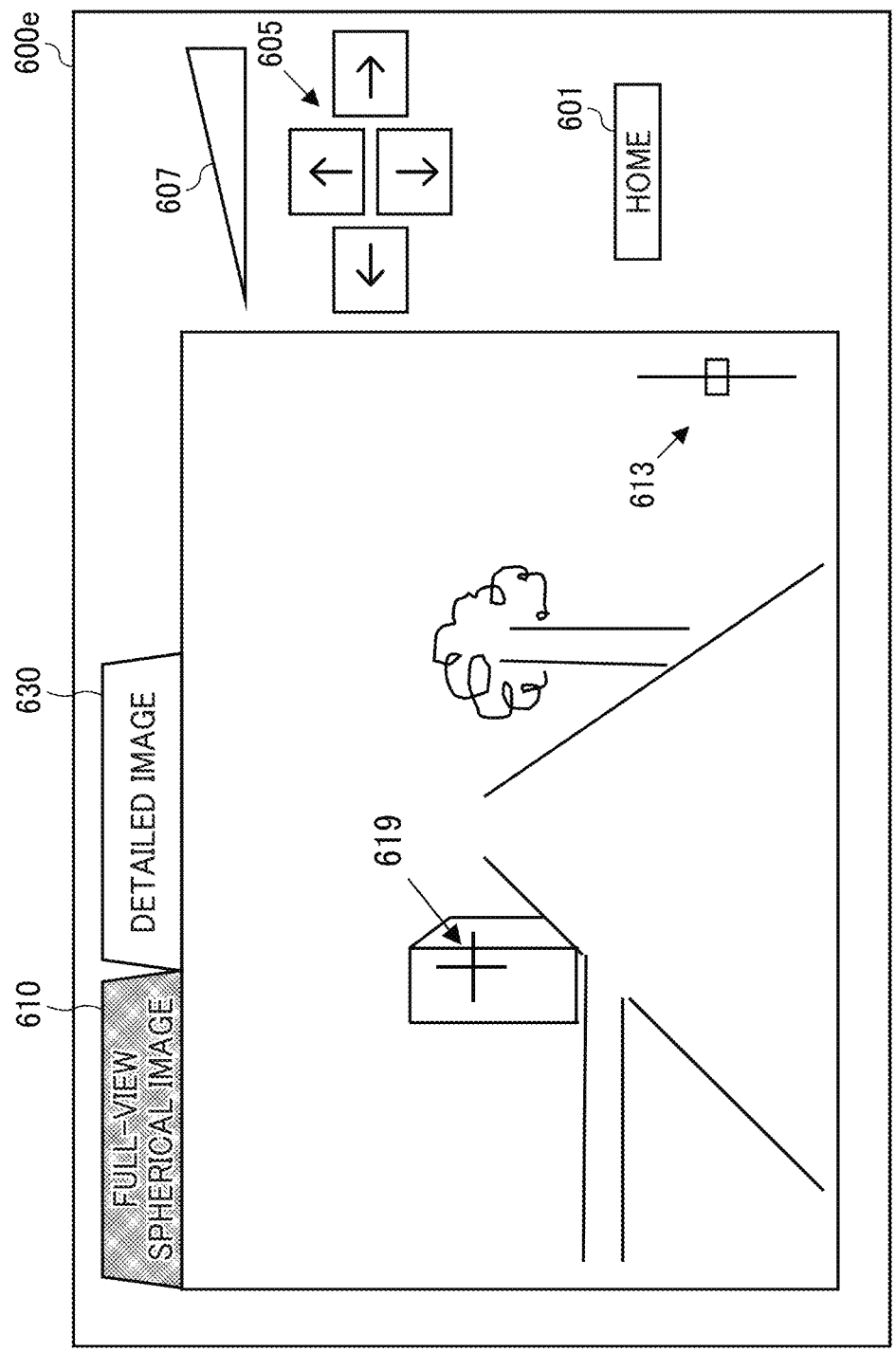
FIG. 36 illustrates an example of a display screen displaying a line-of-sight position (viewing position) of an operator on a display terminal.

In a display screen 600e illustrated in FIG. 36, a line-of-sight icon 619 indicating a line-of-sight position (viewing position) of the operator is displayed in the first display field 610 instead of the "shoot" button 603. The line-of-sight detection unit 56 of the display terminal 50 detects the line-of-sight position (e.g., viewpoint) of the operator using the line-of-sight detection device 517. Then, the display control unit 53 displays the line-of-sight icon 619 at the line-of-sight position detected by the line-of-sight detection unit 56 by superimposing the line-of-sight icon 619 over the full-view spherical image data 200 being displayed on the first display field 610.

In this case, if the line-of-sight position detected by the line-of-sight detection unit 56 does not move for a given time period, the request command generation unit 55 generates a request command including the "ARM" command designating the detected line-of-sight position as the variable (h,v) and the "SHOOT" command, which is the imaging instruction transmitted to the general imaging apparatus 23. The variable (h,v) of the "ARM" command indicates the relative positions of the detected line-of-sight position on the screen in the first image capture direction of the full-view spherical image data 200 displayed on the display screen 600a. Then, the transmission/reception unit 51 of the display terminal 50 transmits the generated request command to the robot 10. By performing the same processing in step S93 and subsequent steps in FIG. 34, the display terminal 50 can display the detailed image data 250 at the line-of-sight position detected by the line-of-sight detection unit 56.

In the above described configuration, the image capture position is specified (identified) and the imaging instruction is performed based on the line-of-sight position detected by the line-of-sight detection unit 56, but not limited thereto. For example, the display terminal 50 can be configured to specify the image capturing position based on the line-of-sight position detected by the line-of-sight detection unit 56 and to transmit the imaging instruction by performing the input operation to the "shoot" button 603. Further, the display terminal 50 can be configured to specify the image capturing position using a position of the mouse pointer 620 and to transmit the imaging instruction when the line-of-sight position detected by the line-of-sight detection unit 56 does not move for a given time period.

In the above described remote-control system 1a, if the operator who remotely controls the robot 10 by viewing the full-view spherical image data 200 displayed on the display terminal 50 wants to check the details of a specific region in the site where the robot 10 is located, the detailed image data 250, which is acquired by capturing a part or portion of an object existing in the full-view spherical image data 200, can be displayed on the display terminal 50. Therefore, as to the above described remote-control system 1a, the operator who operates the robot 10 using the display terminal 50 can check the detail information of the specific region.

Further, as described above, since the detailed image is the image acquired by the general imaging apparatus 23 using the lens having a focal length longer than a focal length of the lens used for the special imaging apparatus 21, the detailed image becomes the image having higher image quality compared to the image quality of the full-view spherical image acquired by the special imaging apparatus 21. Therefore, as to the above described remote-control system 1a, the operator who operates the robot 10 using the display terminal 50 can check the detail information of the specific region using a higher quality image, such as higher resolution image.

The above described remote-control system 1a can be effectively used, for example, when a maintenance work of devices or the like disposed at a remote site is performed using the robot 10. For example, the operator of the display terminal 50 performs a movement operation of the robot 10 by viewing the full-view spherical image data 200 transmitted from the robot 10 and requests the imaging of a concerned portion to the general imaging apparatus 23 if the concerned portion is found. With this configuration, based on the operator needs, the remote-control system 1a can switch the image display between the full-view spherical image data 200, capable of viewing a wider range of the circumference or surroundings of the robot 10, and the detailed image data 250 capable of viewing the circumference or surroundings of the robot 10 with the higher image quality, which can be displayed on the display terminal 50. Therefore, the remote-control system 11.a can achieve both an improvement in the operability of the robot 10 and an improvement in the resolution of the image to be displayed on the display terminal 50 when a specific region is to be checked in detail.

As to the above described configuration, the captured image of the specific region can be displayed on the display terminal 50 by cutting out the specific region in the full-view spherical image data 200 or enlarging the specific region in the full-view spherical image data 200 using the zooming function. However, if the image is displayed on the display terminal 50 using this method using the zooming function, the zoomed image has a lower resolution even compared to the full-view spherical image, and thereby the operator cannot confirm the details in the full-view spherical image. Therefore, in the remote-control system 1a, the image acquired by the imaging apparatuses (special imaging apparatus 21 or the general imaging apparatus 23) having the different imaging purposes can be switched when displaying on the display terminal 50, with which both of the improvement of operability and the improvement of the resolution (image resolution) can be achieved.

Switching of Display Screen

Figure 37:
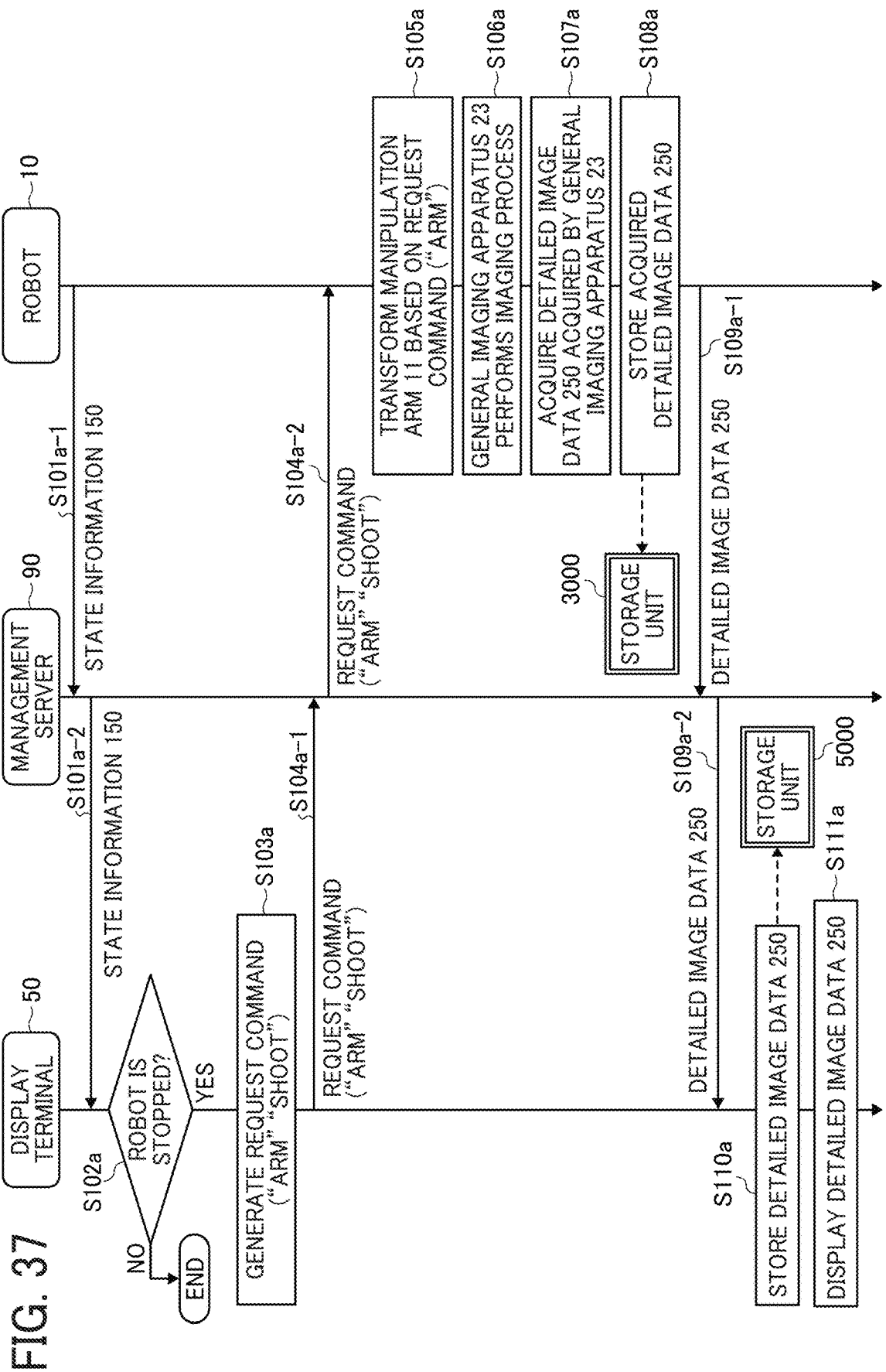
FIG. 37 is an example of a sequence diagram illustrating a process of switching an image displayed on a display terminal in an environment of a remote-control system according to a first embodiment.

Hereinafter, a description is given of a process of switching the image display between the full-view spherical image and the detailed image at the display terminal 50 based on the movement state of the robot 10. FIG. 37 is an example of a sequence diagram illustrating a process of switching an image displayed on the display terminal 50 in an environment of the remote-control system 1*a* according to the first embodiment. FIG. 37 illustrates a case when the display screen 600*a* (displaying full-view spherical image data 200) illustrated in FIG. 27 is currently displayed on the display 512 of the display terminal 50.

In steps S101*a*-1 and S101*a*-2, the transmission/reception unit 31 of the robot 10 transmits the state information 150 (FIG. 28) generated by the state information generation unit 35 to the display terminal 50 using a communication session established with the management server 90. Then, the transmission/reception unit 51 of the display terminal 50 receives (acquires) the state information 150 from the robot 10 via the management server 90 (an example of acquisition step).

In step S102*a*, if the robot 10 is stopped (S102*a*: YES), the display terminal 50 proceeds the sequence to step S103*a*. Specifically, the determination unit 54 of the display terminal 50 determines that the robot 10 is stopped when a value of the variable of "SPEED" included in the state information 150 received by the transmission/reception unit 51 is "0 km/h." It should be noted that the numerical value of the variable of "SPEED" used for determining that the robot 10 is stopped is not limited to "0 km/h." For example, the determination unit 54 of the display terminal 50 can be configured to determine that the robot 10 is stopped if the numerical value of the variable of "SPEED" becomes less than or equal to a specific threshold value.

On the other hand, in step S102*a*, if the determination unit 54 of the display terminal 50 determines or detects that the robot 10 is not stopped but is moving (S102*a*: NO), the determination unit 54 terminates or ends the sequence.

In step S103*a*, the request command generation unit 55 of the display terminal 50 generates a request command including the "ARM" command and the "SHOOT" command. As illustrated in the command table 3001 (FIG. 17A), the processing of the robot 10 corresponding to the "SHOOT" command is "imaging by the general imaging apparatus 23." That is, the request command generation unit 55 generates a control signal indicating an imaging request to the general imaging apparatus 23. Further, the variable (h,v) of the "ARM" command included in the request command corresponds to the center position on the screen in the first image capture direction of the full-view spherical image data 200 displayed on the display screen 600*a*. Further, the variable (h,v) of the "ARM" command may correspond to a position specified by the mouse pointer 620 on the screen in the first image capture direction of full-view spherical image data 200 displayed on the display screen 600*a*.

In steps S104*a*-1 and S104*a*-2, the transmission/reception unit 51 of the display terminal 50 transmits the request command ("ARM" and "SHOOT") generated by the request command generation unit 55 to the robot 10 via the management server 90. In this case, since the request command generated by the request command generation unit 55 includes the "SHOOT" command, the transmission/reception unit 51 transmits (outputs) a control signal indicating an imaging request to the general imaging apparatus 23. Then, the transmission/reception unit 31 of the robot 10 receives the request command ("ARM" and "SHOOT") from the display terminal 50 via the management server 90.

In step S105*a*, the arm operation control unit 39 of the robot 10 transforms the manipulation arm 11 based on the request command received by the transmission/reception unit 31. Then, the arm operation control unit 39 changes the direction or orientation of the manipulation arm 11 by transforming the manipulation arm 11 based on the "ARM" command included in the request command received by the transmission/reception unit 31, in which a position of the manipulation arm 11 may be changed. Since the process of changing the direction or orientation of the manipulation arm 11 by the arm operation control unit 39 is the same as the processing in step S93 of FIG. 34, the description thereof will be omitted.

In step S106*a*, the imaging instruction unit 36 of the robot 10 outputs an instruction information indicating an imaging instruction to the general imaging apparatus 23 in response to a completion of changing the direction or orientation of the manipulation arm 11 by the arm operation control unit 39. Then, the general imaging apparatus 23 performs the imaging process in response to the imaging instruction output from the imaging instruction unit 36. In this case, the general imaging apparatus 23 acquires the detailed image data 250, which is the detailed image captured in the direction or orientation of the manipulation arm 11 changed by the arm operation control unit 39.

In step S107*a*, the image acquisition unit 37 of the robot 10 acquires the detailed image data 250 captured by the general imaging apparatus 23, from the general imaging apparatus 23.

In step S108*a*, the storing/reading unit 41 of the robot 10 stores the detailed image data 250 acquired by the image acquisition unit 37 in the storage unit 5000.

In step S109*a*-1 and S109*a*-2, the transmission/reception unit 31 of the robot 10 transmits the detailed image data 250 acquired by the image acquisition unit 37 to the display terminal 50 via the management server 90. Then, the transmission/reception unit 51 of the display terminal 50 receives the detailed image data 250 transmitted from the robot 10. It should be noted that the processing order of steps 108*a* and S109*a*-1 and S109*a*-2 can be changed or can be performed in parallel with each other.

In step S110*a*, the storing/reading unit 57 of the display terminal 50 stores the detailed image data 250 acquired by the transmission/reception unit 51 in the storage unit 5000.

In step S111*a*, the display control unit 53 of the display terminal 50 displays the detailed image data 250, received by the transmission/reception unit 51, on the display 512. With this configuration, the display control unit 53 switches the image displayed on the display 512 from the full-view spherical image data 200 (e.g., display screen 600*a* in FIG. 27) to the detailed image data 250 (e.g., display screen 650 in FIG. 35). That is, the display terminal 50 outputs the detailed image data 250 based on the state information 150 received (acquired) by the processing in step S101*a*-2. It should be noted that the order of processing in step S110*a* and step S111*a* can be changed or can be performed in parallel with each other.

As above described, the remote-control system 1*a* can switch the display of the full-view spherical image data 200 and the detailed image data 250 displayed on the display terminal 50 based on the movement state of the robot 10. For example, when the robot 10 is moving, the display terminal 50 displays the full-view spherical image data 200, capable of viewing a wider range of the circumference or surroundings of the robot 10, and when the robot 10 is stopped, the display terminal 50 displays the detailed image data 250, capable of viewing the circumference or surroundings of the robot 10 with the higher image quality. Therefore, for example, when the robot 10 is moving, the remote-control system 1a can assist the operator to operate the robot 10 by checking the ground (foot area) and the surroundings of the robot 10, and can assist the operator to move the robot 10 without colliding with surrounding persons and objects, with which the operability of the robot 10 can be improved.

Further, since the probability that the robot 10 collides with surrounding persons and objects is lower when the robot 10 is stopped, the remote-control system 1a can assist the operator operating the robot 10 to confirm a specific region around the robot 10 with higher image quality by displaying the detailed image data 250 on the display terminal 50. Therefore, the remote-control system 1a can improve the operability of the robot 10 and the resolution of the displayed image by switching the image display on the operation screen (display screen) based on the movement state of the robot 10.

Further, the display terminal 50 can be configured to generate the request command if the determination unit 54 has determined that the robot 10 is stopped in step S102a and then the determination unit 54 determines or detects that the robot 10 is not stopped (i.e., the robot 10 is moving again) after the determination unit 54 has determined that the robot 10 is stopped in step S102a.

Further, the display terminal 50 can be configured to generate the request command if the determination unit 54 has determined that the robot 10 is stopped in step S102a and then a given time period elapses after the determination unit 54 has determined that the robot 10 is stopped in step S102a.

With this configuration, even if the robot 10 is being stopped at the same position, the remote-control system 1a can reduce the probability that the detailed image data 250 is acquired by the general imaging apparatus 23 and then displayed on the display terminal 50, with which wasteful processing such as acquiring the detailed image data 250 while the robot 10 is being stopped at the same position can be reduced. Further, with this configuration, the remote-control system 1a can reduce the processing load of the robot 10 and the display terminal 50 and prevent the occurrence of communication delay caused by the congestion of the communication network 9.

Figure 38:
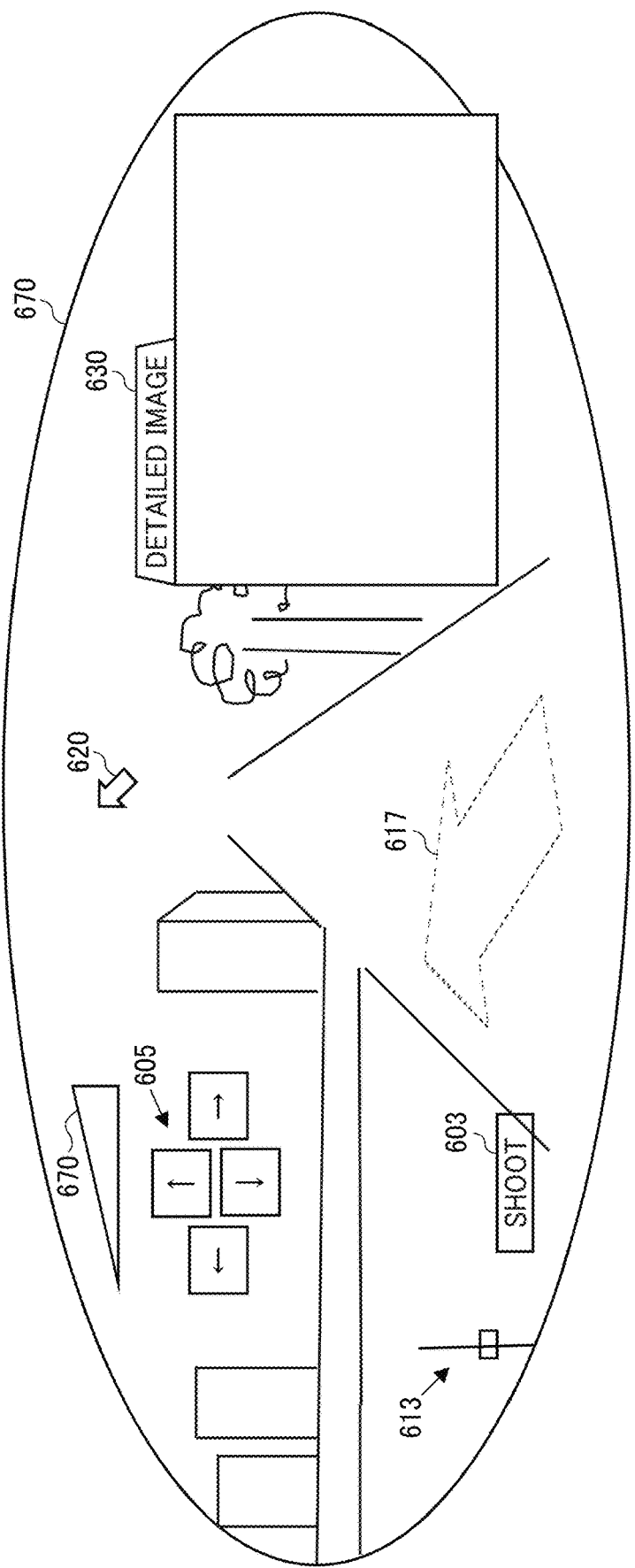
FIG. 38 is an example of a display screen displayed on a head-mount display used as an example of a display terminal.

Example of Another Display Screen:

Hereinafter, a description is given of another example of the display screen displayed on the display terminal 50. The display terminal 50 can be configured to display different display screens depending on the types of display 512 provided for the display terminal 50. FIG. 38 is an example of a display screen 670 displayed on a head-mount display (HMI)) used as an example of the display terminal 50. The display screen 670 illustrated in FIG. 38 is an example of a screen displayed on the head mount display (HMD), in which the full-view spherical image data 200 and the detailed image data 250 transmitted from the robot 10 are displayed.

In the display screen 670 illustrated in FIG. 38, a display field of the full-view spherical image data 200 is set in the entire display screen 670, and the second display field 630 of the detailed image data 250 are superimposed at least partially on the display screen 670. An operator fitted with the head mount display (HMD) displaying the display screen 670 can view any direction in the full-view spherical image data 200 by changing the head orientation of the operator. Further, since various buttons or icons displayed on the display screen 670 move in accordance with the head orientation of the operator, even if the first image capture direction of the full-view spherical image data 200 is changed, various buttons or icons can be displayed at specific positions on the display screen 670.

As to the above described first embodiment, the display terminal 50 can be used to control the robot 10 (an example of movable apparatus) including the special imaging apparatus 21 (an example of first imaging apparatus), which captures images of objects and acquiring the full-view spherical image data 200 (an example of first image), and the general imaging apparatus 23 (an example of second imaging apparatus), which captures a part or portion of the objects captured by the special imaging apparatus 21 (an example of second image). Based on the state information 150 indicating the movement state of the robot 10, the display terminal 50 switches the image displayed on the display 512 (an example of the display unit) between the full-view spherical image data 200 and the detailed image data 250. Therefore, the display terminal 50 can implement advanced control when the remote control is performed for the robot 10 equipped with the special imaging apparatus 21 and the general imaging apparatus 23.

Further, when the robot 10 is stopped, the display terminal 50 of the first embodiment displays the detailed image data 250 (an example of second image) on the display 512 (an example of display unit). Therefore, for example, when the robot 10 is moving, the display terminal 50 displays the full-view spherical image data 200, with which the robot 10 can be operated while preventing the robot 10 from colliding with surrounding persons and objects by confirming the ground (foot area) and the surroundings of the robot 10, so that the operability of the robot 10 can be improved. Further, since the probability that the robot 10 collides with surrounding persons and targets (e.g., objects) is lower when the robot 10 is stopped, the remote-control system 1a can assist the operator operating the robot 10 to confirm a specific region around the robot 10 with higher image quality by displaying the detailed image data 250 on the display terminal 50. Therefore, the display terminal 50 can improve the operability of the robot 10 and the resolution of the display image by switching the display of the operation screen (display screen) based on the movement state of the robot 10.

Further, the display terminal 50 of the first embodiment displays the detailed image data 250 (an example of second image), acquired by imaging the second image capture direction determined based on the first image capture direction of the full-view spherical image data 200 (an example of first image) displayed on the display 512 (an example of display unit), using the general imaging apparatus 23 (an example of second imaging apparatus). Therefore, the display terminal 50 can allow the operator who operates the robot 10 using the display terminal 50 to confirm the details of a part or portion of the targets (e.g., objects) included in the full-view spherical image data 200 displayed on the display 512.

Further, when the robot 10 is moving, the display terminal 50 of the first embodiment displays the full-view spherical image data 200 (an example of first image) having reduced image quality on the display 512 (an example of display unit). With this configuration, the display terminal 50 can prevent the deterioration of the operability caused by the time lag of the display screen due to the communication delay and the like.

Further, the display terminal 50 of the first embodiment displays the video image data on the display 512 (an example of display unit) as the full-view spherical image data 200 (an example of first image) and displays the still image data on the display 512 as the detailed image data 250 (an example of second image). Therefore, the display terminal 50 can allow the operator who operates the robot 10 using the display terminal 50 to perform the remote control of the robot 10 by checking the video image data of the full-view spherical image that is played on the display terminal 50 using the streaming play, and can display the detailed information of a specific region using the still image data of the detailed image, with which the operability of the robot 10 can be improved.

In the remote-control system 1*a* according to the first embodiment, the display terminal 50 is an example of an output control apparatus (or control apparatus) according to the embodiment of the present invention. The display terminal 50 used as the output control apparatus controls the robot 10 (an example of movable apparatus) including the special imaging apparatus 21 (an example of first imaging apparatus), which captures images of objects and acquires the full-view spherical image data 200 (an example of first image), and the general imaging apparatus 23 an example of the second imaging apparatus), which captures a part or portion of the objects captured by the special imaging apparatus 21 (an example of second image), and outputs the full-view spherical image data 200 and the detailed image data 250. Then, the display terminal 50 used as the output control apparatus acquires (receives) the state information 150 indicating the movement state of the robot 10, and outputs (displays) the full-view spherical image data 200 and the detailed image data 250 selectively based on the acquired state information 150. Therefore, the display terminal 50 used as the output control apparatus can implement advanced control when the remote control is performed for the robot 10 equipped with the special imaging apparatus 21 and the general imaging apparatus 23.

Further, in the remote-control system 1*a* according to the first embodiment, the display terminal 50 is an example of imaging control apparatus according to the first embodiment. The display terminal 50 used as the imaging control apparatus controls the robot 10 including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of the second image). Then, the display terminal 50 used as the imaging control apparatus receives (acquires) the state information 150 indicating the movement state of the robot 10, and outputs (transmits) a request command (an example of control signal) indicating the imaging request to the general imaging apparatus 23 based on the acquired state information 150. Therefore, the display terminal 50 used as the imaging control apparatus can implement advanced control when the remote control is performed for the robot 10 equipped with the special imaging apparatus 21 and the general imaging apparatus 23.

Second Embodiment

Hereinafter, a description is given of a remote-control system 1*b* according to a second embodiment. The same configuration and the same function as those of the first embodiment are denoted by the same reference numerals, and the description thereof will be omitted. The remote-control system 1*b* according to the second embodiment is a system that the control device 30 included in the robot 10 (i.e., robot 10 itself) determines the image (i.e., full-view spherical image or detailed image) to be transmitted (output) to the display terminal 50 based on the movement state of the robot 10.

The hardware configuration and the functional configuration of the apparatus or terminal (e.g., robot 10, display terminal 50, management server 90) configuring the remote-control system 1*b* according to the second embodiment are the same as those of the apparatus or terminal (e.g., robot 10, display terminal 50, management server 90) configuring the remote-control system 1*a* according to the first embodiment, and thereby the description thereof will be omitted.

FIG. 39 is an example of a sequence diagram illustrating a process of switching the image displayed on the display terminal 50 in an environment of the remote-control system 1*b* according to the second embodiment. In FIG. 39, the processing performed by the control device 30 included in the robot 10 will be described as the processing performed by the robot 10. Further, FIG. 39 illustrates an example case that the display screen 600*a* (displaying full-view spherical image data 200) illustrated in FIG. 27 is displayed on the display 512 of the display terminal 50.

In step S101*b*, the state information generation unit 35 of the robot 10 generates the state information 150 (FIG. 28) indicating the movement state of the robot 10 based on the drive state of the movement mechanism 17 acquired from the movement control unit 38. With this configuration, the state information generation unit 35 acquires the state information 150 (an example of acquisition step).

In step S102*b*, if the determination unit 34 of the robot 10 determines that the robot 10 is stopped based on the state information 150 (S102*b*YES), the determination unit 34 proceeds the sequence to step S103*b*. Specifically, the determination unit 34 of the robot 10 determines or detects that the robot 10 is stopped when the numerical value of the variable of "SPEED" included in the state information 150 generated (acquired) by the state information generation unit 35 is "0 km/h." It should be noted that the value of the variable of "SPEED" used for determining that the robot 10 is stopped is not limited to "0 km/h." For example, the determination unit 34 of the robot 10 can be configured to determine or detect that the robot 10 is stopped if the numerical value of the variable of "SPEED" is less than or equal to a specific threshold value.

On the other hand, in step S102*b*, if the determination unit 34 of the robot 10 determines or detects that the robot 10 is not stopped but is moving based on the state information 150 (S102*b*NO), the determination unit 34 terminates or ends the sequence.

In step S103*b*, the arm operation control unit 39 of the robot 10 transforms the manipulation arm 11 based on the state information 150 generated (acquired) by the state information generation unit 35. Specifically, the arm operation control unit 39 changes the direction or orientation of the manipulation arm 11 in the direction indicated by the values of the variables of "H_ANGLE" and "V_ANGLE" included in the state information 150. That is, the arm operation control unit 39 changes the direction or orientation of the manipulation arm 11 in the same direction of the traveling direction of the robot 10.

In step S104*b*, the imaging instruction unit 36 of the robot 10 outputs an instruction information indicating the imaging instruction to the general imaging apparatus 23 in response to a completion of changing the direction or orientation of the manipulation arm 11 by the arm operation control unit 39. Then, the general imaging apparatus 23 performs the imaging process in response to the imaging instruction output from the imaging instruction unit 36. In this case, the general imaging apparatus 23 acquires the detailed image data 250, which is a detailed image captured in the direction or orientation of the manipulation arm 11 changed by the arm operation control unit 39.

In step S105b, the image acquisition unit 37 of the robot 10 acquires the detailed image data 250 acquired by the general imaging apparatus 23, from the general imaging apparatus 23.

In step S106b, the storing/reading unit 41 of the robot 10 stores the detailed image data 250 acquired by the image acquisition unit 37 in the storage unit 3000.

In steps S106b-1 and S106b-2, the transmission/reception unit 31 of the robot 10 transmits the detailed image data 250 acquired by the image acquisition unit 37 to the display terminal 50 via the management server 90. That is, the robot 10 outputs the detailed image data 250 based on the state information 150 generated (acquired) by the processing in step S101b. Then, the transmission/reception unit 51 of the display terminal 50 receives the detailed image data 250 transmitted from the robot 10 via the management server 90. It should be noted that the order of processing in step S106b and steps S106b-1 and S106b-2 can be changed or can be performed in parallel with each other.

In step S107b, the storing/reading unit 57 of the display terminal 50 stores the detailed image data 250 received by the transmission/reception unit 51 in the storage unit 5000.

In step S108b, the display control unit 53 of the display terminal 50 displays, on the display 512, the detailed image data 250 received by the transmission/reception unit 51. It should be noted that the order of steps S107b and S108b can be changed or can be performed in parallel with each other.

Further, the robot 10 can be configured to perform the transformation processing of the manipulation arm 11 if the determination unit 34 of the robot 10 has determined that the robot 10 is stopped in step S102b and then the determination unit 34 determines or detects that the robot 10 is not stopped (i.e., the robot 10 is moving again) after the determination unit 34 has determined that the robot 10 is stopped in step S102b.

Further, the robot 10 can be configured to perform the transformation processing of the manipulation arm 11 if the determination unit 34 of the robot 10 has determined that the robot 10 is stopped in step S102b and then a given time period elapses after the determination unit 34 has determined that the robot 10 is stopped in step S102b.

With this configuration, even if the robot 10 is being stopped at the same position, the remote-control system 1b can reduce the probability that the detailed image data 250 is acquired by the general imaging apparatus 23 and then displayed on the display terminal 50, with which wasteful processing such as acquiring the detailed image data 250 while the robot 10 is being stopped at the same position can be reduced. Further, with this configuration, the remote-control system 1b can reduce the processing load of the robot 10 and the display terminal 50 and prevent the occurrence of communication delay caused by the congestion of the communication network 9.

As to the above described remote-control system 1b of the second embodiment, the control device 30 (an example of information processing apparatus) included in the robot 10 (an example of movable apparatus) determines the image (i.e., the full-view spherical image data 200 or detailed image data 250) to be transmitted to the display terminal 50 based on the movement state of the robot 10. Therefore, as to the remote-control system 1b, by transmitting an appropriate image from the robot 10 to the display terminal 50 based on the movement state of the robot 10, the occurrence of time lag of the display screen due to communication delay can be prevented, and by displaying an image suitable for the operator of the robot 10 on the display terminal 50, the remote control of the robot 10 including the special imaging apparatus 21 and the general imaging apparatus 23 can be implemented with higher accuracy.

Further, the control device 30 (an example of information processing apparatus) included in the robot 10 according to the second embodiment can communicate with, via the communication network 9, the display terminal 50 that controls the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image). Then, based on the movement state of robot 10, the control device 30 transmits the full-view spherical image data 200 or the detailed image data 250, acquired from the special imaging apparatus 21 or the general imaging apparatus 23, to the display terminal 50 to switch the image display between the full-view spherical image data 200 and the detailed image data 250 displayed on the display terminal 50. Therefore, the control device 30 can implement advanced control when the remote control is performed for the robot 10 equipped with the special imaging apparatus 21 and the general imaging apparatus 23.

In the remote-control system 1b according to the second embodiment, the control device 30 included in the robot 10 is an example of an output control apparatus according to the embodiment of the present invention. The control device 30 (an example of information processing apparatus) used as the output control apparatus controls the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image). Then, the control device 30 used as the output control apparatus acquires the state information 150 indicating the movement state of the robot 10, and outputs (transmits) the full-view spherical image data 200 and the detailed image data 250 selectively based on the acquired state information 150. Therefore, the control device 30 used as the output control apparatus can implement advanced control when the remote control is performed for the robot 10 equipped with the special imaging apparatus 21 and the general imaging apparatus 23.

In the remote-control system 1b according to the second embodiment, the control device 30 included in the robot 10 is an example of the imaging control apparatus according to the second embodiment. The control device 30 (an example of information processing apparatus) used as the imaging control apparatus controls the robot 10 (an example of movable apparatus) including the special imaging apparatus 21 (an example of first imaging apparatus), which captures images of objects and acquires the fill-view spherical image data 200 (an example of first image), and the general imaging apparatus 23 (an example of second imaging apparatus), which captures a part or portion of the objects captured by the special imaging apparatus 21 (an example of second image). Then, the control device 30 used as the imaging control apparatus acquires the state information 150 indicating the movement state of the robot 10, and outputs an instruction information (an example of control signal indicating an imaging request) for instructing the imaging request to the general imaging apparatus 23 based on the acquired state information 150. Therefore, the control device 30 used as the imaging control apparatus can implement advanced control when the remote control is performed using the robot 10 equipped with the special imaging apparatus 21 and the general imaging apparatus 23.

Third Embodiment

Hereinafter, a description is given of a remote-control system 1c according to a third embodiment. The same configuration and the same function as those of the first or second embodiments are denoted by the same reference numerals, and the description thereof will be omitted. The remote-control system 1c according to the third embodiment is a system using an image processing server 70 to determine the image (i.e., the full-view spherical image or detailed image) to be transmitted to the display terminal 50 based on the movement state of the robot 10.

System Configuration:

At first, with reference to FIG. 40, a description is given of a configuration of the remote-control system 1c according to the third embodiment. FIG. 40 illustrates an example of a system configuration of the remote-control system 1c according to the third embodiment. As illustrated in FIG. 40, the remote-control system 1c of the third embodiment is devised by adding the image processing server 70 to the configuration illustrated in FIG. 1. The image processing server 70 is communicably connected to the robot 10, the display terminal 50 and the management server 90 via the communication network 9. The image processing server 70 transmits and receives image data with the robot 10 and the display terminal 50 using a communication session established by the management server 90.

The image processing server 70 may be a single server, or the image processing server 70 can be configured with a plurality of servers to perform the distributed image processing. The image processing server 70 performs the image processing on the fill-view spherical image data 200 transmitted from the robot 10 based on the movement state of the robot 10, and transmits the processed image data to the display terminal 50. The image processing server 70 can be configured by a plurality of servers, and the function can be provided to any server. The image processing server 70 is an example of information processing apparatus in this description.

The image processing server 70 and the management server 90 can be configured as a server system 7. The image processing server 70 and the management server 90 can be configured by a single server. Further, the display terminal 50 and the image processing server 70 can be configured as a display system 5. Further, the robot 10 (10A, 10B, 10C) and the image processing server 70 can be configured as a movable apparatus control system 3 (transmission control system).

Since the hardware configuration of the image processing server 70 is the same as the hardware configuration of the management server 90 illustrated in FIG. 15, the description thereof will not be omitted. Hereinafter, a description is given that the image processing server 70 employs the hardware configuration illustrated in FIG. 15.

Figure 41A:
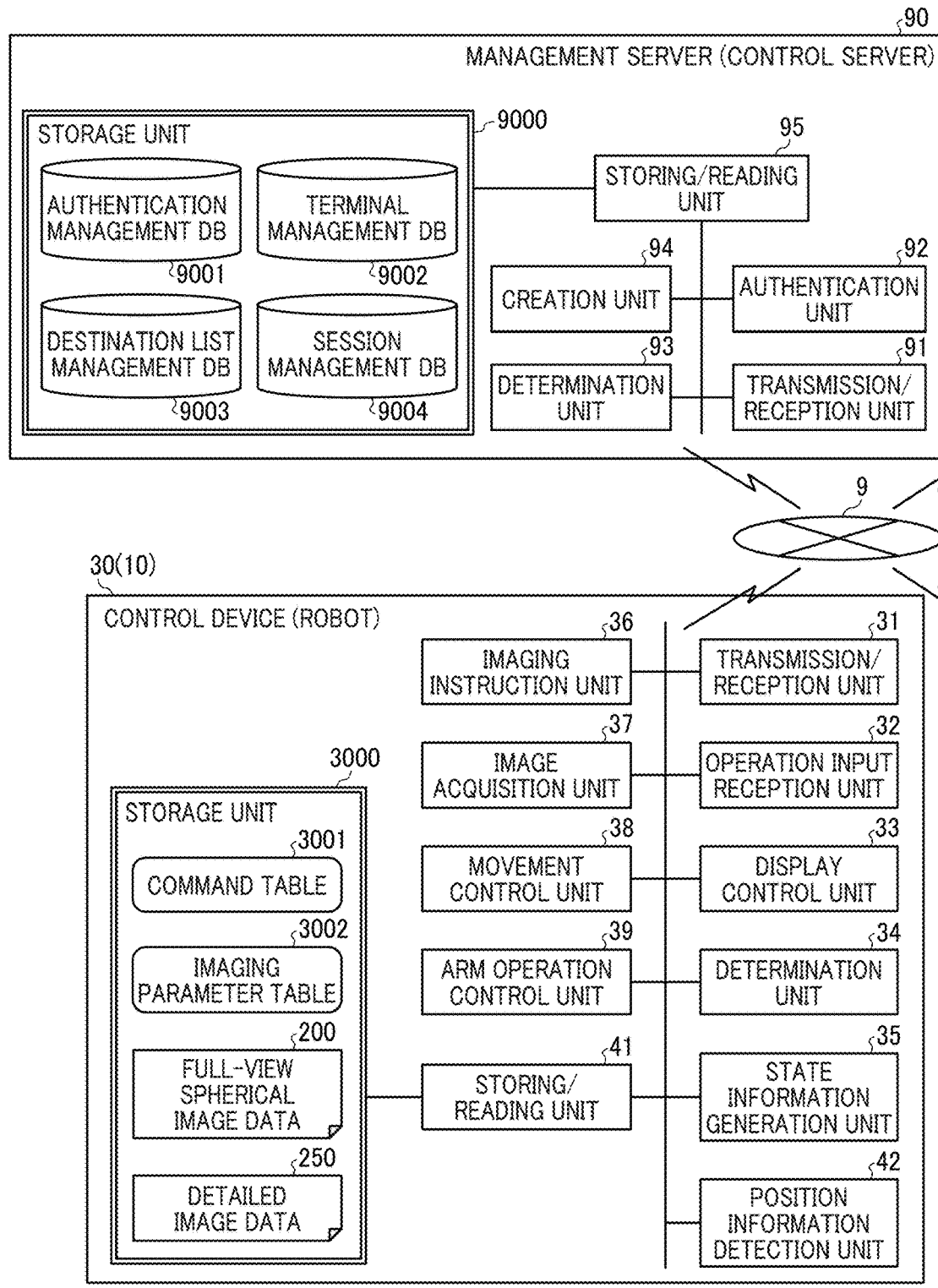
FIGS. 41A and 41B (FIG. 41) illustrate an example of a functional block diagram of a remote-control system according to a third embodiment.
Figure 41B:
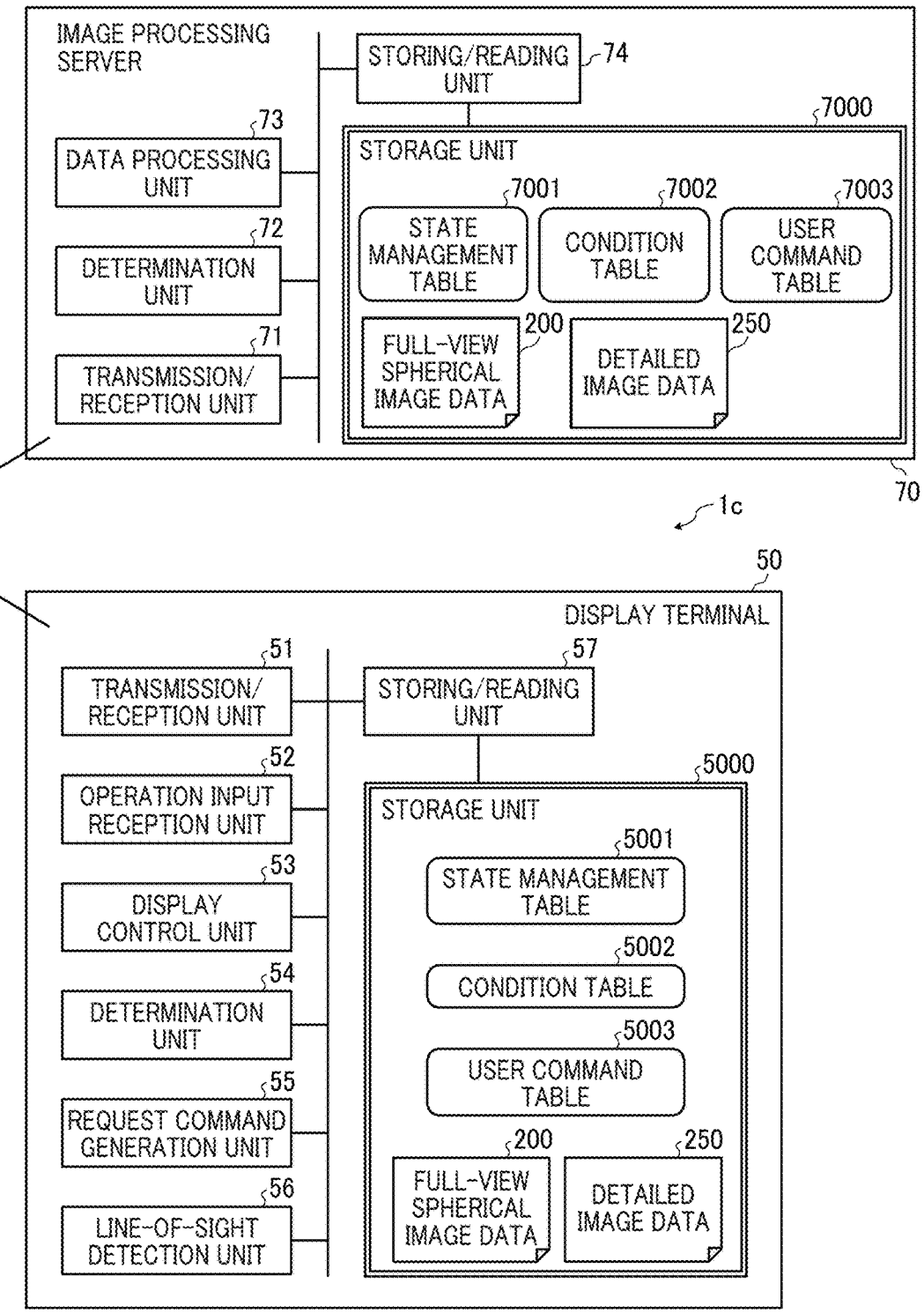

Functional Configuration:

FIGS. 41A and 41B (FIG. 41) illustrate an example of a functional block diagram of the remote-control system 1c according to the third embodiment. The functions implementable by the image processing server 70 include, for example, a transmission/reception unit 71, a determination unit 72, a data processing unit 73, a storing/reading unit 74, and a storage unit 7000.

The transmission/reception unit 71 transmits and receives various data or information to and from another device (e.g., management server 90, display terminal 50, robot 10) via the communication network 9. For example, the transmission/reception unit 71 receives (acquires) the full-view spherical image data 200 or the detailed image data 250 from the robot 10 (control device 30) via the communication network 9. Further, for example, the transmission/reception unit 71 receives (acquires) the state information 150 indicating the movement state of the robot 10 from the robot 10 (the control device 30) via the communication network 9. Further, for example, based on the received state information 150, the transmission/reception unit 71 transmits (outputs) the full-view spherical image data 200 or the detailed image data 250, received from the robot 10 (the control device 30), to the display terminal 50. The transmission/reception unit 71 is mainly implemented by the CPU 901 and the network I/F 909 of FIG. 15. The transmission/reception unit 71 is an example of a first acquisition unit in this description. Further, the transmission/reception unit 71 is an example of a second acquisition unit in this description. Further, the transmission/reception unit 71 is an example of a second transmission unit in this description. Further, the transmission/reception unit 71 is an example of a second reception unit in this description.

Based on the state information 150 received (acquired) by the transmission/reception unit 71, the determination unit 72 determines a specific process to be performed on the full-view spherical image data 200, or a specific process to be requested to the robot 10. The determination unit 72 is mainly implemented by processing performed by the CPU 901 of FIG. 15.

The data processing unit 73 has a function of performing a process of generating a request command, which is an execution request to execute a specific process on the full-view spherical image data 200 or a request command to perform a specific process at the robot 10 based on the state information 150 received (acquired) by the transmission/reception unit 71. For example, the data processing unit 73 generates the request command, which is an imaging request to the general imaging apparatus 23 included in the robot 10. The data processing unit 73 is mainly implemented by processing performed by the CPU 901 of FIG. 15.

The storing/reading unit 74 stores various data in the storage unit 7000 or reads various kinds of data from the storage unit 7000. The storing/reading unit 74 is mainly implemented by processing performed by the CPU 901 of FIG. 15. The storage unit 7000 is implemented mainly by the ROM 902, the HD 904, and the recording medium 906 of FIG. 15.

Further, the storage unit 7000 stores the full-view spherical image data 200 and the detailed image data 250 received by the transmission/reception unit 71. Further, the storage unit 7000 stores, for example, a state management table 7001, a condition table 7002, and a user command table 7003. Since the state management table 7001, the condition table 7002 and the user command table 7003 are the same as the state management table 5001 (FIG. 18), the condition table 5002 (FIG. 19) and the user command table 5003 (FIG. 20), the description thereof will be omitted. Further, the full-view spherical image data 200 and the detailed image data 250 stored in the storage unit 7000 can be deleted when a specific time has elapsed after receiving the data by the transmission/reception unit 71, or the full-view spherical image data 200 and the detailed image data 250 can be deleted when a specific time elapses after the transmission/reception unit 71 has transmitted (output) the full-view spherical image data 200 and the detailed image data 250 to the display terminal 50.

Figure 43:
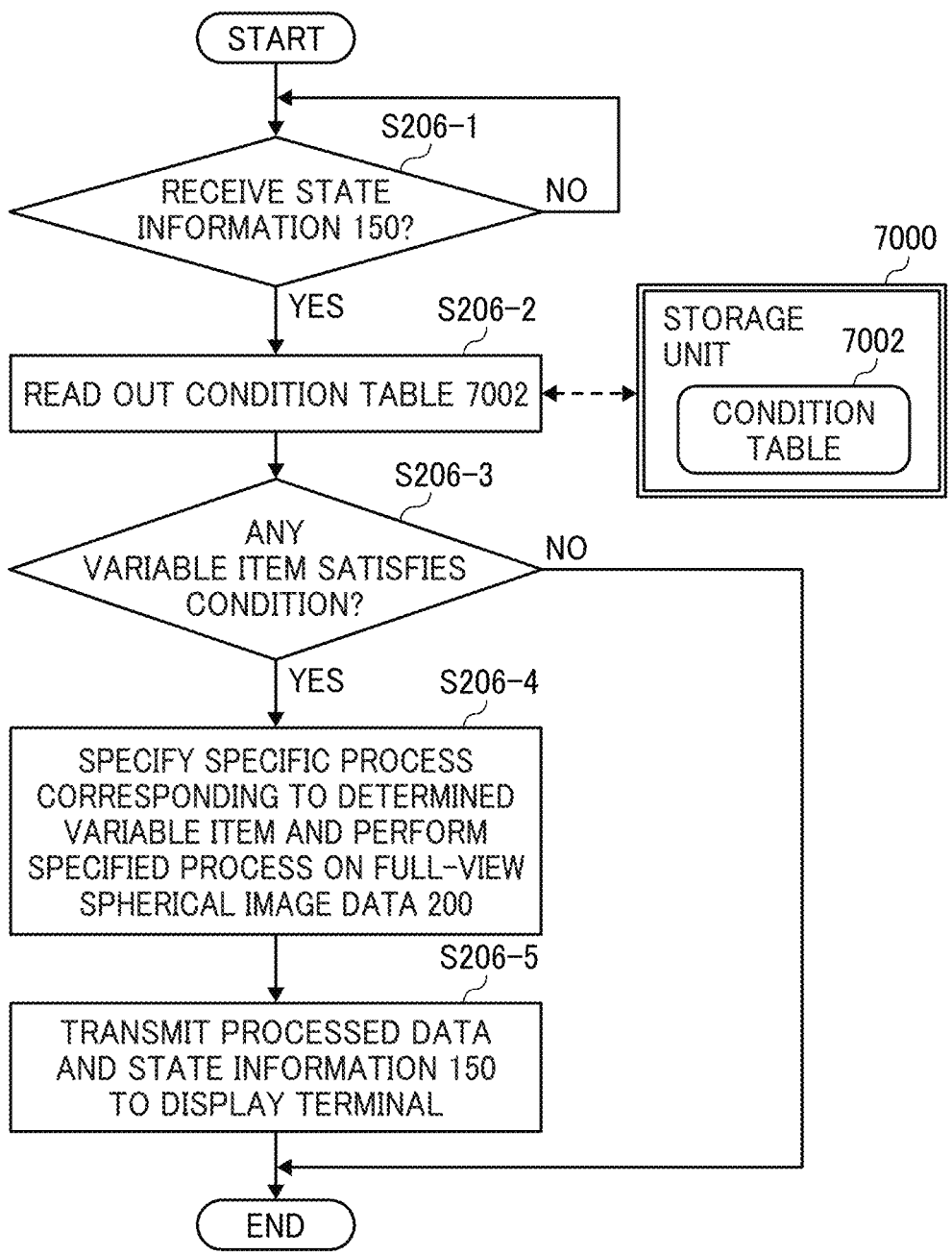
FIG. 43 is an example: of a flowchart illustrating image processing on a full-view spherical image data based on the movement state of a robot in an image processing server according to a third embodiment.

Processing and Operation in Third Embodiment:

Hereinafter, a description is given of the operation and processing of the remote-control system 1c according to the third embodiment with reference to FIGS. 42 and 43. In FIG. 42 and FIG. 43, the processing performed by the control device 30 included in the robot 10 will be described as the processing performed by the robot 10. FIG. 42 is an example of a sequence diagram illustrating the processing when the robot 10 moves in an environment of the remote-control system 1c according to the third embodiment.

In steps S201-1, S201-2, and S201-3, the transmission/reception unit 31 of the robot 10 transmits the full-view spherical image data 200, which is the full-view spherical image captured by the special imaging apparatus 21, to the display terminal 50 using a communication session established with the management server 90. Then, the transmission/reception unit 51 of the display terminal 50 receives the full-view spherical image data 200.

In step S202, the display control unit 53 of the display terminal 50 displays, on the display 512, the full-view spherical image data 200, received by the transmission/reception unit 51, as the display screen 600a (FIG. 27). With this configuration, the operator who operates the robot 10 using the display terminal 50 can confirm the status of the site where the robot 10 is located by viewing the display screen 600a displaying the full-view spherical image data 200.

In step S203, the robot 10 moves within the site based on a request command transmitted from the display terminal 50. In this case, the movement control unit 38 of the robot 10 controls the movement mechanism 17 based on the request command transmitted from the display terminal 50.

In step S204, the state information generation unit 35 of the robot 10 generates the state information 150 (FIG. 28) based on the movement state of the robot 10 acquired from the movement control unit 38.

In steps S205-1 and S205-2, the transmission/reception unit 31 of the robot 10 transmits the state information 150 generated by the state information generation unit 35 to the image processing server 70 using the communication session established with the management server 90. Then, the transmission/reception unit 71 of the image processing server 70 receives (acquires) the state information 150 from the robot 10 via the management server 90 (an example of acquisition step).

In step S206, the data processing unit 73 of the image processing server 70 performs the image processing on the full-view spherical image data 200 received in step S201-2 based on the state information 150 received (acquired) by the transmission/reception unit 71 in step S205-2.

Hereinafter, a description is given of the image processing in the image processing server 70, FIG. 43 is an example of a flowchart illustrating the image processing on the full-view spherical image data based on the movement state of the robot 10 in the image processing server 70 according to the third embodiment.

In step S206-1, if the transmission/reception unit 71 of the image processing server receives (acquires) the state information 150 transmitted from the robot 10 (5206-1: YES), the sequence proceeds to step S206-2. On the other hand, if the transmission/reception unit 71 does not receive the state information 150 (5206-1: NO), the transmission/reception unit 71 repeats step S206-1.

In step S206-2, the storing/reading unit 74 of the image processing server 70 reads out the condition table 7002 stored in the storage unit 7000.

In step S206-3, the determination unit 72 of the image processing server 70 searches the condition table 7002 read out by the storing/reading unit 74, and if there is at least one variable that satisfies the conditions included in the condition table 7002 among the variables included in the state information 150 received by the transmission/reception unit 71 (S206-3: YES), the determination unit 72 proceeds the sequence to step S206-4. For example, when the numerical value corresponding to the variable name of "SPEED" included in the state information 150 is "3.0 km/h," the determination unit 72 determines that "SPEED≤5.0 km/h," "SPEED>1.0 km/h" and "SPEED>2.0 km/h" satisfy the condition among the items included in the condition table 7002.

On the other hand, in step S206-3, if the determination unit 72 determines that none of the variables included in the state information 150 received by the transmission/reception unit 71 satisfies the condition included in the condition table 7002 (S206-3: NO), the determination unit 72 terminates or end the sequence.

In step S206-4, the data processing unit 73 of the image processing server 70 specifies a specific process corresponding to the concerned variable item determined in step S206-3 and then performs the specified process on the full-view spherical image data 200. For example, the data processing unit 73 specifies a specific process corresponding to each of "SPEED≤5.0 km/h," "SPEED>1.0 km/h" and "SPEED>2.0 km/h" satisfying the condition included in the condition table 7002. Then, the data processing unit 73 of the image processing server 70 performs the specific process (e.g., execution of process). In this case, the data processing unit 73 returns the frame rate of the full-view spherical image data 200 to the initial state and performs the process of reducing the resolution to 50%. Further, the data processing unit 73 also generates an image that is zoomed out (ZOOM=−10) compared to the initial state of the full-view spherical image data 200. Further, the data processing unit 73 can be configured to perform all of the processes corresponding to the items satisfying the conditions, or execute one or more processing corresponding to the items selected (extracted) from the items satisfying the condition.

The description returns to FIG. 42. In step S207, the transmission/reception unit 71 of the image processing server 70 transmits the data processed by the data processing unit 73 (i.e., processed full-view spherical image data 200) and the state information 150 transmitted from the robot 10 to the display terminal 50. Then, the transmission/reception unit 51 of the display terminal 50 receives the processed data (i.e., processed full-view spherical image data 200) and the state information 150.

In step S208, the storing/reading unit 57 of the display terminal 50 stores the state information 150, received by the transmission/reception unit 51, in the state management table 5001 (FIG. 18) stored in the storage unit 5000. Specifically, the storing/reading unit 57 of the display terminal 50 stores one or more numerical values corresponding to the one or more variable names included in the received state information 150 for the state management table 5001.

In step S209, the display control unit 53 of the display terminal 50 displays the movement state and the processed data (i.e., processed full-view spherical image data 200) of the robot 10 on the display screen 600 (e.g., display screen 600*b* illustrated in FIG. 29A).

Figure 44:
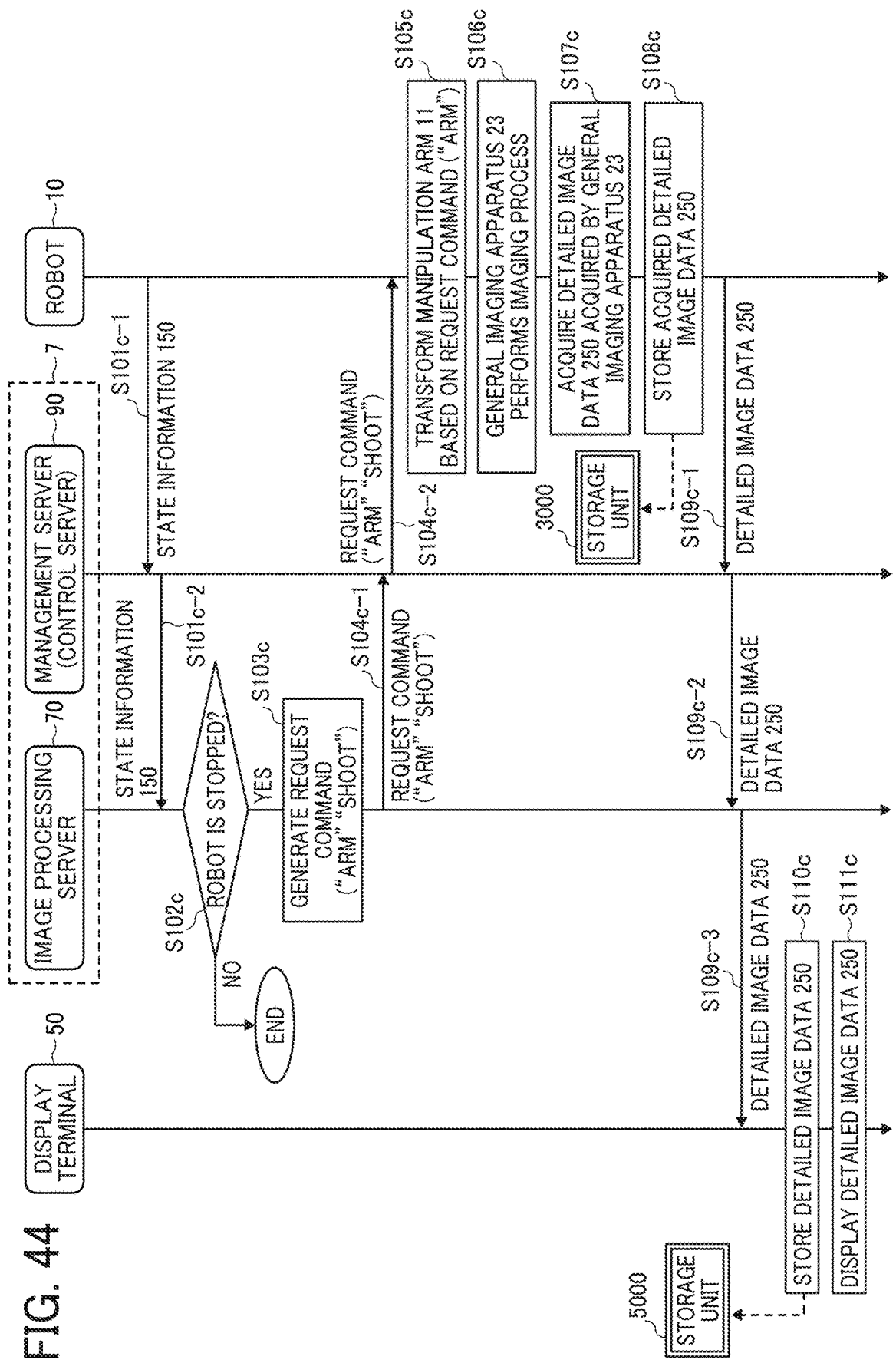
FIG. 44 is an example of a sequence diagram illustrating a process of switching an image displayed on a display terminal in an environment of a remote-control system according to a third embodiment.

Hereinafter, a description is given of a process of switching the image display between the full-view spherical image and the detailed image at the display terminal 50 using the image processing server 70 with reference to FIG. 44. FIG. 44 is an example of a sequence diagram illustrating a process of switching the image displayed on the display terminal 50 in an environment of in the remote-control system 1*c* according to the third embodiment. FIG. 44 illustrates an example case that the display screen 600*a* (displaying full-view spherical image data 200) illustrated in FIG. 27 is displayed on the display terminal 50 in the same manner in FIG. 39.

In step S101*c*-1 and S101*c*-2, the transmission/reception unit 31 of the robot 10 transmits the state information 150 (FIG. 28) generated by the state information generation unit 35 to the image processing server 70 using a communication session established with the management server 90. Then, the transmission/reception unit 71 of the image processing server 70 receives (acquires) the state information 150 from the robot 10 via the management server 90 (an example of acquisition step).

In step S102*c*, if the robot 10 is stopped (S102*c*: YES), the image processing server 70 proceeds the sequence to step S103*c*. Specifically, the determination unit 72 of the image processing server 70 determines that the robot 10 is stopped if the value of the variable of "SPEED" included in the state information 150 received by transmission/reception unit 71 is "0 km/h." It should be noted that the numerical value of the variable of "SPEED" used for determining that the robot 10 is stopped is not limited to "0 km/h." For example, the determination unit 72 of the image processing server 70 can be configured to determine that the robot 10 is stopped if the numerical value of the variable of "SPEED" is less than or equal to a specific threshold value.

On the other hand, in step S102*c*, if the determination unit 72 determines (detects) that the robot 10 is not stopped but is moving (S102*c*: NO), the determination unit 72 terminates or ends the sequence.

In step S103*c*, the data processing unit 73 of the image processing server 70 generates a request command including the "ARM" command and the "SHOOT" command. As illustrated in the command table 3001 (FIG. 17A), the processing of the robot 10 corresponding to the "SHOOT" command is "imaging by the general imaging apparatus 23." That is, the data processing unit 73 generates a control signal indicating an imaging request to the general imaging apparatus 23. Further, the variable (h,v) of the "ARM" command included in the request command is the direction that the robot 10 is facing currently.

Specifically, the data processing unit 73 specifies the variable (h,v) using the information on the traveling direction included in the state information 150 received (acquired) by the transmission/reception unit 71 when the robot 10 was moving most recently. Further, the variable (h,v) of the "ARM" command included in the request command may correspond to the center position on the screen in the first image capture direction of the full-view spherical image data 200 displayed on the display screen 600*a*. Further, the variable (h,v) of the "ARM" command may correspond to a position specified by the mouse pointer 620 on the screen in the first image capture direction of the full-view spherical image data 200 displayed on the display screen 600*a*. In this case, it is assumed that the image processing server 70 acquires information on the display state of the display screen 600*a* from the display terminal 50.

In steps S104*c*-1 and S104*c*-2, the transmission/reception unit 71 of the image processing server 70 transmits the request command ("ARM" and "SHOOT") generated by the data processing unit 73 to the robot 10. In this case, since the request command generated by the data processing unit 73 includes the "SHOOT" command, the transmission/reception unit 71 transmits (outputs) a control signal indicating an imaging request to the general imaging apparatus 23. Then, the transmission/reception unit 31 of the robot 10 receives the request command ("ARM" and "SHOOT") from the image processing server 70 via the management server 90.

In step S105*c*, the arm operation control unit 39 of the robot 10 transforms the manipulation arm 11 based on the request command received by the transmission/reception unit 31. The arm operation control unit 39 changes the direction or orientation of the manipulation arm 11 by transforming the manipulation arm 11 based on the "ARM" command included in the request command received by the transmission/reception unit 31. Since the process of changing the direction or orientation of the manipulation arm 11 by the arm operation control unit 39 is the same as the processing in step S93 of FIG. 34, the description thereof will be omitted.

In step S106*c*, the imaging instruction unit 36 of the robot 10 outputs an instruction information indicating an imaging instruction to the general imaging apparatus 23 in response to a completion of changing the direction or orientation of the manipulation arm 11 by the arm operation control unit 39. Then, the general imaging apparatus 23 performs the imaging process in response to the imaging instruction output from the imaging instruction unit 36. In this case, the general imaging apparatus 23 acquires the detailed image data 250, which is a detailed image captured in the direction or orientation of the manipulation arm 11 changed by the arm operation control unit 39.

In step S107*c*, the image acquisition unit 37 of the robot 10 acquires the detailed image data 250 captured by the general imaging apparatus 23, from the general imaging apparatus 23.

In step S108*c*, the storing/reading unit 41 of the robot 10 stores the detailed image data 250 acquired by the image acquisition unit 37 in the storage unit 3000.

In steps S109*c*-1, S109*c*-2 and S109*c*-3, the transmission/reception unit 31 of the robot 10 transmits the detailed image data 250 acquired by the image acquisition unit 37 to the display terminal 50 via the server system 7. Then, the transmission/reception unit 51 of the display terminal 50 receives the detailed image data 250 transmitted from the robot 10. The transmission/reception unit 71 of the image processing server 70 receives the detailed image data 250 transmitted from the robot 10 in step S109*c*-2. Then, the transmission/reception unit 71 of the image processing server 70 outputs the received detailed image data 250 to the display terminal 50 in step S109*c*-3. That is, the image processing server 70 outputs the detailed image data 250 based on the state information 150 acquired in step S101*c*-2. It should be noted that the processing order of step S108*c* and steps S109*c*-1, S109*c*-2 and S109*c*-3 can be changed or can be performed in parallel with each other.

In step S110c, the storing/reading unit 57 of the display terminal 50 stores the detailed image data 250 received by the transmission/reception unit 51 in the storage unit 5000.

In step S111c, the display control unit 53 of the display terminal 50 displays the detailed image data 250 received by the transmission/reception unit 51 on the display 512. With this configuration, the display control unit 53 switches the image displayed on the display 512 from the full-view spherical image data 200 (e.g., display screen 600a in FIG. 27) to the detailed image data 250 (e.g., display screen 650 in FIG. 35). It should be noted that the order of processing in step S110c and step S111c can be changed or can be performed in parallel with each other.

Further, the image processing server 70 can be configured to generate the request command if the determination unit 72 has determined that the robot 10 is stopped in step S102c and then the determination unit 72 determines or detects that the robot 10 is not stopped (i.e., the robot 10 is moving again) after the determination unit 72 has determined that the robot 10 is stopped in step S102c.

Further, the image processing server 70 can be configured to generate the request command if the determination unit 72 has determined that the robot 10 is stopped in step S102c and then a given time period elapses after the determination unit 72 has determined that the robot 10 is stopped in step S102c.

With this configuration, even if the robot 10 is being stopped at the same position, the remote-control system 1c can reduce the probability that the detailed image data 250 is acquired by the general imaging apparatus 23 and then displayed on the display terminal 50, with which wasteful processing such as acquiring the detailed image data 250 while the robot 10 is being stopped at the same position can be reduced. Further, with this configuration, the remote-control system 1c can reduce the processing load of the robot 10 and the display terminal 50 and prevent the occurrence of communication delay caused by the congestion of the communication network 9.

As to the above described remote-control system 1c according to the third embodiment, the image processing server 70 (an example of information processing apparatus) determines the image (i.e., the full-view spherical image data 200 or the detailed image data 250) to be transmitted (output) to the display terminal 50 based on the movement state of the robot 10 (an example of movable apparatus). Therefore, as to the remote-control system 1c, by transmitting an appropriate image based on the movement state of the robot 10 from the image processing server 70 to the display terminal 50, occurrence of time lag of the display screen due to communication delay can be prevented, and by displaying an image suitable for the operator of the robot 10 on the display terminal 50, the remote control of the robot 10 including the special imaging apparatus 21 and the general imaging apparatus 23 can be implemented with higher accuracy.

Further, the image processing server 70 (an example of information processing apparatus) according to the third embodiment can communicate with, via the communication network 9, the display terminal 50 that controls the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image).

Further, based on the movement state of the robot 10, the image processing server 70 transmits the full-view spherical image data 200 or the detailed image data 250, received from the special imaging apparatus 21 or the general imaging apparatus 23 to the display terminal 50 to switch the imaged displayed on the display terminal 50 between the full-view spherical image data 200 and the detailed image data 250. Therefore, the image processing server 70 can reduce the processing load of the robot 10 and the display terminal 50, and can implement advanced control when the remote control is performed using the robot 10 equipped with the special imaging apparatus 21 and the general imaging apparatus 23.

In the remote-control system 1c according to the third embodiment, the image processing server 70 is an example of an output control apparatus according to the embodiment of the present invention. The image processing server 70 (an example of information processing apparatus) used as the output control apparatus controls the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image). Then, the image processing server 70 used as the output control apparatus acquires (receives) the state information 150 indicating the movement state of the robot 10, and outputs (transmits) the full-view spherical image data 200 and the detailed image data 250 selectively based on the acquired state information 150. Therefore, the image processing server 70 used as the output control apparatus can implement advanced control when the remote control is performed on the robot 10 equipped with the special imaging apparatus 21 and the general imaging apparatus 23.

Further, as to the remote-control system 1c according to the third embodiment, the image processing server 70 is an example of imaging control apparatus according to the present invention. The image processing server 70 (an example of information processing apparatus) used as the imaging control apparatus controls the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image). Then, the image processing server 70 used as the imaging control apparatus acquires (receives) the state information 150 indicating the movement state of the robot 10 and outputs (transmits) the instruction information (an example of control signal indicating imaging request) to instruct the imaging request to the general imaging apparatus 23 based on the acquired state information 150. Therefore, the image processing server 70 used as the imaging control apparatus can implement advanced control when the remote control is performed using the robot 10 equipped with the special imaging apparatus 21 and the general imaging apparatus 23.

As above described, the remote-control systems 1a and 1b according to the first and second embodiments include the robot 10 (an example of movable apparatus) including the special imaging apparatus 21 (an example of first imaging apparatus), which captures images of objects and acquires the full-view spherical image data 200 (an example of first image), and the general imaging apparatus 23 (an example of second imaging apparatus), which captures a part or portion of the objects captured by the special imaging apparatus 21 (an example of second image), and the display terminal 50 that can communicate with the robot 10 via the communication network 9 and can perform the remote control of the robot 10. Then, the remote-control systems 1a and 1b acquire the state information 150 indicating the movement state of the robot 10, and output the full-view spherical image data 200 and the detailed image data 250 selectively based on the acquired state information 150. Therefore, the remote-control systems 1a and 1b can implement the remote control of the robot 10 equipped with the special imaging apparatus 21 and the general imaging apparatus 23 with higher accuracy.

As to the above described embodiments of the present invention, the control of the movable apparatus equipped with the imaging apparatus, such as the special imaging apparatus 21 and the general imaging apparatus 23, can be performed with higher accuracy or precision.

Further, the remote-control system 1c according to the third embodiment includes the image processing server 70 (an example of information processing apparatus) that can communicate with the robot 10 and the display terminal 50 via the communication network 9. Therefore, the remote-control system 1c can reduce the processing load of the robot 10 and the display terminal 50, and can implement advanced control when the remote control is performed using the robot 10 equipped with the special imaging apparatus 21 and the general imaging apparatus 23.

The functions of each of the embodiments can be implemented by computer executable programs such as programs described in legacy programming languages and object oriented programming languages such as Assembler, C++, C++, Java (registered trademark) and the like, and stored on a computer-readable recording medium such as ROM, electrically erasable programmable read-only memory (EEPROM), erasable programmable read-only memory (EPROM), flash memory, flexible disk, CD-ROM, compact disc-rewritable (CD-RW), digital versatile disc (DVD)-ROM, DVD-RAM, DVD-RW, Blu-ray disc, secure digital (SD) card, magneto-optical disc (MO), or the like, and the computer executable program is distributable via telecommunication lines.

Further, some or all of the functions of each embodiment can be implemented on programmable devices (PD) such as field programmable gate array (FPGA) or the like, or can be implemented as application specific integrated circuits (ASIC), and the programs can be distributed using recording media as data described in HDL (Hardware Description Language), VHDL (Very high speed integrated circuits hardware description language), Verilog HDL and the like used for generating the circuit configuration data (bit stream data), and downloaded to the PD to implement the functions of each of the embodiments on the PD.

The output control apparatus, the display terminal, the information processing apparatus, the movable apparatus, the remote-control system, the output control method, the storage medium of program and the imaging control apparatus according to the embodiments of the present invention have been described, but the present invention is not limited to the embodiments described above. Each of the embodiments described above is presented as an example, and it is not intended to limit the scope of the present invention. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A control apparatus to control a movable apparatus, the movable apparatus—including a first imaging apparatus to image a target to acquire a first image and a second imaging apparatus to image a part of the target to acquire a second image, the control apparatus comprising:
    circuitry configured to
        acquire, from the movable apparatus, state information indicating a movement state of the movable apparatus;
        adjust at least one parameter of at least one of the first imaging apparatus and the second imaging apparatus to relatively increase image quality, of at least one of the first image and the second image, as the movement state of the movable apparatus relatively decreases;
        receive at least one of the first image and the second image from the movable apparatus, adjusted in image quality; and
        output at least one of the first image and the second image.

2. The control apparatus of claim 1,
    wherein upon the circuitry detecting that the movable apparatus is stopped, based upon the state information acquired, the circuitry is configured to output the second image, relatively increased in image quality.

3. The control apparatus of claim 1,
    wherein the state information includes information on a traveling velocity of the movable apparatus,
    wherein upon the circuitry determining, based upon the traveling velocity of the state information acquired, that the traveling velocity of the movable apparatus is equal to or less than a threshold value, the circuitry is configured to output the second image, relatively increased in image quality.

4. The control apparatus of claim 1,
    wherein the circuitry is configured to instruct the first imaging apparatus of the movable apparatus to change image quality of the first image based on the state information acquired from the movable apparatus, and is configured to receive the first image, including changed image quality, from the movable apparatus, the image quality including at least one of a frame rate, a resolution and an output range of the first image.

5. The control apparatus of claim 4,
    wherein the state information includes information on a traveling velocity of the movable apparatus,
    wherein upon the circuitry determining, based upon the traveling velocity of the state information acquired, that the traveling velocity of the movable apparatus is equal to or less than a threshold value, the circuitry is configured to instruct the first imaging apparatus of the movable apparatus to change the image quality of the first image by setting a parameter of the image quality, and is configured to receive the first image including the image quality change from the movable apparatus, and wherein, the parameter of the image quality is set to increase the frame rate upon the image quality including the frame rate, the parameter of the image quality is set to increase the resolution upon the image quality including the resolution, and the parameter of the image quality is set to a smaller output range upon the image quality including the output range.

6. The control apparatus of claim 1, wherein the first image is a video image and wherein the second image is a still image.

7. The control apparatus of claim 1,
wherein the control apparatus is a display terminal communicable with the movable apparatus via a communication network, to remotely operate the movable apparatus,
wherein the display terminal includes the circuitry is configured to receive the first image and the second image from the movable apparatus, and wherein the circuitry of the display terminal is configured to switch an image displayed on a display between the first image and the second image, based on the state information acquired.

8. The control apparatus of claim 7,
wherein upon the circuitry of the display terminal detecting that the movable apparatus is stopped, based upon the state information acquired, the circuitry of the display terminal is configured to display the second image on the display.

9. The control apparatus of claim 7,
wherein the state information includes information on a traveling velocity of the movable apparatus,
wherein upon the circuitry determining, based upon the traveling velocity of the state information acquired, that the traveling velocity of the movable apparatus is equal to or less than a threshold value, the circuitry of the display terminal is configured to display the second image on the display.

10. The control apparatus of claim 7,
wherein the circuitry of the display terminal is configured to generate an imaging request, to be requested to the second imaging apparatus based on the state information acquired, and is configured to transmit the imaging request to the movable apparatus,
wherein the circuitry of the display terminal is configured to receive, from the movable apparatus, the second image acquired by the second imaging apparatus based on the imaging request transmitted to the movable apparatus, and is configured to display the second image received on the display.

11. The control apparatus of claim 10,
wherein the imaging request to be requested to the second imaging apparatus includes information indicating a second image capture direction to be used by the second imaging apparatus, and wherein the circuitry of the display terminal is configured to determine the second image capture direction, to be used by the second imaging apparatus, based on a first image capture direction used for the first image being displayed on the display of the display terminal.

12. The control apparatus of claim 7,
wherein the circuitry of the display terminal instructs is configured to instruct the first imaging apparatus of the movable apparatus to change image quality of the first image based on the state information acquired from the movable apparatus, and is configured to display the first image, having changed image quality, on the display of the display terminal, the image quality including at least one of a frame rate, a resolution and an output range of the first image.

13. The control apparatus of claim 12,
wherein the state information includes information on a traveling velocity of the movable apparatus,
wherein upon the circuitry of the display terminal determining, based upon the traveling velocity of the state information acquired, that the traveling velocity of the movable apparatus is equal to or less than a threshold value, the circuitry of the display terminal is configured to instruct the first imaging apparatus of the movable apparatus to change the image quality of the first image by setting a parameter of the image quality, and is configured to receive and display the first image including the image quality change on the display of the display terminal, and wherein, the parameter of the image quality is set to increase the frame rate upon the image quality including the frame rate, the parameter of the image quality is set to increase the resolution upon the image quality including the resolution, and the parameter of the image quality is set to a smaller output range upon the image quality including the output range.

14. The control apparatus of claim 1,
wherein the control apparatus is an information processing apparatus communicable with a display terminal used for remotely operating the movable apparatus via a communication network,
wherein the information processing apparatus includes circuitry configured to acquire the first image and the second image from the movable apparatus and transmit the first image and second image acquired to the display terminal, and
wherein the circuitry of the information processing apparatus is configured to transmit the first image and second image acquired, selectively, to the display terminal based on the state information acquired, to switch an image displayed on the display terminal between the first image and the second image.

15. A movable apparatus comprising:
a movement mechanism configured to move the movable apparatus;
a first imaging apparatus to image a target to acquire a first image;
a second imaging apparatus to imam a part of the target to acquire a second image; and
circuitry configured to
acquire state information indicating a movement state of the movable apparatus;
adjust at least one parameter of at least one of the first imaging apparatus and the second imaging apparatus to relatively increase image quality, of at least one of the first image and the second image, as the movement state of the movable apparatus relatively decreases;

acquire at least one of the first image using the first imaging apparatus and the second image using the second imaging apparatus, adjusted in image quality; and output at least one of the first image acquired and the second image acquired to a display terminal, communicable with the circuitry.

16. The movable apparatus of claim 15, wherein upon the circuitry detecting that the movable apparatus is stopped, based upon the state information acquired, the circuitry is configured to transmit the second image to the display terminal to display the second image on the display terminal.

17. The movable apparatus of claim 15, wherein the state information includes information on a traveling velocity of the movable apparatus, wherein upon the circuitry determining, based upon the traveling velocity of the state information acquired, that the traveling velocity of the movable apparatus is equal to or less than a threshold value, the circuitry is configured to transmit the second image to the display terminal to display the second image on the display terminal.

18. The movable apparatus of claim 15, wherein the state information includes information on a traveling velocity of the movable apparatus, wherein upon the circuitry determining, based upon the traveling velocity of the state information acquired, that the traveling velocity of the movable apparatus is equal to or less than a threshold value, the circuitry is configured to receive the first image, acquired by the first imaging apparatus by image quality of the first image, from the first imaging apparatus, and is configured to transmit the first image, including the image quality increased, to the display terminal to display the first image including the image quality increased on the display terminal.

19. A remote-control system comprising:

a movable apparatus including a first imaging apparatus to image a target to acquire a first image and a second imaging apparatus to imam a part of the target to acquire a second image;

a display terminal communicable with the movable apparatus via a communication network for remotely operating the movable apparatus; and circuitry configured to acquire, from the movable apparatus, state information indicating a movement state of the movable apparatus;

adjust at least one parameter of at least one of the first imaging apparatus and the second imaging apparatus to relatively increase image quality, of at least one of the first image and the second image, as the movement state of the movable apparatus relatively decreases;

receive at least one of the first image and the second image from the movable apparatus, adjusted in image quality, based on the state information acquired; and output, to the display terminal, at least one of the first image acquired and the second image acquired.

* * * * *